United States Patent [19]
Marutani et al.

[11] Patent Number: 6,040,009
[45] Date of Patent: *Mar. 21, 2000

[54] LOW SOLVENT CONTENT TYPE-RESIN COMPOSITION, COATING COMPOSITION CONTAINING SUCH RESIN COMPOSITION AND PROCESS FOR COATING SUCH COATING COMPOSITION

[75] Inventors: Yoshiaki Marutani; Takashi Tomita; Tadamitsu Nakahama; Hiroyuki Uemura; Kazuhi Koga; Mika Ohsawa, all of Hiroshima, Japan

[73] Assignee: Mazda Motor Corporation, Hiroshima, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/491,736

[22] Filed: Jun. 19, 1995

[30] Foreign Application Priority Data

Jun. 23, 1994 [JP] Japan ................................. 6-141918
Jul. 6, 1994 [JP] Japan ................................. 6-154714

[51] Int. Cl.[7] ........................ C09B 167/00; C09B 167/04
[52] U.S. Cl. ..................... 427/241; 427/240; 427/385.5; 427/388.2; 427/388.3; 523/400; 524/539; 524/542; 524/597; 525/437; 525/440; 525/443; 525/450; 525/519; 528/80; 528/81; 528/297; 528/354
[58] Field of Search ..................... 525/165, 440, 525/443, 519, 437, 450; 524/539, 542, 597; 528/80, 81, 297, 354; 427/385.5, 388.2, 388.3, 240, 241; 523/400

[56] References Cited

U.S. PATENT DOCUMENTS 4,129,681 12/1978 Anderson et al. ....................... 428/524
4,403,093 9/1983 Hartman et al. ........................ 528/297
4,459,401 7/1984 Sekmakas et al. ..................... 528/296
4,501,829 2/1985 Oda et al. .
4,552,936 11/1985 Moore .
4,873,285 10/1989 Ryntz ....................................... 525/28
5,023,141 6/1991 Willey .

FOREIGN PATENT DOCUMENTS 0411585 2/1991 European Pat. Off. .
61-9461 1/1986 Japan .
WO89/05322 6/1989 WIPO .

*Primary Examiner*—Patricia A. Short
*Attorney, Agent, or Firm*—Martin Fleit

[57] ABSTRACT

The present invention is to provide a low solvent content type-coating composition by which the resultant coatings with good scuff resistance or water resistance as well as good chipping resistance are produced, while the content of an organic solvent to be used can be much reduced. The low solvent content type-coating composition comprises a polyester oligomer having a hydroxyl group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1 to 2.0, an amount of a modifying lactone being 31 to 85%, and an aliphatic hydrocarbon group of C4–22 which is not derived from lactones. The present invention is also to provide a process for coating a low solvent content type-coating composition on, for example, a base coating composition by a wet-on-wet coating. The base coating composition comprises a vinyl oligomer having a hydroxyl group and/or a blocked hydroxyl group, a melamine resin containing 50 to 100% of an imino type or methylol type mononucleus melamine and a weak acidic curing catalyst.

18 Claims, No Drawings

LOW SOLVENT CONTENT TYPE-RESIN COMPOSITION, COATING COMPOSITION CONTAINING SUCH RESIN COMPOSITION AND PROCESS FOR COATING SUCH COATING COMPOSITION

TECHNICAL FIELD

The present invention relates to a low solvent content type-coating composition suitable for use as an interlayer coating composition, a solid color coating composition, a clear coating composition and a base coating composition. In particular, the present invention relates to a low solvent content type-resin composition, a coating composition containing such resin composition as a binder, and a process for coating such coating composition, which provide improved chipping resistance and scuff resistance and wherein the content of an organic solvent to be used can be much reduced. The present invention also relates to a process for coating a low solvent content type-coating composition which is suitable for use in applying a clear coating in combination with a base coating on automobiles. In particular, the present invention relates to a process for coating a low solvent content type-coating composition which improves water resistance and chipping resistance of the resultant coating and wherein the content of an organic solvent to be used can be reduced to 0–35%.

BACKGROUND OF INVENTION

The organic solvents used in organic solvent type-coating compositions are evaported and discharged into the atmosphere during the coating operations such as baking, which deteriorates the environments on the earth. Recently, the interlayer coatings and overlayer coatings are constituted of the combination of polyesterpolyols with melamine resin. In this coating line, a large amount of organic solvents is discharged into the atmosphere. When the exhausted organic solvents are burned, a large amount of carbon dioxide are generated and promotes the warming of the earth. Therefore, various attempts have been conventionally made to reduce the amount of the organic solvents to be discharged. For example, there have been proposed high solid content coating compositions wherein a low molecular weight melamine resin is combined with polyesterpolyols and high solid content coating compositions of acrylic type (e.g., Japanese Laid-open Publication (J.P. Kokai) Nos. 61-9461 and 55-123660). However, the minimum content of the organic solvent as attained by such coating compositions is about 40%. Such amount is insufficient in view of the protection of the environment. Further, when polyesterpolyol to be combined with a low molecular weight melamine resin is conventionally prepared, it is very difficult to make lower the molecular weight of the polyesterpolyol and it is very difficult to make lower the viscosity of the coating composition using such polyesterpolyol. In such coating compositions, there are problems in that it is very difficult to provide strong coating which can improve chipping resistance and that the sagging on the vertical surface is remarkable when the coating is made, because the viscosity of the coating composition becomes lower.

There have been widely investigated aqueous coating compositions without using or without substantially using organic solvents or powder coating compositions for the purpose of decreasing the amount of the organic solvents. However, the aqueous coating compositions are poor in water resistance and still need at least about 20% of organic solvents. Since the powder coating compositions need resins having a very higher glass transition temperature, there is a problem in that the coating obtained from the powder coating compositions is brittle and cannot meet the requirements of scuff resistance and chipping resistance as required for overlayer coatings and interlayer coatings.

Therefore, there is a strong demand for coating compositions which meet the requirements of the scuff resistance and chipping resistance of the resultant coating and which can reduce the amount of the organic solvents to a large degree.

On the other hand, there have been conventionally known high solid content coating compositions comprising resins containing a hydroxy group as an essential functional group and curing agents such as melamine resins comprising completely alkoxylated melamine, as high solid content coating compositions suitable for base coating or clear coating compositions. Such high solid content coating compositions contain strong acid catalysts as curing catalysts, in order to improve the curing reaction between the resins and curing agents.

However, when acidic rain falls on the coating formed using such high solid content coating compositions as a clear coating composition, the acid (such as sulfuric acid or nitric acid) in the rain attacks the coating, decomposes it, and then pours the decomposed substances away. As a result, there is a problem in that fine roughness remains on the surface, which can be seen as kind of stain. In order to resolve this problem, there has been proposed clear coating compositions which can be cured by the reaction between a carboxyl group and an epoxy group. In this case, a basic catalyst is used as a curing agent.

However, the base coating compositions use strong acid catalysts. When clear coating compositions containing such basic catalyts are coated on such base coating compositions, there are problems, for example, in that the functions of the basic catalysts and the strong acid catalysts offset each other and that the strong acid catalysts in the base coating compositons react with the epoxy group in the clear coating compositions. Consequently, the curability of the base coating compositions is remarkably reduced, the adhesion of the base coating to the interlayer coating is reduced, and therefore, a new problem appears in that the resultant coating becomes poor in water resistance and chipping resistance.

Therefore, there is also a strong demand for a new coating process for low solvent content type coating compositions, which resolves such drawbacks and reduces the amount of the organic solvents to a large extent.

SUMMARY OF THE INVENTION

One of the objectives of the present invention is to provide a low solvent content type-resin composition which forms the resultant coatings with good scuff resistance and chipping resistance and wherein the content of an organic solvent to be used can be much reduced, as well as to a low solvent content type-coating composition containing such resin composition as a binder, and a process suitable for coating such coating composition.

Another object of the present invention is to provide a process for coating a low solvent content type-coating composition which forms the resultant coatings with good water resistance and chipping resistance and wherein the content of an organic solvent to be used can be much reduced.

In the course of the present inventors' intensive studies in order to achieve the above objectives, the inventors have found that the moecular weight of the polyester oligomers can be easily controlled, not by the conventional addition process wherein all of the reactive components are synthesized by adding them in one step, but by the process wherein the reactive components are sequentially reacted with each other by adding them dividedly. The inventors have also found that the viscosity of the coating composition can be much reduced by modifying the molecular structure of the polyester oligomer so that plural branches radially extend from the center of the oligomers and by modifying the molecular structure with lactones so that the solubility of the oligomers is improved. Further, the inventors have found that the compatibility between the oligomers and the curing agents is much improved by incorporating an aliphatic hydrocarbon group having C4-22 which is not derived from lactones. The present invention has been completed on the basis of these findings. More specifically, the objectives have been achieved by the following inventions.

1. A low solvent content type-resin composition comprising:
   (1) a polyester oligomer having a hydroxyl group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1.0 to 2.0, an amount of a modifying lactone (lactone modifying amount) being 31 to 85%, and an aliphatic hydrocarbon group of C4-22 which is not derived from lactones; and
   (2) a curing agent reactive with a hydroxyl group of the hyroxyl group containing polyester oligomer;
   and containing 5 to 40% of an organic solvent.

2. A low solvent content type-coating composition comprising:
   (1) a polyester oligomer having a hydroxyl group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1.0 to 2.0, an amount of a modifying lactone (lactone modifying amount) being 31 to 85%, and an aliphatic hydrocarbon group of C4–22 which is not derived from lactones;
   (2) a curing agent reactive with a hydroxyl group of the hyroxyl group containing polyester oligomer; and
   (3) a curing catalyst which catalyzes the reaction between the hydroxyl group and the curing agent;
   and containing 5 to 40% of an organic solvent.

2. A low solvent content type-coating composition comprising:

3. A process for coating the coating composition of Item 2 above to the surface of a substrate (or an article), and then curing it by heat, whereby forming the coating on the surface.

4. A process for coating the coating composition of Item 2 above to the surface of an article, comprising the steps of:
   coating the coating composition on the surface of a substrate which is supported rotatably about substantially horizontal axis so that the coating thickness is thicker than that which usually forms sagging on a vertically extending surface; and then
   drying said coating composition on the surface, to cure it in such a manner that the substrate is started to rotate about the substantially horizontal axis before the sagging of the coating composition on the substrate is caused with gravity and in such a manner that the rotation is made at such a speed that the surface of the substrate is changed from the substantially vertical position to the substantially horizontal position before the sagging of the coating composition is caused with gravity and at such a speed that the sagging of the coating composition is not caused with centrifugal force caused by the rotation.

Further, the present inventors have found that the above objective can be also achieved by the following invention.

5. A process for coating a low solvent content type-coating composition (A) on a coating composition (B) by a wet-on-wet coating,
   the coating composition (A) comprising (1) at least one of vinyl oligomers having a n acid anhydride group and/or a blocked carboxyl group and an epoxy group as essential groups, a number average molecular weight (Mn) of 700 to 1500, a weight average molecular weight (Mw) of 700 to 3000, and a ratio of a weight average molecular weight/a number average molecular weight (Mw/mn) of 1.0 to 2.0, wherein the acid anhydride group and/or blocked carboxyl group and the epoxy group may be on the same or different oligomers; and (2) a basic curing catalyst, and having an organic solvent content of 0 to 35%; and
   the coating composition (B) comprising (1) a vinyl oligomer having a hydroxyl group and/or a blocked hydroxyl group, a number average molecular weight (Mn) of 700 to 2500, a weight average molecular weight (Mw) of 700 to 7500, and a ratio of a weight average molecular weight/a number average molecular weight (Mw/mn) of 1.0 to 3.0; (2) a melamine resin containing 50 to 100% of an imino type or methylol type mono-nucleus melamine having the following formula:

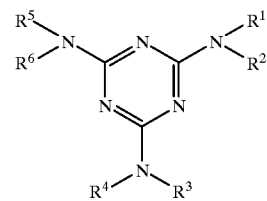

wherein $R^1$ to $R^6$ may be the same as or different from each other and each represents a hydrogen atom, a methylol group or an alkoxy group having C1–5, provided that all of $R^1$ to $R^6$ are not an alkoxy group at the same time; and (iii) a weak acidic catalyst.

The present invention will be explained in more detail below.

DISCLOSURE OF INVENTION

The hydroxy group-containing polyester oligomer used in the present invention has a hydroxyl group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1.0 to 2.0.

When the amount of a hydroxyl group is less than 2.0 moles/Kg-resin, the curability of the resultant coating is impaired, the coating becomes brittle and the scuff resistance, chipping resistance, gasoline resistance and water resistance of the resultant coating are deteriorated. On the other hand, the amount of a hydroxyl group is more than 10.0 moles/Kg-resin, the viscosity of the coating composition becomes too high and therefore it is difficult to prepare the low solvent content type-coating composition. The amount of a hydroxyl group is preferably 2–7 moles/Kg-resin, much preferably 3–6 moles/Kg-resin.

When the number average molecular weight (Mn) of the present polyester oligomers smaller than 300, they are easy to evaporate and the volatile content increases. On the other hand, when the Mn is larger than 1500, the viscosity of the coating composition increases. The Mn of the present polyester oligomers is preferably 300 to 1200, much preferably 350 to 1100.

When the Mw/Mn ratio of the present polyester oligomers is larger than 2.0, the relative proportions of the polyester oligomers having a too large and too small molecular weights become large and, therefore, there appear the problems encountered when the oligomers having too large and too small molecular weights are employed. On the other hand, the lower limit for the Mw/Mn ratio is 1.0 and in such a case, the hydroxyl group-containing polyester oligomers having uniform properties can be obtained. The smaller the molecular weight of the present polyester oligomers is within the range of the present invention, the Mw/Mn approaches 1.0. The Mw/Mn ratio is preferably 1.0 to 1.7, much preferably 1.0 to 1.5.

The weight average molecular weight of the polyester oligomers is 300 to 3000, in accordance with the Mw/Mn ratio as stated above. The weight average molecular weight of the polyester oligomers is preferably 300 to 2000, much preferably 350 to 1500.

The present polyester oligomers have a modifying lactone in an amount of 31 to 85% per molecule and a linear or branched aliphatic hydrocarbon group of C4–22 which is not derived from lactones.

When the amount of the modifying lactone is less than 31%, the solubility of the oligomers decreases and therefore the viscosity of the coating composition becomes high; the flexibility of the oligomers is poor and therefore the resultant coating becomes brittle; and the scuff resistance and chipping resistance of the resultant coating are impaired. On the other hand, the use of the amount of the modifying lactone is larger than 85% is not preferable, because the resultant coating becomes too flexible and the gasoline resistance thereof is impaired. The amount of the modifying lactone is preferably 31 to 80%, much preferably 31 to 75%.

When there is no aliphatic hydrocarbon group of C4–22 which is not derived from lactones, the compatibility between the polyester oligomers and the curing agents becomes poor and the cross-linking is difficult to occur and as a result, the coating properties are deteriorated and the coating appearance is much reduced.

The carbon number of the aliphatic hydrocarbon group is preferably 4 to 15, much preferably 4 to 12. The aliphatic hydrocarbon group is monovalent or bivalent and may be linear or branched.

The monovalent aliphatic hydrocarbon group includes saturated or unsaturated aliphatic hydrocarbon groups such as an alkyl group, alkenyl group and alkynyl group. The aliphatic hydrocarbon group includes, for example, alkyl groups such as n-butyl, t-butyl, n-pentyl, s-pentyl, hexyl, n-heptyl, s-heptyl, octyl, nonyl, decyl and undecyl groups; alkenyl groups such as n-butenyl, s-butenyl, t-butenyl, n-pentenyl, s-pentenyl, hexenyl, n-heptenyl, s-heptenyl, octenyl, nonenyl, decenyl and undecenyl groups; and alkynyl groups such as n-butynyl, s-butynyl, t-butynyl, n-pentynyl, s-pentynyl, hexynyl, n-heptynyl, s-heptynyl, octynyl, nonynyl, decynyl and unceynyl groups. Preferred examples of the monovalent aliphatic hydrocarbon group include n-butyl, s-butyl, n-pentyl, s-pentyl, hexyl, n-heptyl, s-heptyl, octyl, nonyl, decyl and undecyl groups.

The bivalent aliphatic hydrocarbon group includes saturated or unsaturated bivalent aliphatic hydrocarbon groups such as an alkylene group, alkenylene group and alkynylene group. The preferred examples of the bivalent aliphatic hydrocarbon group include, for example, an alkylene group such as tetramethylene, pentamethylene, hexamethylene, heptamethylene, ethylethylene and ethylpropylene groups; an alkenylene group such as butenylene, pentenylene, hexenylene, heptenylene, octenylene, nonenylene, decenylene and undecenylene groups; and an aklynylene group such as butynylene, pentynylene, hexynylene, heptynylene, octynylene, nonylylene, decynylene, undecynylene, dodecynylene, tridecynylene and tetradecynylene groups.

The present polyester oligomers contain an hydroxyl group and an ester bond in the molecule. Preferred polyester oligomers include star-type or star burst-type oligomers. The term "star-type oligomers" used herein means those oligomers produced by reacting the functional groups at the ends of the portions radially extending from the (imaginary) center of, for example, polyfunctional alcohols or epoxy compounds as starting compounds, with acid anhydrides, monoepoxy compounds, lactones or hydroxyl group-containing monocarboxylic acids, to further extend the radially extended portions. The term "star burst-type oligomers" used herein means those oligomers further having branches extending from the radially extended portions. These types of oligomers reduce the viscosity of the oligomers and strengthen the resultant coatings. In this case, the length of the radially extended portions can be freely controlled by the molar reaction ratio and the structures of the reactants.

The star-type or star burst-type oligomers preferably usable in the present invention can be prepared by the following manners.

Method 1:

The star-type hydroxyl group-containing polyester oligomers can be prepared by sequentially reacting polyols having 3 to 6 hydroxyl groups per molecule with various combinations of acid anhydrides having one acid hydride group per molecule, lactones and monoepoxy compounds having an epoxy group. A monoepoxy compound having a hydroxyl group can be used in place of the monoepoxy compounds, to produce star burst-type oligomers having branches at the end of the radially extended portions.

More specifically, the following specific methods for preparing the present oligomers.

(1) 1 mole of a polyol having 3 to 6 hydroxyl groups is reacted with 0.3 to 1.5 mole of an acid anhydride, then with 2 to 10 moles of a lactone, and then with 0.3 to 1.5 mole of a monoepoxy compound or a hydroxyl group-containing monoepoxy compound.

(2) 1 mole of a polyol having 3 to 6 hydroxyl groups is reacted with 0.3 to 1.5 mole of an acid anhydride, then with 0.3 to 1.5 mole of a monoepoxy compound or a hydroxyl group-containing monoepoxy compound, and then with 2 to 10 moles of a lactone.

(3) 1 mole of a polyol having 3 to 6 hydroxyl groups is reacted with 2 to 10 moles of a lactone, then with 0.3 to 1.5 mole of an acid anhydride, then with 0.3 to 1.5 mole of a monoepoxy compound or a hydroxy group-containing monoepoxy compound.

When the reaction is carried out at 100 to 180° C., the acid anhydride is reacted with a hydroxyl group of the polyol to form an extended portion having an ester bond and a carboxyl group at an end thereof. The lactone preferentially reacts with a hydroxyl group rather than a carboxyl group, to form an extended portion having an ester bond and a hydroxyl group at an end thereof. The monoepoxy group of the monoepoxy compound preferentially reacts with a carboxyl group rather than a hydroxyl group, to form an extended portion having an ester bond. In this case, a secondary hydroxyl group is generated by the reaction between the carboxyl group and the epoxy group. The secondary hydroxyl group is useful because it improves the adhesion to the coating which is formed thereafter and therefore the chipping resistance of the resultant coating is improved.

The length of the radially extended portions of the star-type or star burst-type polyester oligomers can be freely controlled by taking into consideration the properties of the functional groups of the feed materials as stated above and the structures of the reactants. The number of the radially extended portions can be freely controlled by the number of the hydroxyl groups of the polyols to be used.

The structure of the hydroxyl group-containing polyester oligomers obtained by Method 1(1) can be, for example, expressed by the following formula (1). In this case, polyols having four hydroxyl groups are used. If the number of the hydroxyl groups of the polyols is three (3), then there are three (3) radially extended portions. If the number of the hydroxyl groups of the polyols is six (6), then there are six (6) radially extended portions.

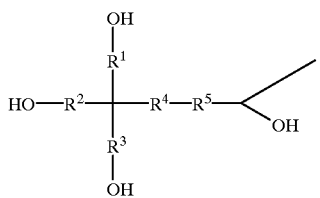

(1)

wherein $R^1$~$R^3$ are ester bonds formed by the reaction between the hydroxyl group of the polyol and the internal ester group of the lactone. $R^4$ is an ester bond formed by the reaction between the hydroxyl group of the polyol and the acid anhydride. $R^5$ is an ester bond formed by the reaction between the carboxyl group derived from the acid anhydride and the epoxy group of the monoepoxy compound. The extended portion branched from the portion having a hydroxyl group from $R^5$ is a hydrocarbon moiety derived form the monoepoxy compound.

When a hydroxyl group-containing monoepoxy compound is used as a monoepoxy compound in Method 1(1), a star burst-type polyester oligomer having the following formula (2) can be obtained.

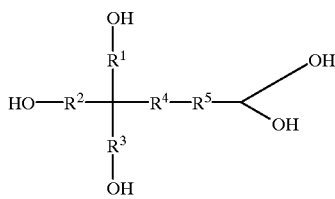

(2)

wherein $R^1$~$R^5$ are the same as the above.

As compared with Method 1(1), the order of the lactone and monoepoxy compound to be used is reversed in Method 1(2). However, since the reactivity of lactones and monoepoxy compounds is selective, the polyester oligomers having the structure similar to that of the oligomer obtained in Method 1(1) is obtained, while the different oligomer having the following formula (3) may be also obtained.

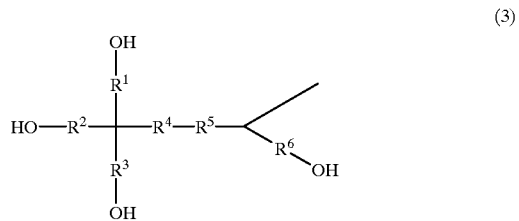

(3)

wherein $R^1$~$R^5$ are the same as the above, and $R^6$ is an ester bond formed by the reaction between the hydroxyl group derived from the monoepoxy compound and the lactone.

In Method 1(3), when the more the amount of the lactine to be used, for example, the hydroxyl group-containing polyester oligomer having the following formula (4) is obtained.

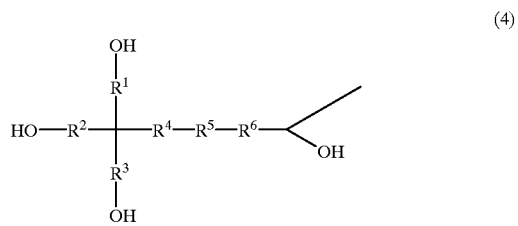

(4)

wherein $R^1$~$R^4$ are ester bonds formed by the reaction between the hydroxyl group of the polyol and the internal ester group of the lactone; $R^5$ is an ester bond formed by the reaction between the hydroxyl group derived from the lactone and the acid anhydride; $R^6$ is an ester bond formed by the reaction between the carboxyl group derived from the acid anhydride and the epoxy group of the monoepoxy compound; and the extended portion branched from the portion having a hydroxyl group from $R^6$ is a hydrocarbon moiety derived form the monoepoxy compound. When a hydroxyl group-containing monoepoxy compound is used as a monoepoxy compound, a polyester oligomer having radially extended portions branched at its end is obtained.

When the amount of the lactone to be used is small, the polyester oligomer having the following formula (5) may be obtained.

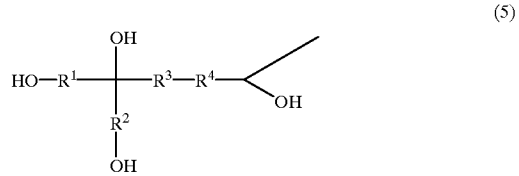

(5)

wherein $R^1$~$R^2$ are ester bonds formed by the reaction between the hydroxyl group of the polyol and the internal ester group of the lactone; $R^3$ is an ester bond formed by the reaction between the hydroxyl group of the polyol and the acid anhydride; $R^4$ is an ester bond formed by the reaction between the carboxyl group derived from the acid anhydride and the epoxy group of the monoepoxy compound; and the extended portion branched from the portion having a hydroxyl group from $R^4$ is a hydrocarbon moiety derived from the monoepoxy compound. When a hydroxyl group-containing monoepoxy compound is used as a monoepoxy compound, a polyester oligomer having radially extended portions branched at its end is obtained.

In this case, when the lactone is used in about an equivalent amount to that of the polyol, the hydroxyl group-containing polyester oligomer having the formula (1) is also obtained.

Method 2:

In this method, 1 mole of a polyepoxy compound having 3 to 6 epoxy groups is reacted with 2 to 6 moles of a hydroxy acid having a hydroxy group and a carboxyl group, and then with 2 to 10 moles of a lactone.

In the method, when the lactone is used in a large amount, the polyester oligomer having the formula (6) may be obtained.

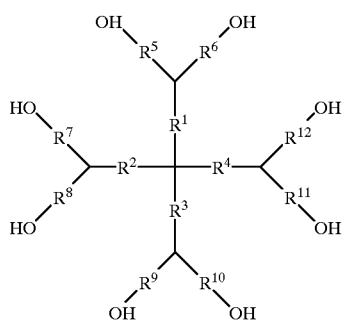

(6)

In the above formula (6), $R^1 \sim R^4$ are ester bonds formed by the reaction between the epoxy group and carboxyl group of the hydroxy acid. $R^5$, $R^7$, $R^9$ and $R^{11}$ are ester bonds formed by the reaction between the hydroxyl group derived from the hydroxy acid and the internal ester group of the lactone. $R^6$, $R^8$, $R^{10}$ and $R^{12}$ are ester bonds formed by the reaction between (a) the secondary hydroxyl group generated from the reaction of the epoxy group with the carboxyl group of the hydroxy acid and (b) the internal ester group of the lactone.

The resultant polyester oligomer is a typical star burst-type oligomer.

When the lactone is used in a small amount, the polyester oligomer having the following formula (7) may be obtained.

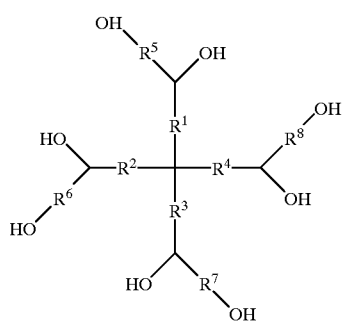

(7)

In the formula above, $R^1 \sim R^4$ are ester bonds formed by the reaction between the epoxy group and the carboxyl group of the hydroxy acid. $R^5 \sim R^8$ are ester bonds formed by the reaction between the hydroxyl group derived from the hydroxy acid and the internal ester group of the lactone.

The resultant polyester oligomer is a kind of a star-type oligomer.

Method 3:

In this method, 1 mole of a polyepoxy compound having 3 to 6 epoxy groups is reacted with 2 to 6 moles of an aliphatic acid, and then with 2 to 10 moles of a lactone.

In the method, when the lactone is used in about an equivalent amount to that of the epoxy group, the polyester oligomer having the formula (8) may be obtained.

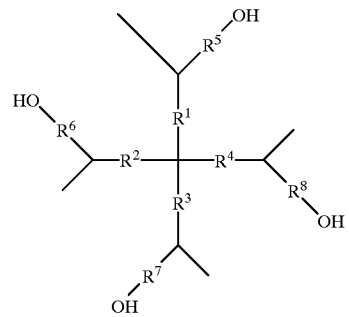

(8)

In the formula above, $R^1 \sim R^4$ are ester bonds formed by the reaction between the epoxy group and the carboxyl group of the aliphatic acid. $R^5 \sim R^8$ are ester bonds formed by the reaction between (a) the secondrary hydroxyl group generated by the reaction of the epoxy group with the carboxyl group of the aliphatic acid and (b) the internal ester group of the lactone. The extended portions branched from $R^1 \sim R^4$ are a hydrocarbon moiety derived from the aliphatic acid.

The resultant polyester oligomer is mainly a star-type oligomer.

When the lactone is used in a small amount, the length of the extended portion as extended by the lactone becomes short. On the other hand, when the lactone is used in a large amount, the extended portion becomes long.

The polyols used in the above reactions include triols, tetraols, pentaols and hexaols. The triols include glycerin, trimethylol ethane, trimethylol propane, tris-hydroxymethylaminomethane and 1,2,6-hexatriol. The tetraols include pentaerythritol, diglycerin, lyxose and sorbitol. The pentaols include mannose. The hexaols include inositol. in particular, the triols and tetraols are preferable in view of the easiness of the synthesis.

The amount of the polyols to be used is generally 3 to 40%, preferably 3 to 30% based on the weight of the polyester oligomer.

The acid anhydrides include alkyl phthalic anhydrides such as phthalic anhydride and 4-methyl phthalic anhydride, alkyl hexahydrophthalic anhydrides such as hexahydrophthalic anhydride, 3-methyl hexahydrophthalic anhydride and 4-methyl hexahydrophthalic anhydride, succinic anhydride and tetrahydrophthalic anhydride. In particular, the alkyl phthalic anhydrides and alkyl hexahydrophthalic anhydrides are preferable in view of the easiness of the synthesis.

The amount of the acid anhydrides to be used is generally 3 to 30%, preferably 3 to 20% based on the weight of the polyester oligomer.

The lactones include ε-caprolactone, β-propionolactone, γ-butyrolactone and δ-valerolactone. ε-Caprolactone is preferable in view of the easiness of the synthesis of the oligomers.

The amount of the lactones to be used is 31 to 85%, preferably 31–80% based on the weight of the polyester oligomer, in accordance with the modifying lactone amount as stated above.

The monoepoxy compound preferably includes epoxides of aliphatic hydrocarbon groups having an unsaturated bond, in particular, epoxides of α-olefins, as well as glycidyl ethers and glycidyl esters. The epoxides of α-olefins include epoxides of C3 to C25, such as propylene oxides, e.g., AOEX24 (a mixture of epoxides of α-olefins having 12 carbon atoms and 14 carbon atoms), AOEX68 (a mixture of epoxides of α-olefins having 16 carbon atoms and 18 carbon atoms) (each manufactured by Daisel Ltd.). The glycidyl ethers include butyl glycidyl ether, phenyl glycidyl ether, decyl glycidyl ether and cresyl glycidyl ether. The glycidyl esters include Cajular E10 or PES10 (manufactured by Uka Shell).

The carbon number of the monoepoxy compounds is preferably 4 to 22, in view of the easiness of the synthesis and good coating properties of the resultant coatings. In particular, the carbon number is 4 to 15.

The hydroxyl group containing monoepoxy compounds include the above monoepoxy compounds except that they also contain a hydroxyl group. Specifically, such monoepoxy compounds include 1,2-epoxyhexanol, 1,2-epoxyoctanol, 1,2-epoxydecanol, hydroxybutylglycidyl ether, hydroxyoctylglycidyl ether, hydroxyphenylglycidyl ether, hydroxybutylglycidyl ester and hydroxycyclohexylglycidyl ester.

In this case, the monoepoxy compounds and the hydroxyl group containing monoepoxy compounds may be used together. For example, the combination includes a mixture of monoepoxy compounds having an aliphatic hydrocarbon group of C4–22 with hydroxyl group containing monoepoxy compounds which may or may not contain such an aliphatic hydrocarbon group.

Such hydroxyl group containing monoepoxy compounds include hydroxyl group containing monoepoxy compounds having C3–15, preferably such as glycidol.

The amount of the hydroxy group containing monoepoxy compounds to be used together with the monoepoxy compounds is generally 2–100%, preferably 4–90% based on the weight of the total monoepoxy compounds.

The amount of the monoepoxy compounds or hydroxyl group containing monoepoxy compounds to be used is generally 5 to 45%, preferably 5 to 30%, based on the weight of the hydroxyl group containing polyester oligomer.

Any hydroxy acids may be used so long as they have a hydroxyl group and a carboxylic group in a molecule. Such hydroxyl acids include linear or branched hydroxyalkyl acids such as pivalic acid, 12-hydroxy stearic acid, and the reaction products produced by reacting polyols, for example, diols such as ethylene glycol, propylene glycol, 1,5-hexane diol, 1,6-hexane diol, neopenty glycol and cyclohexane dimethanol or tri-ols such as trimethylol propane, trimethylol ethane and glycerin or tetra-ols such as pentaerithritol and diglycerin, with a compound having an acid anhydride group in a molecule. In this case, the preferred compounds having an acid anhydride group are those acid anhydrides as stated above.

The amount of the hydroxyl acids to be used is generally 5 to 70%, preferably 10 to 60%, based on the weight of the polyester oligomer.

The polyepoxy compounds having 3 to 6 or more epoxy groups in a molecule include tris glycidyl ethylisocyanurate, tris glycidyl propyl isocyanurate, tetra glycidyl methaxylene diamine, tetra glycidyl- 1,3-bis-aminomethylcyclohexane, tetra glycidyl diaminodiphenylmethane, triglycidy p-aminophenol and diglycidyl aniline.

The amount of polyepoxy compounds to be used is generally 5 to 40%, preferably 10 to 30%, based on the weight of the hydroxyl group containing polyester oligomer.

The aliphatic acids are preferably those acids having C4–22, preferably C4–15. Such aliphatic acids include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentanoic acid, hexadecanoic acid and heptadecanoic acid.

The amount of the aliphatic acids to be used is generally 5 to 70%, preferably 10 to 60%, based on the weight of the polyester oligomer.

It is preferable that the aliphatic hydrocarbon group having C4–22 which is not derived from lactones should be those derived from the monoepoxy compounds, hydroxyl group containing monoepoxy compounds, hydroxy acids or aliphatic acids. In order to surely incorporate such aliphatic hydrocarbon group of C4–22 into the polyester oligomer, it is necessary to use the compounds containing an aliphatic hydrocarbon group of C4–22.

The reaction method for producing the polyester oligomer is carried out under the conditions which are employed in the conventionally known esterification methods.

In the synthesis of the polyester oligomer, there are generally used catalysts for promoting the reaction with lactones or for promoting the reaction between a carboxyl group and an epoxy group. The catalysts for promoting the reaction with lactones preferably include monoesters of phosphoric acid, bronsted acids such as hydrochloric acid and sulfuric acid, titanate compounds such as tetrabutyl titanate, and organotin compounds such as dibutyltin laurate and dimethyltin dichloride.

The reaction between a carboxyl group and an epoxy group may be carried out without any catalysts. However, in order to make short the time necessary for the reaction, can be preferably used imidazoles such as 1-methylimidazole and dimethylimidazole, quaternary phosphonium salts such as tetrabutyl phophonium bromide and tetralaurylphosphonium chloride, and quaternary phosphonium salts such as tetraammonium bromide, tetraammonium chloride and trilaurylammonium acetate, as a catalyst.

These catalysts are used in a catalytic amount. More specifically, the lactone catalysts are used in an amount of 0.00001 to 10 wt. %, preferably 0.0001 to 1 wt. % in respect of the amount of lactones used. The catalysts for promoting the reaction between a carboxyl group and an epoxy group are used in an amount of 0.001 to 10 wt. %, preferably 0.001 to 5 wt. % in respect of the amount of the carboxyl group containing compounds or epoxy compounds to be used.

The reaction temperature is generally 100 to 200° C., preferably 120 to 180° C. The reaction time is generally 30 min. to 48 hrs., preferably 3 to 12 hrs.

The glass transition temperature (Tg) of the polyester oligomer of the present invention is preferably –50 to 40° C., much preferably –30 to 20° C. When the Tg is lower than –50° C., the resultant coating is to flexible and therefore the gasoline resistance of the coating is easy to decrease. On the other hand, when the Tg is higher than 40° C., the viscosity becomes higher.

The present hydroxyl group containing polyester oligomer may be used together with those oligomers having the modifying lactone amount beyond the range of the present invention. In such a case, the amount of the present polyester oligomer is 20 to 99.9%, preferably 30 to 99.9%, based on the weight of the mixture.

Any curing agents which react with a hydroxyl group may be used so long as they are used as curing agents in the conventional cross-linking systems.

Such curing agents preferably include isocyanate curing agents such as polyisocynates and isocyanate prepolymers;

and amino resin curing agents such as melamine resin, benzoguanamine resin and urea resin.

The polyisocyanates include those polyisocyanates having plural isocyanate groups. The number of the isocyanate groups is generally 2 to 6, preferably 2 to 4. Prefered polyisocyanates include diisocyanates. Such diisocyanates include xylylene diisocyanate, isophorone diisocyanate, tolylene diisocyanate, hexamethylene diisocyanate, 1,4-tetramethylene diisocyanate, 1,10-decamethylene diisocyanate, 1,18-octadecamethylene diisocyanate and lysine diisocyanate. The polyisocyanates also include lysine triisocyanate and compounds obtained by polymerizing a monomer having a vinyl group and an isocyanate group. Among them, preferred is hexamethylene diisocyanate.

The isocyanate prepolymers include polymers of polyisocyanates and addition products between polyisocyanates and water or polyols.

The polymers of polyisocyanates include polyisocyanate compounds wherein plural polyisocyanates are bound to form a ring. Preferred ring polyisocyanates include isocyanurates having an isocyanurate ring.

The polyisocyanates react with water or polyols to form addition products having plural isocyanate groups. Polyisocyanates react with water to form biuret. In this case, the polyols include dihydric, trihydric, tetrahydric and polyols having more than four hydroxyl groups, such as ethylene glycol, propylene glycol, 1,3-butylene glycol, 2-methyl propane diol, 1,4-butylene glycol, neopentyl glycol, 1,6-hexane glycol, 1,2-dodecane glycol, glycerin, trimethylol propane, trimethylol ethane, pentaerythritol, dipentaerythritol, neopentylglycol ester of hydroxy pivalic acid, 1,4-cyclohexane dimethanol, ethyleneoxide adduct of bisphenol A and 1,4-hydroxy hydroquinone.

Preferred isocyanate prepolymers include hexamethylene diisocyanate prepolymer which is a cyclic polymer (Burnock 901 S manufactured by Dainippon Ink & Chemicals, Inc.) and Duranate TPA-100 manufactured by Asahi Chemical Industry Co., Ltd.

The amino resin curing agents are preferably melamine resin. Melamine resin is produced by the polymerization between melamine and formaldehyde and is well known in the art. In particular, melamine resin containing 50 to 100% of mononucleus melamine having the following formula (9) is preferred.

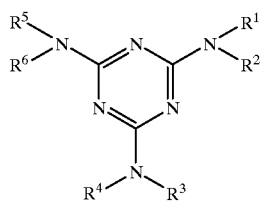

(9)

In the formula (9), $R^1$~$R^6$ are independently a hydrogen atom, a methylol group or an alkyl group of C1–5.

When the mononucleus melamine is contained in melamine resin in an amount of less than 50%, such amount is not preferable because the coating viscosity becomes too large.

In addition, when the carbon number of the alkoxy group is larger than 5, such use is not preferable because the coating viscosity becomes too large. Preferred carbon number is 1 to 4. More specifically, alkoxy groups include methoxy, methoxy, propoxy, butoxy and isobutoxy groups.

The examples of the mononucleus melamine are those wherein $R^1$~$R^6$ are all alkoxy groups, a mixture of a hydrogen atom and a methylol group, a mixture of a hydrogen atom and an alkoxy group, a mixture of a methylol group and an alkoxy group, and a mixture of a hydrogen atom, a methylol group and an alkoxy group. The specific examples thereof include Cymel 325, 327 and 370 ($R^1$~$R^6$ of the formula (9) are all methylol groups; the content of the mononucleus melamine is 70%), Cymel 303 ($R^1$~$R^6$ of the formula (9) are all alkoxy groups; the content of the mononucleus melamine is 80%).

The mononucleus melamine as defined by the formula (9) is different from the melamine wherein two or more melamine molecules are bound by formaldehyde to have two or more nuclei. However, melamine resin containing two or more melamine nuclei (polynucleus melamine resin) may be incorporated into the coating composition so long as the melamine resin contains the above mononucleus melamine in an amount of 50% or higher.

The melamine resin containing such mononucleus melamine in an amount of 50 to 100% can be easily prepared by a skilled artisan. In general, the melamine as represented by the formula (9) is reacted with formaldehyde, followed by the separation according to gel permeation chromatograophy, in order to reduce the content of the polynucleus melamine resin to less than 50% or to completely remove such polynucleus melamine resin.

The isocyanate prepolymer is used in an amount of, generally 0.6 to 1.4 mole, preferably 0.8 to 1.2 mole, much preferably 0.9 to 1.1 mole per one mole of the hydroxyl group of the polyester oligomer.

The melamine resin is used in an amount of 20 to 140%, preferably 40 to 100%, based on the weight of the polyester oligomer.

Preferred curing agents are melamine resin containing mononucleus melamine in an amount of 50 to 100%, for the purpose of reducing the viscosity.

In the present coating composition, the isocyanate prepolymers may be used together with the melamine resin. In this case, the melamine resin is used in an amount of, generally 0.1 to 99.9 wt. %, preferably 0.1 to 5.0 wt. %.

The present coating composition contains a curing catalyst for promoting the curing reaction between the hydroxyl group containing polyester oligomer and the curing agent.

The curing catalyst includes acid catalysts, such as strong acidic catalysts and weak acidic catalysts. The strong acidic catalysts include inorganic acids such as hydrochloric acid, nitric acid and sulfuric acid, organic acids such as sulfonic acids, and the esters, ammonium salts and onium salts thereof. In particular, the strong acidic catalysts are preferably sulfonic acids, their esters, their amine salts, benzoic acid and trichloroacetic acid. The sulfonic acids include aliphatic sulfonic acids such as methanesulfonic acid and ethanesulfonic acid, and aromatic sulfonic acids such as p-toluenesulfonic acid, dodecylbenzene sulfonic acid, naphthalene sulfonic acid, dinonyl naphthalene sulfonic acid and dinonyl naphthalene disulfonic acid. Preferred strong acidic catalysts include aromatic sulfonic acids and their esters, such as p-toluenesulfonic acid and dinonyl naphthalene disulfonic acid, in view of improved water resistance of the resultant coating.

The weak acidic catalysts include phosphric acid, monoesters of phosphoric acid, esters of phosphorous acid and esters of unsaturated group containing phosphoric acid. Preferred weak acidic catalysts include phosphoric acid and its esters, such as phosphoric acid, pyrophosphoric acid and mono- or diesters of phosphoric acid. The monoesters of phosphoric acid include monooctyl phosphate, monopropyl phosphate and monolauryl phosphate. The diesters of phosphoric acid include dioctyl phosphate, dipropyl phosphate and dilauryl phosphate. The weak acid catalysts also include mono(2-(meth)acryloyloxyethyl) acid phosphate.

The curing catalysts are used in an amount of 0.001 to 10%, preferably 0.001 to 5%, based on the weight of the polyester oligomer.

In order to effectuate the effects of the present composition, compounds having a functional group selected from the group consisting of a hydroxyl group, a blocked hydroxyl group, a hydrolyzable silyl group, an epoxy group, and the like can be used in the coating composition as a reaction diluent, together with the present oligomers.

Such compounds include compounds having an alicyclic epoxy group, such as Celloxide 2021, 2081 and 2083 (manufactured by Daisel Ltd.), compounds having a hydrolyzable silyl group and an epoxy group, such as TSL8350 (manufactured by Toshiba Silicon Co., Ltd), and compounds having a hydroxyl group such as octyl alcohol and 1,5-pentanediol. The viscosity of these compounds is 500 cps or lower at 25° C., preferably 300 cps at 25° C. When the viscosity is larger than 500 cps, they cannot act as a reaction diluent.

The present resin composition can be used as it is, or in a combination thereof with various pigments (such as coloring pigments or brightening agents), anti-sagging agents or anti-settling agents, leveling agents, dispersants, anti-foaming agents, ultraviolet ray-absorbing agents, light stabilizers, anti-static agents, thinners and the like, which are conventionally used in the coating field.

The preferred examples of the pigments or brightening agents include titanium oxide, carbon black, precipitatable barium sulfate, calcium carbonate, talc, kaolin, silica, mica, aluminium, blood red, lead chromate, lead molybdate, chromium oxide, cobalt aluminate, azo pigments, phthalocyanine pigments, and anthraquinone pigments.

The preferred examples of the anti-sagging agents or anti-settling agents include bentonite, castor oil wax, amide wax, microgel and alumium acetate.

The preferred examples of the leveling agents include silicon-type agents such as KF69, KP321 and KP301 (manufactured by The Shin-Etsu Chemical Co., Ltd.), Modaflow (manufactured by Mitsubishi Monsant), BYK358 (manufactured by BYK Chemie Japan KK), and Diaaid (manufactured by Mitsubishi Rayon Co., Ltd.).

The preferred examples of the dispersants include Anti-Terra U, Anti-Terra P and Disperbyk 101 (manufactured by BYK-Chemie Japan KK).

The preferred examples of the anti-foaming agents include BYK-O (manufactured by BYK Chemie Japan KK).

The preferred examples of the ultraviolet ray-absorbing agents include benzotriazol-type ultraviolet ray-absorbing agents such as Tinuvin 900, Tinuvin 384 and Tinuvin P (manufactured by Chiba Geigy) and oxalic anilide-type ultraviolet ray-absorbing agents such as Sanduvor 3206 (manufactured by Sandoz KK).

The preferred examples of the light stabilizers include hindered amine light stabilizers such as Sanol LS292 (manufactured by Sankyo Co., Ltd.) and Sanduvor 3058 (manufactured by Sandoz KK).

The thinners include aromatic compounds such as toluene, xylene and ethylbenzene; alcohols such as methanol, ethanol, propanol, butanol and isobutanol; ketons such as acetone, methylisobutyl ketone, methylamyl ketone, cyclohexanone, isophorone and N-methylpyrrolidone; esters such as ethyl acetate, butyl acetate and methyl cellosolve; and mixtures thereof.

The anti-static agents include Esocard C25 (manufactured by Lion Armor).

The present resin composition is useful for coating compositions, especially for clear coatings, interlayer coatings, solid color coatings and base coatings.

The present coating composition is useful for interlayer coating, solid color coating, clear coating and base coating for, in particular, the coatings of automobiles. Especially, the present coating composition is suitable for an interlayer coating. The present coating composition may be coated as an interlayer coating, base coating and clear coating in this order, or as a solid color coating and clear coating. Further, the present coating composition may be used as an interlayer coating and the conventional organic type or aqueous type coating composition is coated on the interlayer coating as base coating and clear coating, in a state of wet-on-wet. In addition, the present coating composition can be used as a base coating and the conventional clear coating composition can be coated thereon. Also, the present coating composition can be coated on the conventional base coating as a clear coating in a state of wet-on-wet. In this case, the base coating composition preferably includes oligomers having a hydroxyl group and a weight average molecular weight of 6000 or lower and a melamine resin. Such base coating composition may be of organic type and aqueous type. Further, the base coating composition preferably has a solid content of 35 wt. % or higher, in particular 40 wt. % or higher.

The present composition has a low viscosity, even though the organic solvent content is small. Accordingly, the solid content of the coating composition can be made much higher than the conventional ones and can keep a suitable viscosity for coating compositions. For example, the content of the organic solvent can be reduced to 40% or less, preferably 35% or less, much preferably 30% or less. Alghough the lower limit is 0%, it is preferable that the solvent content is 5% in view of coating properties.

It is preferable that the present coating composition should be coated while the substrate to be coated is rotated about a horizontal axis, in order to prevent the sagging even when the coating composition is coated with higher thickness, while the surface smoothness is improved. For example, even when the present coating composition is coated or baked and dried as the substrate to be coated, such as an automobile body, is vertically fixed and the substrate is horizontally rotated as disclosed in J.P. Kokai No. 63-178871, the composition can be coated with a thicker coating than the limit thickness which is a thickness such that the coating starts to form sagging at static condition.

More specifically, the present low solvent content type-coating composition is coated to the substrate which is supported rotatably about substantially horizontal axis so that the coating thickness is thicker than that which usually forms sagging on a vertically extending surface, and then dried to cure in such a manner that the substrate is started to rotate about the substantially horizontal axis before the sagging of the coating composition on the substrate is caused with gravity and so that the rotation is made at such a speed that the surface of the substrate is changed from the substantially vertical position to the substantially horizontal position before the sagging of the coating composition is caused with gravity and at such a speed that the sagging of the coating composition is not caused with centrifugal force caused by the rotation. The rotation is preferably continuous rotation, because the sagging is effectively prevented. The rotation speed is usually 0.2 to 120 rpm, preferably 5 to 20 rpm. When the speed is 0.2 rpm or less, the sagging prevention effect is small. When the speed is 120 rpm or larger, the sagging is easy to be formed with centrifugal force. The rotation may be reversed in the manner of 90°→135°→160° in this order.

The coated composition on the substrate is set (usually without any heating device) or baked (with heating device) and transferred in a vertical direction, while the rotation is made about a horizontal axis, whereby forming coating.

The setting (drying) is made usually at room or ambient temperature for usually 5 to 30 min., preferably 10 to 15 min. The baking is suitably made at 60 to 200° C., preferably 80 to 160° C., for 1 to 60 min., preferably 10 to 40 min.

The present coating composition can be coated by hot spraying, so that the solvent content of the composition can be further reduced. Such hot spray can be made so that temperatures between the storage tank for the composition and the portion just before the hot spray is maintained at a prescribed temperature, usually 30 to 80° C., preferably 35 to 70° C.

The present coating composition provides excellent coating properties such as gasoline resistance, scuff resistance, acid resistance and water resistance, as well as improved coating appearance, and reduces the organic solvent content much lower than the conventional ones. For example, the present composition reduces the organic solvent content to 40% or less, preferably 35% or less, much preferably 30% or less. Therefore, the present composition can much reduce the problem of the environmental pollution caused by the release of organic solvents.

The present invention also relates to a process for coating a low solvent content type-coating composition (A) on a undried coating composition (B) by a wet-on-wet coating, the coating composition (A) comprising (1) at least one of vinyl oligomers having an acid anhydride group and/or a blocked carboxyl group and an epoxy group as essential groups, a number average molecular weight (Mn) of 700 to 1500, a weight average molecular weight (Mw) of 700 to 3000, and a ratio of a weight average molecular weight/a number average molecular weight (Mw/Mn) of 1.0 to 2.0, wherein the acid anhydride group and/or blocked carboxyl group and the epoxy group may be on the same or different oligomers; and (2) a basic curing catalyst, and having an organic solvent content of 0 to 35%; and the coating composition (B) comprising (1) a vinyl oligomer having a hydroxyl group and/or a blocked hydroxyl group, a number average molecular weight (Mn) of 700 to 2500, a weight average molecular weight (Mw) of 700 to 7500, and a ratio of a weight average molecular weight/a number average molecular weight (Mw/Mn) of 1.0 to 3.0; (2) a melamine resin containing 50 to 100% of an imino type or methylol type mononucleus melamine having the formula (9) above, but wherein $R^1$ to $R^6$ may be the same as or different from each other and each represents a hydrogen atom, a methylol group or an alkoxy group having C1–5, provided that all of $R^1$ to $R^6$ are not an alkoxy group at the same time; and (3) a weak acidic catalyst.

The vinyl oligomers used in the low solvent content type-coating composition (A) have an acid anhydride group and/or a blocked carboxyl group and an epoxy group as essential groups.

The acid anhydride group is expressed by the formula: —CO—O—CO—.

The blocked carboxyl group is expressed by the following formula(10).

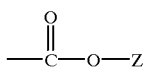

In the formula above, Z means a block group attached to the hydroxyl group of the carboxyl group and derived from the blocking agent. The group Z is preferably the following block groups.

[1] Silyl Block Group:

The silyl block group is preferably a group having the following formula (11):

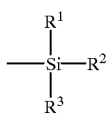

In the formula (11) above, $R^1$–$R^3$ are independently an alkyl or aryl group. The alkyl group includes a linear or branched alkyl group having 1–10 carbon atoms. The preferred alkyl groups include lower alkyl groups having 1–8 carbon atoms, such as a methyl group, an ethyl group, a propyl group, a butyl group, an s-butyl group, a t-butyl group, a pentyl group and a hexyl group. The aryl group includes a phenyl group, a naphthyl group and indenyl group, which may be substituted with a substituent. The preferred aryl group is a phenyl group.

The silyl block group represented by the formula (11) includes trimethylsilyl, diethylmethylsilyl, ethyldimethylsilyl, butyldimethylsilyl, butylmethylethylsilyl, phenyldimethylsilyl, phenyldiethylsilyl, diphenylmethylsilyl and diphenylethylsilyl. In particular, the lower the molecular weight of $R^1$–$R^3$, the lower the volatile content, and therefore it is preferable in view of the reduction of the amount of the organic solvent.

The blocking agent for forming such silyl block group preferably includes halogenated silanes. The halogen atom used for the halogenation includes a chlorine atom and a bromine atom. The examples of the blocking agents include trimethylsilyl chloride, diethylmethylsilyl chloride, ethyldimethylsilyl chloride, butyldimethylsilyl bromide and butylmethylethylsilyl bromide.

[2] Viny Ether Block Group:

The The vinyl ether block group is preferably a group having the following formula (12):

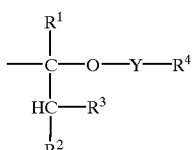

In the formula above, $R^1$, $R^2$ and $R^3$ are independently a hydrogen atom or a hydrocarbon group having 1–18 carbon atoms. $R^4$ is a hydrocarbon group having 1–18 carbon atoms. $R^3$ and $R^4$ may be combined to form a heterocyclic ring containing Y as a heteroatom. Y is an oxygen atom or a sulfur atom.

The hydrocarbon group includes an alkyl group, a cycloalkyl group and an aryl group. The alkyl group, preferably lower alkyl groups having 1–8 carbon atoms, such as a methyl group, an ethyl group, a propyl group, a butyl group, an s-butyl group, a t-butyl group, a pentyl group and a hexyl group. The cycloalkyl group preferably includes a cyclopentyl group and a cyclohexyl group. The aryl group preferably includes a phenyl group, a naphthyl group and an anthracene group, which may have a substituent.

The vinyl ether block group can be prepared by reacting a hydroxyl group with an aliphatic vinyl ether or thioether or a cyclic vinyl ether. The aliphatic vinyl ether includes methylvinyl ether, ethylvinyl ether, isopropyl vinyl ether, n-propyl vinyl ether, isopropyl vinyl ether, 2-ethylhexyl vinyl ether and cyclohexyl vinyl ether, or vinyl thioether corresponding to these vinyl ethers. The cyclic vinyl ether includes 2,3-dihydrofuran, 3,4-dihydrofuran, 2,3-dihydro-2H-pyran, 3,4-dihydro-2H-pyran, 3,4-dihydro-2-methoxy-2H-pyran, 3,4-dihydro-4,4-dimethyl-2H-pyran, 3,4-dihydro-2-ethoxy-2H-pyran, and 3,4-dihydro-2H-pyran-2-carboxylic acid.

The epoxy group includes acyclic epoxy group and alicyclic epoxy group. The acyclic epoxy group includes those epoxy groups wherein an epoxy bond is formed by an oxygen atom between the carbon atoms in the alkyl group, such as 1,2-epoxy group and 1,3-epoxy group. The alicyclic epoxy group is an epoxy group wherein an oxygen atom is bound to the two adjacent carbon atoms of the five or six-membered alicyclic ring (including bridged carbon-containing hydrocarbons). In this case, since the alicyclic epoxy group is less in the curing reactivity by a basic curing catalyst than the acyclic epoxy group and, therefore, the use of the acyclic epoxy group is practically preferable.

The vinyl oligomers used in the coating composition (A) have a number average molecular weight (Mn) smaller than 700, the formability of the coating is reduced, the strength of the resultant coating is reduced and the gasoline resistance and scuff resistance of the resultant coating are reduced. On the other hand, when the Mn is larger than 1500, the viscosity of the coating composition increases to much degree. The preferred Mn is 700 to 1200.

The Mw/Mn ratio of the vinyl oligomers used in the coating composition is 1.0 to 2.0. When the Mw/Mn ratio is larger than 2.0, the relative proportions of the oligomers having a too large and too small molecular weights become large and, therefore, there appear the problems encountered when the oligomers having too large and too small molecular weights are employed. The preferred Mw/Mn ratio is 1.9 or less. In this connection, the lower limit for the Mw/Mn ratio is 1.0. The smaller the molecular weight of the oligomers is within the range of the present invention, the easier the Mw/Mn approaches 1.0. In such a case, the oligomers having very uniform properties can be obtained.

The Mw of the oligomers is 700 to 2500, in accordance with the Mw/Mn ratio as stated above. The Mw of the oligomers is preferably 700 to 2000.

The vinyl oligomer used in the coating composition (A) can be prepared by polymerizing or co-polymerizing monomers having a radically polymerizable unsatuated bond group. For example, when the vinyl oligomers are synthesized from acrylic acid or methacrylic acid monomers, acrylic oligomers are obtained.

The vinyl oligomers used in the coating composition contain one or more acid anhydride groups or blocked carboxyl groups and epoxy groups in a molecule. The acid anhydride or blocked carboxyl groups and epoxy groups may be present in the same oligomers or in different oligomers.

The number of the acid anhydride or blocked carboxyl groups in a molecule varies depending on the molecular weight of the vinyl oligomers, but preferably 1 to 5. When the number is less than 1, the scuff resistance and gasoline resistance of the resultant coating are reduced and therefore, such number is not suitable. On the other hand, when the number is larger 5, the viscosity of the composition becomes large and, therefore, such number is not suitable. The preferred number is 2 to 4.

The number of the epoxy groups in a molecule varies depending on the molecular weight of the vinyl oligomers, but preferably 1 to 5, much preferably 2 to 4. When the number is less than 2, the strength of the resultant coating is reduced and, therefore, such number is not suitable. On the other hand, when the number is larger than 5, the viscosity of the composition becomes large and the resultant coating is brittle and, therefore, such number is not suitable.

In the coating composition (A), the acid anhydride forms a carboxyl group in the presence of water content or water (hereinafter referred to merely "water content") in the atmosphere. When there is any amount of a carboxyl group in the coating composition in the presence of water content, such carboxyl group functions as a catalyst and the blocked carboxyl group removes the blocking agent and generate a free carboxyl group. Also, even in case where there is no such carboxyl group, when weak acids or their anhydrides e.g., phosphoric acid are present in the composition, as a catalyst, the blocked carboxyl group releases the blocking agent and generate a free carboxyl group. The free carboxyl group derived from the acid anhydride group or blocked carboxyl group reacts with an epoxy group to form an ester bond and cross-link the vinyl oligomers (curing), as well as to produce a secondary hydroxyl group derived from the epoxy group. In case where an acid anhydride is present, the secondary hydroxyl group reacts with an acid anhydride group to form an ester bond and cure the vinyl oligomers in the same manner as above.

The vinyl oligomers used in the coating composition (A) may also contain a functional group selected from the group consisting of a silanol group, a hydrolyzable silyl group which produces a silanol group by hydrolysis, a hydroxyl group and a blocked hydroxyl group, as well as the essential groups of the vinyl oligomers, an acid anhydride group or blocked carboxyl group and an epoxy group. In addition, the coating composition (A) may also contain vinyl oligomers having no acid anhydride group or blocked carboxyl group and no epoxy group but containing a functional group selected from the group consisting of a silanol group, a hydrolyzable silyl group, a hydroxyl group and a blocked hydroxyl group, together with the vinyl oligomers having an acid anhydride group or blocked carboxyl group and an epoxy group.

The silanol group reacts with a hydroxyl group to form an Si—O bond. The hydrolyzable silyl group produces a silanol group in the presence of water content and preferably in the presence of a dissociation catalyst such as phosphoric acid, carboxylic acid, dibutyltin dilaurate, dimethyltin dichloride and dibutyltin dimaleate. The resultant silanol group reacts with a hydroxyl group in the same manner as above, to form an Si—O bond. Further, the silanol groups react with each other to form an Si—O—Si bond.

The Si—O bond and Si—O—Si bond improve the strength and flexibility of the resultant coating.

The hydroxyl group reacts with an acid anhydride group to form a carboxyl group which react with an epoxy group. The blocked hydroxyl group generates a hydroxyl group by the dissociation catalytic function of, e.g., Bronsted acids such as phosphoric acid and carboxylic acids. The resultant hydroxyl group will generate a carboxyl group in the same manner as stated above.

The blocking of the silanol group and a hydroxyl group inhibits the polarity thereof and, therefore, a low viscosity coating composition can be prepared even though the amount of organic solvents is reduced.

The combinations of the functional groups incorporated into one molecule of the oligomer include:

(1) oligomers containing an acid anhydride group and/or a blocked carboxyl group:

In this case, the following combinations are included.

A combination of an acid anhydride group and/or a blocked carboxyl group, with a silanol group and/or a hydrolyzable silyl group, a combination of an acid anhydride group and/or a blocked carboxyl group, with a hydroxyl group and/or a blocked hydroxyl group, and a combination of an acid anhydride group and/or a blocked carboxyl group, with a silanol group group and/or a hydrolyzable silyl group and a hydroxyl group and/or a blocked hydroxyl group.

(2) oligomers containing an epoxy group:

In this case, the following combinations are included.

A combination of an epoxy group with a silanol group and/or a hydrolyzable silyl group, a combination of an epoxy group with a hydroxyl group and/or a blocked hydroxyl group, and a combination of an epoxy group with a silanol group group and/or a hydrolyzable silyl group and a hydroxyl group and/or a blocked hydroxyl group.

(3) oligomers containing an acid anhydride group and/or a blocked carboxyl group and an epoxy group:

In this case, the following combinations are included.

A combination of an acid anhydride group and/or a blocked carboxyl group and an epoxy group, with a silanol group and/or a hydrolyzable silyl group, a combination of an acid anhydride group and/or a blocked carboxyl group and an epoxy group, with a hydroxyl group and/or a blocked hydroxyl group, and a combination of an acid anhydride group and/or a blocked carboxyl group and an epoxy group, with a silanol group and/or a hydrolyzable silyl group and a hydroxyl group and/or a blocked hydroxyl group.

In case where an acid anhydride group or a blocked carboxyl group is present in an oligomer different from that wherein an epoxy group is present, optional functional groups which can be used together with an acid anhydride group include a hydrolyzable silyl group and/or a blocked hydroxyl group and optional functional groups which can be used together with a blocked carboxyl group include a silanol group and/or a hydrolyzable silyl group and/or a hydroxyl group and/or a blocked hydroxyl group, and further optional functional groups which can be used together with an epoxy group include a silanol group and/or a hydrolyzable silyl group and/or a hydroxyl group and/or a blocked hydroxyl group.

The amount (in respect of mole/Kg-resin) of an acid anhydride group and/or a blocked carboxyl group of the vinyl oligomers is generally 1 to 5 mole/Kg-resin, preferably 2 to 4 mole/Kg-resin. When the amount is less than 1 mole/Kg-resin, the scuff resistance and gasoline resistance of the resultant coating are reduced and, therefore, such amount is not suitable. On the other hand, when the amount is larger than 5 mole/Kg-resin, the viscosity of the coating composition is too large and, therefore, such amount is not suitable.

The amount (in respect of mole/Kg-resin) of an epoxy group of the vinyl oligomers is generally 1 to 5 mole/Kg-resin, preferably 2 to 4 mole/Kg-resin. When the amount is less than 1 mole/Kg-resin, the scuff resistance and gasoline resistance of the resultant coating are reduced and, therefore, such amount is not suitable. On the other hand, when the amount is larger than 5 mole/Kg-resin, the viscosity of the coating composition is too large and, therefore, such amount is not suitable.

The amount (in respect of mole/Kg-resin) of a silanol group and/or a hydrolyzable silyl group of the vinyl oligomers as an optional functional group is generally 0 to 15 mole/Kg-resin, preferably 0 to 12 mole/Kg-resin. Incidentally, when the amount is larger than 15 mole/Kg-resin, the cross-linking density of the resultant coating is too large and the coating is brittle and, therefore, such amount is not suitable.

The amount (in respect of mole/Kg-resin) of a hydroxyl group and/or a blocked hydroxyl group of the vinyl oligomers as an optional functional group is generally 0 to 5 mole/Kg-resin, preferably 0 to 4 mole/Kg-resin. Incidentally, when the amount is larger than 15 mole/Kg-resin, the viscosity of the coating composition is too large and, therefore, such amount is not suitable.

The amount ratio (in respect of mole/Kg resin) per oligomer molecule between the acid anhydride group and/or blocked carboxyl group and an epoxy group is suitably 0.7~1.3:1.0, preferably 0.8~1.2:1.0. When the amount of the acid anhydride group and/or blocked carboxyl group is smaller than 0.7~1.0, the cross-linking density of the resultant coating is small and the scuff resistance and gasoline resistance of the coating are reduced. On the other hand, when the amount of the acid anhydride group and/or blocked carboxyl group is larger than 1.3:1.0, a carboxyl group remains in the coating and, therefore, the water resistance of the resultant coating is reduced.

The total number of the functional groups contained in the present oligomer molecule is 2 to 5 moles/Kg-resin, preferably 3 to 4 moles/Kg-resin, in case where a silanol group or a hydrolyzable silyl group is not contained in the oligomer. When the total number is less than 2 moles/Kg-resin, the cross-linking density becomes small and the strength and flexibility of the resultant coating are reduced and, therefore, the coating properties such as the impact resistance, scuff resistance, gasoline resistance and chipping resistance of the resultant coating are reduced. On the other hand, when the total number is more than 5 moles/Kg-resin, the cross-linking density becomes too large and, therefore, the coating properties are deteriorated as in case where the resultant coating becomes brittle. In case where a silanol group or a hydrolyzable silyl group is contained in the oligomer, the total number of the functional groups in the oligomers is 2 to 15 moles/Kg-resin, preferably 3 to 12 moles/Kg-resin. When the total number is less than 2 moles/Kg-resin, the cross-linking density becomes small. On the other hand, when the total number is more than 15 moles/Kg-resin, the cross-linking density becomes too large and, therefore, the resultant coating becomes brittle. In this connection, when the total number is selected, it is necessary to consider the relation between the total number and the molecular weight of the oligomer. More specifically, when the molecular weight of the oligomer is small, there are generated vinyl oligomers having no functional groups if the total number of the functional groups is not high. In such a case, the coating performance of the resultant coating cannot be fully utilized. In case where the molecular weight of the oligomers is high, it makes viscous the coating composition and, therefore, such case is not suitable. In any event, the suitable combination of the molecular weight and the total number can be experimentally determined by a person skilled in the art.

The glass transition temperature (Tg) of the oligomer used in the coating composition (A) is preferably −35 to 40° C., much preferably −10 to 30° C. When the Tg is higher than 40° C., the coating viscosity becomes too high and, therefore, such Tg is not suitable. On the other hand, when Tg is lower than −35° C., the resutant coating becomes too soft and the gasoline resistance of the resultant coating becomes low, and therefore such Tg is not suitable.

The vinyl oligomers containing, in a molecule, a functional group selected from the group consisting of a silanol group, a hydrolyzable silyl group, a hydroxyl group and a blocked hydroxyl group, together with an acid anhydride group and/or a blocked carboxyl group and an epoxy group have the Mn, Mw and Mw/Mn ratio which are within the ranges as defined for the present vinyl oligomers.

The Mn of the oligomers containing only a silanol group and/or a hydrolyzable silyl group, or containing a silanol group and/or a hydrolyzable silyl group and a hydroxyl group and a blocked hydroxyl group is generally 600 to 3000, preferably 700 to 2000. When the Mn is smaller than 600, the scuff resistance and gasoline resistance of the resultant coating are reduced. On the other hand, when the Mn is larger than 3000, the viscosity becomes too high and, therefore, such Mn is not suitable. In addition, the Mw/Mn ratio of the oligomers is generally 1.0 to 2.0. When the Mw/Mn ratio is larger than 2.0, the relative proportions of the oligomers having a too large and too small molecular weights become large and, therefore, there appear the problems encountered when the oligomers having too large and too small molecular weights are employed. The Mw is generally 600 to 6000, preferably 700 to 3800.

The Mn of the oligomers containing only a hydroxyl group and/or a blocked hydroxyl group is generally 700 to 1500, preferably 700 to 1200. In this case, the Mw/Mn ratio is generally 1.0 to 2.0 and the Mw is generally 700 to 3000, preferably 700 to 2000.

The vinyl oligomers having an acid anhydride group and/or a blocked carboxyl group and an epoxy group as essential functional groups can be prepared by the (co) polymerization of monomers having an acid anhydride group or a blocked carboxyl group or an epoxy group. The polymerization of the monomers can be carried out by the conventional methods. For example, the polymerization can be carried out by ionic polymerization such as anionic polymerization and cationic polymerization, or radical polymerization. Among those polymerization methods, the radical polymerization is preferred in view of the easiness of the polymerization. In this connection, since the vinyl oligomers having a lower molecular weight must be prepared for the present invention, it is preferable, for example, that mercaptans such as mercaptoethanol, thioglycerol and lauryl mercaptan or chain transfer agents should be used in the polymerization, or that the polymerization should be carried out at a relatively high temperature such as 140 to 180° C., or that the monomer concentration should be lowered.

The radical polymerization should be preferably carried out in solutions. The solvents used for such polymerization may be any solvents conventionally used for the radical polymerization of acrylic monomers in solutions. The solvents include toluene, xylene, butyl acetate, methylethyl ketone, methylisobutyl ketone and solvesso 100 (manufactured by Exxon).

The radical initiator used for the radical solution polymerization may be any initiators conventionally used for the radical polymerization. The initiator includes peroxides such as benzoyl peroxide, lauroyl peroxide, t-butyl hydroperoxide and t-butylperoxy-2-ethylhexanol and azo compounds such as azobis-valeronitrile, azobis-isobutyronitrile and azobis(2-methypropiononitrile).

Monomers having an acid anhydride group and a radically polymerizable unsaturated bond group are preferably used as the monomers having an acid anhydride group.

As a radically polymerizable unsaturated bond group, preferred are radically polymerizable vinyl groups represented by the formula: CH $R^1$=$CR^2$— wherein $R^1$ and $R^2$ are independently a hydrogen atom, an alkyl gorup or a single bond. The alkyl group may be linear or branched and includes those alkyl groups of C1 to 20, such as methyl, ethyl, propyl and butyl groups.

The monomers having an acid anhydride group and a radically polymerizable unsaturated bond group include monomers which form an internal acid anhydride group, such as itaconic anhydride and maleic anhydride, and monomers produced by condensing monomers having, in a molecule, a radically polymerizable unsaturated bond group and a carboxyl group and compounds having a carboxyl group, according to the dehydration reaction or de-alcoholation reaction. The compounds having a carboxyl group may be those compounds which may or may not contain a radically polymerizable unsaturated bond group, and include methacrylic anhydride and monomers produced by condensing divalent monoesters of polybasic acids such as monoalkylesters of maleic acid or itaconic acid by the de-alcoholation reaction.

As the monomers having a blocked carboxyl group, preferred are monomers having a blocked carboxyl group and a radically polymerizable unsaturated bond group. Such monomers include monomers produced by blocking monomers having a carboxyl group and a radically polymerizable unsaturated bond group with the above blocking agents.

The monomers having a carboxyl group and a radically polymerizable unsaturated bond group may contain plural carboxyl groups. The monomers containing a single carboxyl group preferably include (meth)acrylic acid. The monomers containing two carboxyl groups preferably include itaconic acid, maleic acid, mesaconic acid and fumalic acid. They may be compounds produced by reacting an acid anhydride such as maleic anhydride and itaconic anhydride, with alcohols of C1 to 18 or amines. Such alcohols include alcohols such as methanol, ethanol, propanol and butanol. When the carbon number of the alcohols is larger than 18, the plasticity of the resultant coating becomes too large and, therefore, such carbon number is not suitable.

Such amines include aliphatic amines such as dibutylamine, dihexylamine, methylbutylamine, ethylbutylamine and n-butylamine and aromatic amines such as aniline and toluidine.

The monomers containing a carboxyl group include hydroxy acids having a radically polymerizable unsaturated bond group. Such hydroxyl acids may be produced by reacting an acid anhydride with monomers containing a hydroxyl group and a radically polymerizable unsaturated bond group. For example, they can be produced by reacting 4-methylhexahydrophthalic anhydride, succinic anhydride, maleic anhydride, trimellitic anhydride and phthalic anhydride, with hydroxyalkyl (meth)acrylates such as 2-hydroxyethyl (meth)acrylate.

As monomers containing an epoxy group, preferred are those monomers containing, in a molecule, an epoxy group and a radically polymerizable unsaturated bond group.

Such monomers containing an epoxy group and a radically polymerizable unsaturated bond group include epoxy group-containing monomers such as glycidiy (meth) acrylates and 3,4-epoxycyclohexyl (meth) acrylates.

In the polymerization of the monomers having an acid anhydride group or a blocked carboxyl group or an epoxy group, other α, β-ethylenically unsaturated monomers may be used. Such other α, β-ethylenically unsaturated monomers include the following monomers:

(1) esters of acrylic or methacrylic acid;

For example, C1–18 alkyl esters of acrylic or methacrylic acid, such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; C2–18 alkoxy alkyl esters of acrylic or methacrylic acid, such as methoxybutyl acrylate, methoxybutyl methacrylate, methoxy ethyl acrylate, methoxy ethyl methacrylate, ethoxy butyl acrylate and ethoxy butyl methacrylate; C2–8 alkenyl esters of acrylic or methacrylic acid, such as allyl acrylate and allyl methacrylate; C3–18 alkenyloxyalkyl esters of acrylic or methacrylic acid, such as allyloxyethyl acrylate and allyloxyethyl methacrylate.

(2) vinyl aromatic compound;

For example, vinyl acetate, hexafluoropropylene, tetrafluoropropylene, styrene, α-methyl styrene, vinyltoluene and p-chlorostyrene.

(3) polyolefin compounds;

For example, butadiene, isoprene and chloroprene.

(4) allyl ethers;

For example, hydroxy ethyl allyl ether.

(5) others;

For example, methacrylamide, acrylamide, diacrylamide, dimethacrylamide, acylonitrile, methacrylonitrile, methyl isopropenyl ketone, vinyl acetate, vinyl propionate, vinyl pivalate, acrylic acid, methacrylic acid, N,N-dialkylaminoalkyl(meth)acrylate, phosphoric acid-containing (meth)acrylate such as phosphonoxyethyl (meth) acrylcate, perfluorovinyl ether such as trifluoromethyl vinyl ether, and vinyl ethers such as hydroxyethyl vinyl ether and hydroxybutyl vinyl ether.

The silanol group which may be used as an optional functional group can be represented by the following formula (13):

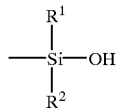
(13)

In the formula, $R^1$ and $R^2$ may be the same as or different from each other and are a hydroxyl group, an alkyl group, an alkoxy group, —$NR^1R^2$ group ($R^1$ and $R^2$ are an alkyl group or an aryl group), —$NR^1COR^2$ ($R^1$ and $R^2$ are an alkyl group or an aryl group), —$COR^1$ group ($R^1$ is an alkyl group or an aryl group), —$OCOR^1$ group ($R^1$ is an alkyl group or an aryl group), an aryl group, —$ONR^1R^2$ group ($R^1$ and $R^2$ are an alkyl group or an aryl group), or —$ONCR^1R^2$ group ($R^1$ and $R^2$ are an alkyl group or an aryl group).

The alkyl group includes a linear or branched alkyl group having 1–10 carbon atoms, such as a methyl group, an ethyl group, a propyl group, an isopropyl group, a butyl group, an isobutyl group, an s-butyl group, a t-butyl group and a pentyl group. The alkoxy group includes those alkoxy groups whose alkyl moiety is the same as the above alkyl group. The aryl group includes a phenyl group which may be substituted with a substituent. The substituent includes a halogen atom, an alkyl group, an alkoxy group and the like. The halogen atom as a substituent includes a fluorine atom, a chlorine atom, bromine atom, and an iodine atom. The alkyl group as a substituent includes a linear and branched alkyl groups having 1–10 carbon atoms, such as a methyl group, ethyl group, propyl group, isopropyl group, butyl group, isobutyl group, s-butyl group, t-butyl group, and pentyl group. The alkoxy group as a substituent includes those alkoxy groups whose alkyl moiety corresponds to the alkyl group as stated above. The prefered substituent includes a halogen atom such as a fluorine atom and a lower alkyl group having 1–5 carbon atoms.

The hydrolyzable silyl group is a silanol group blocked with a hydrolyzable group and is generally represented by the following formula (14):

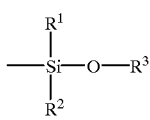
(14)

In the formula (14) above, $R^1$ and $R^2$ are the same as those of the formula (13); and $R^3$ is an alkyl group, —$NR^1R^2$ group ($R^1$ and $R^2$ are an alkyl group or an aryl group), —$COR^1$ group ($R^1$ is an alkyl group or an aryl group), an aryl group, —$NR^1R^2$ group ($R^1$ and $R^2$ is an alkyl group or an aryl group), and —$NCR^1R^2$ group ($R^1$ and $R^2$ are an alkyl group or an aryl group).

The vinyl oligomers having such a silanol group or a hydrolyzable silyl group can be prepared by (co) polymerizing monomers having such functional groups. As such monomers, various monomers can be suitably selected to be used. For example, preferred are vinyl monomers having a silanol group or a hydrolyzable silyl group and a radically polymerizable unsaturated bond group. The radically polymerizable unsaturated bond group includes the following groups:

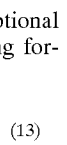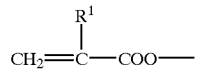
(15)

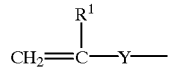
(16)

(17)

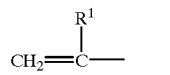
(18)

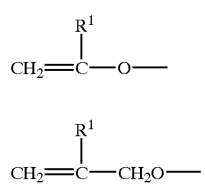
(19)

In the formulae (15) to (19) above, $R^1$ is a hydrogen atom or an alkyl group having 1–6 carbon atoms, and Y is a phenylene group.

The alkyl group may be linear or branched and includes methyl, ethyl, propyl, n-butyl, s-buty, t-butyl, n-pentyl, s-pentyl, hexyl, n-heptyl, s-heptyl, octyl, nonyl, decyl and undecyl groups. The preferred akyl groups include methyl and ethyl groups.

The monomers having the radically polymerizable unsaturated bond represented by the formula (15) are preferably the following ones.

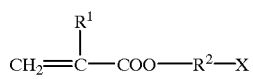 (20)

In the formula (20), $R^1$ is defined above, $R^2$ is a bivalent aliphatic hydrocarbon group, X is a silanol group or a hydrolyzable silyl group represented by the formulae (13) or (14).

The bivalent aliphatic hydrocarbon group as $R^2$ includes an alkylene group, a cycloalkylene group and an arylene group.

The alkylene group includes a linear or branched alkylene group, such as a methylene group, an ethylene group, a propylene group, a butylene group, an isobutylene group and a hexamethylene group. The cycloalkylene group includes a cyclopentylene group and a cyclohexylene group. The arylene group includes o-, m- or p-phenylene group, a naphthalene group, a fluorene group, an indolene group, an anthracene group, a furan group, and a thiophene group.

The examples of the monomers represented by the formula (20) include γ-(meth)acryloyloxypropyltrimethoxysilane, γ-(meth)acryloyloxypropyltriethoxysilane, γ-(meth)acryloyloxypropyltripropoxysilane, γ-(meth)acryloyloxypropylmethyldimethoxysilane, γ-(meth)acryloyloxypropylmethyldiethoxysilane, γ-(meth)acryloyloxypropylmethyldipropoxysilane, γ-(meth)acryloyloxybutylphenyldimethoxysilane, γ-(meth)acryloyloxyphenyldiethoxysilane, γ-(meth)acryloyloxyphenyldipropoxysilane, γ-(meth)acryloyloxypropyldimethylmethoxysilane, γ-(meth)acryloyloxypropyldimethylethoxysilane, γ-(meth)acryloyloxypropylphenylmethylmethoxysilane, γ-(meth)acryloyloxypropylphenylmethylethoxysilane, γ-(meth)acryloyloxypropyltrisilanol, γ-(meth)acryloyloxypropylmethyldihydroxysilane, γ-(meth)acryloyloxybutylphenyldihydeoxysilane, γ-(meth)acryloyloxypropyldimethylhydroxysilane and γ-(meth)acryloyloxypropylphenylmethylhydroxysilane.

The examples of the monomers represented by the formula (16) include the following monomers.

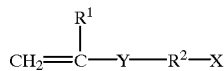 (21)

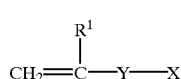 (22)

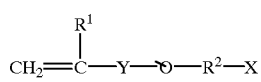 (23)

In the formulae, $R^1$, $R^2$, Y and X are defined above.

The examples of the monomers represented by the formulae (21) to (23) include the following monomers.

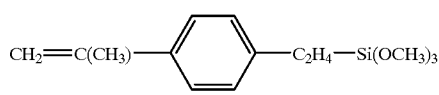

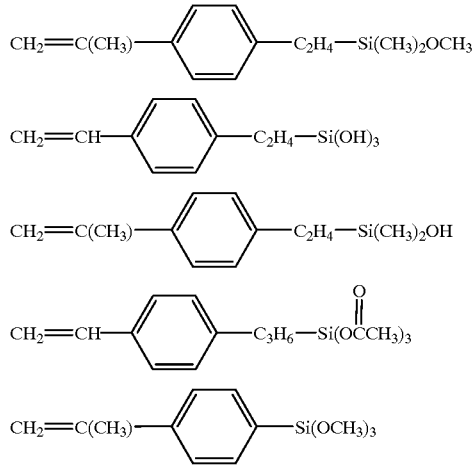

The monomers represented by the formula (17) include the following monomers.

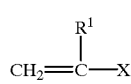 (24)

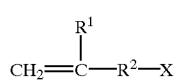 (25)

In the formulae above, $R^1$, $R^2$ and X are defined above. The examples of the monomers represented by the formulae (24) and (25) include the following monomers.

$CH_2=CH—Si(OCH_3)_3$
$CH_2=CH—Si(OC_2H_5)_3$
$CH_2=CH—Si(OCH_3)_2CH_3$
$CH_2=CH—Si(CH_3)_2OCH_3$
$CH_2=CH—CH—Si(OCH_3)_3$
$CH_2=CH—Si(OCOCH_3)_3$
$CH_2=CH—CH_2—Si(OCOCH_3)_3$
$CH_2=CH—Si(CH_3)_2—N(CH_3)_2$
$CH_2=CH—Si(CH_3)(C_6H_5)—N(CH_3)COCH_3$
$CH_2=CH—Si(C_6H_5)_2—ON(CH_3)_2$

The monomers represented by the formula (18) include the following monomers.

 (26)

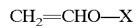 (27)

In the formulae above, $R^2$ and X are defined above. The examples of the monomers represented by the above formulae include the following monomers.

$CH_2=CHO—(CH_2)_3—Si(CH_3)_2—NHCOCH_3$
$CH_2=CHO—(CH_2)_2—Si(CH_3)_2OCH_3$
$CH_2=CHO—Si(CH_3)_2—OCN(CH_3)_2$
$CH_2=CHO—Si(CH_3)_2—ON(C_2H_5)_2$

The monomers represented by the formula (19) include the following monomers.

 (28)

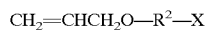 (29)

In the formulae above, $R^2$ and X are defined above. The examples of the monomers represented by the above formulae are as follows.

$CH_2=CHCH_2O—Si(C_2H_5)(C_6H_5)N(CH_3)_2$ $CH_2=CHCH_2O—Si(C_6H_5)_2NHCOC_2H_5$ $CH_2=CHCH_2O—(CH_2)_2—Si(OCH_3)(OCOCH_3)—OCOC_2H_5$ $CH_2=CHCH_2O—(CH_2)_2—Si(CH_3)(OC_2H_5)$

The oligomers having a silanol group or a hydrolyzable silyl group can be prepared by polymerizing the above monomers. The polymerization process is the same as those for the production of the vinyl oligomers having an acid anhydride group or blocked carboxyl group or an epoxy group. By polymerizing the monomers having a silanol group or hydrolyzable silyl group with monomers having an acid anhydride group or blocked carboxyl group or an epoxy group, the oligomers having, in a molecule, an acid anhydride group or blocked carboxyl group or an epoxy group and a silanol group or hydrolyzable silyl group can be synthesized. Further, the monomers having a silanol group or hydrolyzable silyl group can be used together with other α, β-ethylenically unsaturated monomers as stated in the production of the vinyl oligomers having an acid anhydride group or blocked carboxyl group or an epoxy group.

However, it is practically difficult to prepare the vinyl oligomers having, in a molecule, both a silanol group and a hydroxyl group. Also, it is practically difficult to prepare the vinyl oligomers having, in a molecule, both a silanol group and an acid anhydride group.

Monomers used for producing vinyl oligomers having a silanol group or hydrolyzable silyl group are preferably those monomers as represented by the formulae (15) and (16), in view of the improved appearance of the resultant coating and easiness of the polymerization. Polysiloxane macromers which are produced by polymerizing acrylic monomers with silane type monomers are also usable. Such polysiloxane macromers include the following compounds:

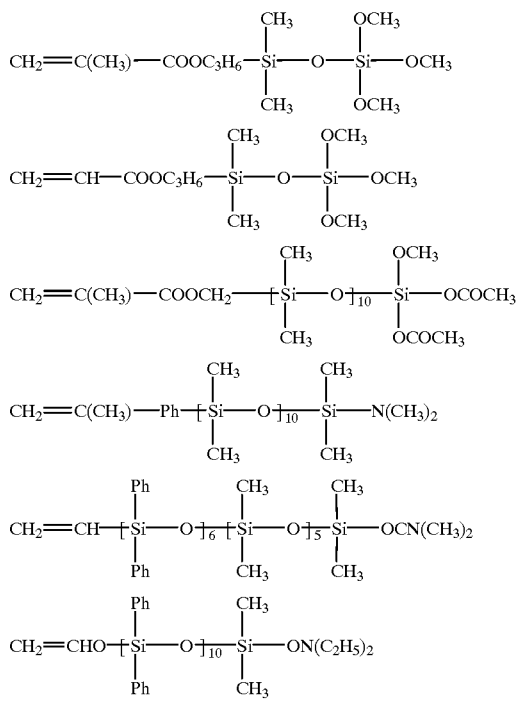

-continued

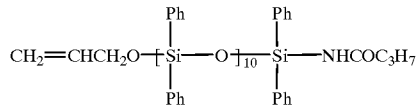

In the formulae above, Ph is a phenyl group.

The blocked hydroxyl group can be represented by the following formula.

—O—Z (30)

In the formula above, Z means a block group attached to the hydroxyl group and derived from the blocking agent. The group Z is the same as those stated concerning the blocked carboxyl group.

The hydroxyl group containing monomers used for producting the vinyl oligomers having a hydroxyl group or blocked hydroxyl group are preferably those monomers having a hydroxyl group or blocked hydroxyl group and a radically polymerizable unsaturated bond group.

Such hydroxyl group containing monomers include those monomers represented by the following formula (31).

(31)

In the formula above, $R^1$ is as defined in the formulae (15) to (19). $R^2$ is an alkylene group, a cycloalkylene group or an arylene group. Y is —COO—, a sigle bond or —O—. Especially, it is preferable that acrylic monomers having the formula above wherein Y is —COO— should be used.

The alkylene group includes a linear or branched alkylene group having 1–18 carbon atoms. The preferred alkylene group is lower alkylene group having 1–6 carbon atoms, such as a methylene group, an ethylene group, a propylene group, a butylene group, an isobutylene group, and a hexamethylene group. The cycloalkylene group is preferably those having C5–18, preferably C5–8, such as a cyclopentylene group and a cyclohexylene group. The arylene group includes o-, m- or p-phenylene group, a naphthalene group, a fluorene group, an indolene group, an anthracene group, a furan group, and a thiophene group.

The preferred hydroxyl group-containing monomers are hydroxyl group-containing acrylic monomers, such as 2-hydroxyethyl(meth)acrylate and 3-hydroxypropyl(meth)acrylate.

Monomers having a blocked hydroxyl group are preferably those monomers produced by blocking the hydroxyl group of the above hydroxyl group containing monomers.

The blocked hydroxyl group containing monomers having a hydroxyl group blocked with a silyl block group include trimethy lsiloxyethyl(meth)acrylate, trimethylsiloxypropyl(meth)acrylate, trimethylsiloxybutyl(meth)acrylate, triethylsiloxyethyl(meth)acrylate, tributysiloxypropyl(meth)acrylate and triphenylsiloxyethyl(meth)acrylate. The monomers having such silyl block group also include (meth) acrylamides having N-methylol group, β-hydroxyethyl(meth)acrylate which is modified with ε-caprolactone by the addition reaction thereof, and (meth)acrylate of polyoxyalkylene glycol whose hydroxyl group is blocked with a silyl block group.

The blocked hydroxyl group containing monomers having a hydroxyl group blocked with an aliphatic vinyl ether group include 1-alkyl-alkoxy-alkyl(meth)acrylates, such as 1-methylethoxyethyl(meth)acrylate, 1-ethylethoxyethyl (meth)acrylate, 1-butylethoxyethyl(meth)acrylate, 1-(2-ethylhexyl)ethoxyethyl(meth)acrylate, 1-isobutylethoxyethyl(meth) acrylate and cyclohexylethoxyethyl(meth)acrylate. The monomers also include (meth)acrylamides having N-methylol group, β-hydroxyethyl(meth)acrylate which is modified with ε-caprolactone by the addition reaction thereof, and (meth) acrylate of polyoxyalkylene glycol whose hydroxyl group is blocked with an aliphatic vinyl ether block group.

The blocked hydroxyl group-containing monomers having a hydroxyl group blocked with a cyclic vinyl ether include the following monomer.

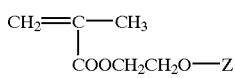
(32)

In the formula above, Z is a tetrahydrofuran group, a tetrahydropyran group or a group represented by the following formula (33).

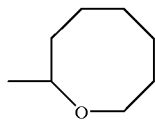
(33)

The oligomers having a hydroxyl group or a blocked hydroxyl group can be prepared by the polymerization of the above monomers. The polymerization process can be carried out in the same manner as the polymerization of the vinyl oligomers having an acid anhydride group or blocked carboxyl group or an epoxy group. Further, the oligomers having, in a molecule, a silanol group or a hydrolyzable silyl group and a hydroxyl group or a blocked hydroxyl group can be prepared by polymerizing the monomers having a hydroxyl group or a blocked hydroxyl group with the monomers having a silanol group or a hydrolyzable silyl group. Further, the oligomers having a hydroxyl group or a blocked hydroxyl group can be prepared by reacting the monomers having a hydroxyl group or a blocked hydroxyl group with an α, β-ethylenically unsaturated monomer as stated in relation to the production of the oligomers having an acid anhydride or blocked carboxyl group and an epoxy group.

However, it is practically difficult to produce vinyl oligomers having, in a molecule, a hydroxyl group and a silanol group as well as vinyl oligomers having, in a molecule, a silanol group and an acid anhydride group.

It is preferable that the vinyl oligomers should be prepared at 60 to 180° C., or 60 to 100° C. in case where monomers having a carboxyl group or hydroxyl group blocked with a vinyl ether is polymerized. When the polymerization is carried out at a temperature higher than 100° C., the block group is sometimes released. The molecular structures of the vinyl oligomers are not limited, and include linear, comb type, block type, star type and star burst type structures.

The curing agents used in the coating composition (A) are catalysts for improving the reaction between an acid hydride or blocked carboxyl group and an epoxy group as essential functional groups. Such curing agents include the following compounds.

(1) Organic Phosphines:

For example, the organic phosphines represented by the formula: $R^1R^2R^3P$. In the formula, $R^1 \sim R^3$ are independently an alkyl group or aryl group. The alkyl group includes a linear or branched alkyl group having 1–18 carbon atoms, such as a methyl group, an ethyl group, a propyl group, a n-butyl group, an s-butyl group, a t-butyl group and a n-hexyl group. The aryl group includes a phenyl group, a naphthalene group or anthracene group. The examples of the organic phosphines include trimethylphosphine, triethylphosphine and triphenylphosphine.

(2) Quaternary Ammonium Compounds:

The quaternary ammonium compounds are salts constituted of a quaternary ammonium and a counter ion such as halogen and acetate. The halogen atoms for forming the counter ion include chlorine atom, bromine atom or iodine atom.

The quaternary ammonium can be represented by the formula: $R^1R^2R^3R^4N$. $R^1 \sim R^4$ are independently an alkyl group or an aryl group, which may have a substituent. The scope of the alkyl and ary groups is the same as those as explained in respect of the organic phosphines. In this case, however, it is preferable that the carbon number of the alkyl group should be 4 or higher. When the number is less than 4, the compound is easy to dissolve in solvents and, therefore, such number is not suitable.

Examples of the quaternary ammoniums include tetramethylammonium, tetrabutyl ammonium, trimethyl(2-hydroxypropyl)ammonium, cyclohexyltrimethyl ammonium, tetraquis (hydroxymethyl)ammonium, o-trifluoromethylphenyltrimethyl ammonium and trilaurylmethyl ammonium acetate.

(3) Imidazoles:

For example, imidazole, N-methylimidazole and 2,4-dimethylimidazole.

(4) Phosphonium Compounds:

The phosphonium compounds include tetraalkyl phosphonium halides or acetates. Tetraalkyl phosphoniums include tetramethylphosphonium, tetraethylphosphonium, tetrapropylphosphonuium and tetrabutylphosphonium. In this case, however, it is preferable that the carbon number of the alkyl group should be 4 or higher. When the number is less than 4, the compound is easy to dissolve in solvents and, therefore, such number is not suitable. The halogen atoms for constituting the halides include chlorine atom, bromine atom or iodine atom. The anions for constituting the phosphonium compounds include $ClO_4^-$, $SbF_6^-$ and $PF_6^-$.

(5) Metal Alcoholates:

Preferred are organoaluminates, organotitanates and organozirconates having the following forlumae (34) to (36):

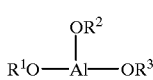
(34)

In the formula above, $R^1$, $R^2$ and $R^3$ are the same as or different from each other and a linear or branched alkyl or alkenyl group having 1–18 carbon atoms. The alkyl group includes a methyl group, an ethyl group, a propyl group, a butyl group, an s-butyl group, a t-butyl group, a pentyl group, a hexyl group, heptyl group, an octyl group, a nonyl group, a decyl group, an undecy group, a dodecyl group, a tridecyl group and an octadecyl group. The alkenyl group includes a vinyl group and an allyl group.

The organoaluminates represented by the formula (34) include aluminum trimethoxide, aluminum triethoxide, aluminum tri-2-propoxide, aluminum triisopropoxide, and aluminum tributoxide.

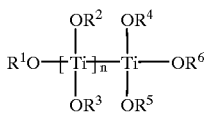

(35)

In the formula above, $R^1$, $R^2$, $R^3$, $R^4$ and $R^5$ are the same as $R^1$, $R^2$ and $R^3$ in the formula (34) and n is an integer of 0–20.

The compounds having the formula (35) wherein n is 0 include tetramethyl titanate, tetraethyl titanate, tetra-n-propyl titanate, tetraisopropyl titanate, tetraisobutyl titanate, tetra-n-butyl titanate, tetrabutyl titanate, tetra-n-pentyl titanate and tetra-n-lauryl titanate. The preferred compounds include tetraisopropyl titanate, tetraisobutyl titanate and tetra-n-butyl titanate. The compounds having the formula (35) wherein n is 1 or higher includes dimers to 11-mers of tetraisopropyl titanate, tetraisobutyl titanate and tetra-n-butyl titanate.

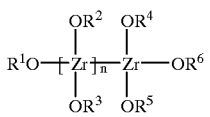

(36)

In the formula above, $R^1$, $R^2$, $R^3$, $R^4$ and $R^5$ as well as n are the same as those used in the formula (35).

The compounds having the formula (36) wherein n is 0 include tetramethyl zirconate, tetraethyl zirconate, tetra-n-propyl zirconate, tetraisopropyl zirconate, tetraisobutyl zirconate, tetra-n-butyl zirconate, tetrabutyl zirconate, tetra-n-pentyl zirconate and tetra-n-lauryl zirconate. The preferred compounds include tetraisopropyl zirconate, tetraisobutyl zirconate and tetra-n-butyl zirconate. The compounds having the formula (36) wherein n is 1 or higher includes dimers to 11-mers of tetraisopropyl zirconate, tetraisobutyl zirconate and tetra-n-butyl zirconate.

(6) Heat-Potential Basic Curing Catalysts:

The heat-potential basic curing catalysts are catalysts which do not function as catalysts at a temperature of lower than 60° C., but which can function as catalysts at 60° C. or higher. Accordingly, the coating compositions containing such heat-potential basic curing catalysts can be stored for a long period of time, without any gellation of the resin occurring and without the viscosity being increased, and therefore, they are easy to handle when they are used, especially as a one-pack type coating compositions.

Such heat-potential basic curing catalysts can be preferably represented by the formula:

—M

In the formula, $R^1$ is an alky group of C1 to 20, an aryl group, an alkoxy group, an acyloxy group or a carbonyl group adjacent to an active methylene group.

The alkyl group includes a linear or branched alkyl groups such as a methyl group, an ethyl group, a propyl group, an n-buty group, an s-butyl group, a t-butyl group, an n-heptyl group and an s-heptyl group. The aryl group includes a phenyl group, a naphthyl group and an anthracene group. The alkoxy group includes an acetyloxy group, propanoyloxy group and butanoyloxy group. The carbonyl group adjacent to an active methylene group includes a methyl carbonyl group and phenyl carbonyl methyl group.

M is Mg, Al, Ca, Sn, Pb, or transitional metals of 3A to 7A Groups, 8 Group and 1B and 2B Groups of the 4th to 6th Periods of the Periodic Table. n is an integer of 1 to 6.

Among these metals, preferred M is Ca, Sn, Pb, Zn or Co.

Specific examples of the heat-potential basic curing catalysts include aluminum acetylacetonate, iron acetylacetonate, zirconium acetylacetonate, dibutyltin acetylacetonate, dibutyltin dilaurate, dioctyltin ester maleate, magnesium naphthenate, calcium naphthenate, manganese naphthenate, iron naphthenate, cobalt naphthenate, copper naphthenate, zinc naphthenate, zirconium naphthenate, lead naphthenate, calcium caprylate, manganese caprylate, iron caprylate, cobalt caprylate, zinc caprylate, zirconium caprylate, tin caprylate, lead caprylate, zinc laurate, magnesium laurate, aluminum laurate, calcium stearate, cobalt stearate, zinc stearate and lead stearate. Preferred heat-potential basic curing catalysts include dibutyltin acetylacetonate, dibutyltin dilaurate, dioctyltin ester maleate, calcium naphthenate, cobalt naphthenate, zinc naphthenate, lead naphthenete, calcium caprylate, cobalt caprylate, tin caprylate, zinc laurate, calcium stearate, cobalt stearate, zinc stearate and lead stearate.

The especially preferred curing catalysts include quaternary ammonium salts and phosphonium salts. The quaternary ammonium salts include trilauryl methyl ammonium acetate, tetraoctyl ammonium bromide and tetran-hexyl ammonium bromide. The phosphonium salts include tetrabutyl phosphonium bromide and ethyltriphenylphosphonium bromide. In this connection, these basic curing catalysts can be suitably combined and used.

The basic curing catalysts are used in a catalytic amount in the low solvent content type coating composition. More specifically, the catalysts are used in an amount of 0.01 to 30 wt. parts, preferably 0.1 to 10 wt. parts per 100 wt. parts of the vinyl oligomers used in the coating composition. When the amount is too low, the coating appearance and the curability are deteriorated. On the other hand, when the amount is too large, the coating is colored and the coating properties are impaired and, therefore, such amount is not suitable.

The coating composition containing the heat-potential curing catalysts can be cured by heating it generally at 50 to 200° C., preferably at 60 to 150° C., for 2 min. to one hour. However, In case where the coating composition is used as two-pack coating composition, there is no need to pay attention to the curability of the resin because two liquids are combined just prior to the use. Therefore, there is much less need to use heat-potential cationic plymerization catalysts.

In order to effectuate the effects of the coating composition (A), compounds (non-polymerized compounds) having a functional group such as a hydroxyl group, a blocked hydroxyl group, a hydrolyzable silyl group, an epoxy group may be used as reaction diluents, if necessary, together with the vinyl oligomers having an acid anhydride group or a blocked carboxyl group or an epoxy group. Such compounds include compounds having an alicyclic epoxy group, such as Celloxide 2021, 2081 and 2083 (manufactured by Daisel Ltd.), compounds having a hydrolyzable silyl group and an epoxy group, such as TSL8350 (manufactured by Toshiba Silicon Co., Ltd), compounds having a hydroxyl group such as octyl alcohol and 1,5-pentanediol, and compounds having an acid anhydride group such as 4-methylhexahydro phthalic anhydride. The viscosity of these compounds is 500 cps or lower at 25° C., preferably 300 cps at 25° C. When the viscosity is larger than 500 cps, they cannot act as a reaction diluent.

In the coating composition (A), the above coating components may be used as they are, or in a combination thereof with various pigments (such as coloring pigments or brightening agents), anti-sagging agents or anti-settling agents, leveling agents, dispersants, anti-foaming agents, ultraviolet ray-absorbing agents, light stabilizers, anti-static agents, thinners and the like, which are conventionally used in the coating field.

The preferred examples of the pigments or brightening agents include titanium oxide, carbon black, precipitatable barium sulfate, calcium carbonate, talc, kaolin, silica, mica, aluminium, blood red, lead chromate, lead molybdate, chromium oxide, cobalt aluminate, azo pigments, phthalocyanine pigments, and anthraquinone pigments.

The preferred examples of the anti-sagging agents or anti-settling agents include bentonite, castor oil wax, amide wax, microgel and alumium acetate.

The preferred examples of the leveling agents include silicon-type agents such as KF69, KP321 and KP301 (manufactured by The Shin-Etsu Chemical Co., Ltd.), Modaflow (manufactured by Mitsubishi Monsant), BYK358 (manufactured by BYK-Chemie Japan KK), and Diaaid AD9001 (manufactured by Mitsubishi Rayon Co., Ltd.).

The preferred examples of the ultraviolet ray-absorbing agents include benzotriazol-type ultraviolet ray-absorbing agents such as Tinuvin 900, Tinuvin 384 and Tinuvin P (manufactured by Chiba Geigy) and oxalic anilide-type ultraviolet ray-absorbing agents such as Sanduvor-3206 (manufactured by Sandoz KK).

The preferred examples of the light stabilizers include hindered amine light stabilizers such as Sanol LS292 (manufactured by Sankyo Co., Ltd.) and Sanduvor 3058 (manufactured by Sandoz KK).

The thinners include aromatic compounds such as toluene, xylene and ethylbenzene; alcohols such as methanol, ethanol, propanol, butanol and isobutanol; ketons such as acetone, methylisobutyl ketone, methylamyl ketone, cyclohexanone, isophorone and N-methylpyrrolidone; esters such as ethyl acetate, butyl acetate and methyl cellosolve; and mixtures thereof.

The anti-static agents include Esocard C25 (manufactured by Lion Armor).

The coating composition (A) is suitable to be coated on the coating composition (B) as stated below in a state of wet-on-wet. For example, when the coating composition (A) is used as a clear coating composition and the coating composition (B) is used as a base coating composition, the above stated excellent effects can be obtained.

The coating composition (A) may contain 0 to 35%, preferably 0 to 30% of an organic solvent. In order to enhance the handling of the coating composition, the coating composition containing 5% or higher of organic solvents can be used.

The coating composition (B) used together with the coating composition (A) comprises (i) a vinyl oligomer having a hydroxyl group and/or a blocked hydroxyl group, a number average molecular weight (Mn) of 700 to 3000, a weight average molecular weight (Mw) of 700 to 6000, and a ratio of a weight average molecular weight/a number average molecular weight (Mw/Mn) of 1.0 to 3.5; and (ii) a melamine resin containing 50 to 100% of an imino type or methylol type mononucleus melamine having the following formula (9) wherein $R^1$ to $R^6$ may be the same as or different from each other and each represents a hydrogen atom, a methylol group or an alkoxy group having C1–5, provided that all of $R^1$ to $R^6$ are not an alkoxy group at the same time.

The vinyl oligomers used in the coating composition (B) have a blocked hydroxyl group as represented by the formula: —O—Z. The content of the term "Z" is the same as stated in above concerning the vinyl oligomers used in the coating composition (A).

The Mn of the vinyl oligomers used in the coating composition (B) is generally 700 to 2500, preferably 1500 to 2500. When the Mn is lower than 700, the scuff resistance and gasoline resistance of the resultant coating are reduced and, therefore, such Mn is not suitable. On the other hand, when the Mn is larger than 2500, the coating viscosity becomes too large and, therefore, such Mn is not suitable. The Mw/Mn ratio is generally 1.0 to 3.0, preferably 1.0 to 2.5. When the Mw/Mn ratio is larger than 3.0, the relative proportions of the polyester oligomers having a too large and too small molecular weights become large and, therefore, there appear the problems encountered when the oligomers having the too large and too small molecular weights are employed. On the other hand, the lower limit for the Mw/Mn ratio is 1.0. The smaller the molecular weight of the present polyester oligomers is within the range of the present invention, the Mw/Mn approaches 1.0.

The Mw of the vinyl oligomers having a hydroxyl group or blocked hydroxyl group which are used in the coating composition (B) is generally 700 to 7500, preferably 1500 to 6000, in accordance with the Mw/Mn ratio.

The vinyl oligomers used in the coating composition (B) can be prepared by polymerizing the monomers having a hydroxyl group or a blocked hydroxyl group, in the same manner as the preparation of those oligomers used in the coating composition (A).

The melamine resin used together with the vinyl oligomers having a hydroxyl group or a blocked hydroxyl group contains 50 to 100% of the melamine as represented by the above formula. The alkoxy group of C1 to C5 includes alkoxy groups which may contain branches, preferably such as alkoxy groups of C1 to C4 such as a methoxy group, an ethoxy group, a propoxy group and a butoxy group.

When the mononucleus melamine content is less than 50%, the coating viscosity becomes too large and, therefore, such content is not suitable.

Since melamine resin containing the melamine as represented by the formula above does not contain completely alkoxylated melamine, the coating composition (B) can be cured by using weak acidic catalysts. Accordingly, such catalysts are prevented from reacting with the basic curing catalysts contained in the coating composition (A) coated by a wet-on-wet coating on the coating composition (B) and also prevent the influence on an epoxy group in the clear coating composition.

The specific examples of the melamine are those wherein $R^1$~$R^6$ in the formula are all hydrogen atoms, all methylol groups, a mixture of a hydrogen atom and a methylol group, and a mixture of a hydrogen atom and/or a methylol group and an alkoxy group. The specific examples thereof include Cymel 325, 327 and 370 ($R^1$~$R^6$ of the formula are all methylol groups; the content of the mononucleus melamine is 70%), and Uvan 120 ($R^1$~$R^6$ of the formula are all methylol groups; the content of the mononucleus melamine is 70%).

The mononucleus melamine as defined by the above formula is different from the melamine wherein two or more melamine molecules are bound by formaldehyde to have two or more nuclei. However, melamine resin containing two or more melamine nuclei (polynucleus melamine resin) may be incorporated into the coating composition so long as the melamine resin containing the above mononucleus melamine in an amount of 50% or higher.

The melamine resin containing mononucleus melamine in an amount of 50 to 100% can be easily prepared by a skilled artisan. In general, the mononucleus melamine as represented by the above formula is reacted with formaldehyde, followed by the separation according to gel permeation chromatography, in order to reduce the content of the polynucleus melamine resin to less than 50% or to completely remove such polynucleus melamine resin.

The present coating composition (B) contains a curing catalyst for promoting the curing reaction between the vinyl oligomers and the melamine resin.

The melamine resin is contained in an amount of generally 20 to 140 wt. parts, preferably 40 to 120 wt. parts, much preferably 60 to 100 wt. parts, on the basis of 100 wt. parts of the vinyl oligomers.

The weak acidic catalysts contained in the coating composition (B) include carboxyl group containing compounds, phosphric acids, esters of phosphoric acid, esters of phosphorous acid and esters of unsaturated group containing phosphoric acid. The carboxyl group containing compounds include comopounds produced by reacting acid anhydrides with alcohols and compounds produced by reacting dibasic acids with alcohols. The phosphoric acids include phosphoric acid and pyrophosphoric acid. The monoesters of phosphoric acids include monooctyl phosphate, monopropyl phosphate and monolauryl phosphate. The diesters of phosphoric acid include dioctyl phosphate, dipropyl phosphate and dilauryl phosphate. The esters of unsaturated group containing phosphoric acid include mono(2-(meth) acryloyloxyethyl) acid phosphate. Such esters of the unsaturated bond containing phosphoric acid or unsaturated group containing carboxylic acids such as acrylic acid, methacrylic acid may be incorporated into the vinyl resin, by the polymerization.

By combining such weak acidic catalysts with the melamine resin, even when the coating composition (A) is coated by a wet-on-wet coating on the coating composition (B) which contains such combination, the conventional problem that the coating properties are deteriorated can be resolved.

The curing catalysts are used in a catalytic amount. More specifically, such catalyts are generally used in an amount of 0.01 to 30 parts, preferably 0.1 to 5 parts, based on 100 parts of the vinyl oligomer containing a hydroxyl group or a blocked hydroxyl group.

The coating composition (B) may also contain a dissociation catalysts for promoting the dissociation of the blocked hydroxyl group.

Such dissociation catalysts include weak acidic catalysts such as phosphoric acids and carboxylic acids.

The dissociation catalysts are used in an amount of generally 0.01 to 20 parts, preferably 0.1 to 10 parts based on 100 parts of the coating composition.

The coating composition (B) may be of aqueous type or organic type. Further, the coating composition generally has a solid content of 35 wt. % or higher, preferably 45 wt. % or higher. For example, however, when the vinyl oligomers having an Mn of 700 to 2500 and an Mw of 700 to 7500 are used in the coating composition, the organic solvent content of the composition can be made, for example, 65% or less.

When the coating composition (B) is coated on a substrate, for example, the coating composition (B) is coated on the substrate and then the low solvent type coating composition (A) is coated thereon in a wet-on-wet before the coating composition (B) is not dried. In this wet-on-wet coating process, the coating composition (B) on the substrate is not baked and the coating composition (A) is coated thereon as a clear coating composition, and then they are baked simultaneously.

The thickness of the coating obtained from the coating composition (A) is 20 to 100 μm, preferably 30 to 70μm. The thickness of the coating obtained from the coating composition (B) is 10 to 30 μm, preferably 15 to 20 μm.

The coating temperatures for coating the compositions (A) and (B) are respectively 10 to 80° C., preferably 15 to 65° C. The coating can be carried out by, for example, spray coating and rotary atomizing.

The baking is carried out generally at 80 to 200° C., preferably at 100 to 150° C., generally for 1 to 60 min., preferably for 10 to 40 min.

In the present coating process, the low solvent coating composition (A) does not inhibit the curability of the coating composition (B) when the composition (A) is coated on the coating composition (B) as a base coating composition. Accordingly, the adhesion of the coating composition (B) to the interlayer coating can be much improved. Further, the water resistance of the resultant coating can be much improved. In addition, the present composition reduces the organic solvent content to 0 to 35%, preferably 0 to 30%. On the other hand, the coating composition (B) can reduce the solvent content to 0 to 40%, preferably 0 to 35%, much preferably 0 to 30%. However, the lower limit of the organic solvent content should be 5%, in view of easy handling of the coating composition. Since the coating composition (A) is of low solvent type, the present coating process can much reduce the problem of the environmental pollution caused by the release of organic solvents.

EXAMPLES

The present invention will be explained in more detail with reference to the examples. In this case, "%" and "part" mean those expressed by weight.

Synthesis Example 1
Synthesis of Polyester Oligomers A-1 to 8:

Into a four-necked flask with a stirrer, an inlet for introducing an inert gas, a dropping funnel and a thermometer, 300 parts of methylisobutyl ketone and 134 parts of trimethylol propane were introduced and heated until methylisobutyl ketone was refluxed. After the reflux, 168 parts of 4-methylhexahydro phthalic anhydride was dropped into the flask over 5 min., and then the reaction was carried out for one hour at a refluxing temperature. Then, a mixed solution of 342 parts of ε-caprolactone and 1 part of tetrabutyl titanate was dropped over 10 min. and the reaction was further carried out for 8 hrs. at a refluxing temperature. Then, a mixed solution of 196 parts of AOEX24 (mixture of epoxides of α-olefins having C12 and C14) (manufactured by Daisel Ltd.) and 1 part of dimethyl imidazole was dropped over 10 min., and further the reaction was carried out for 6 hrs. at a reflux temperature, to finish the reaction. After the synthesis, the solvent was removed under the reduced pressure, to produce non-solvent polyesteroligomer A-1. In the same manner as above, polyester oligomers A-2 to A-8 were synthesized based on the feed materials as listed in Table 1 below. The properties of the resultant polyester oligomers are also listed in the table.

Synthesis Example 2
Synthesis of Polyester Oligomers B-1 to 2:

Into a four-necked flask with a stirrer, an inlet for introducing an inert gas, a dropping funnel and a thermometer, 300 parts of methylisobutyl ketone and 134 parts of trimethylol propane were introduced and heated until methylisobutyl ketone was refluxed. After the reflux, 168 parts of 4-methylhexahydro phthalic anhydride was dropped into the flask over 5 min., and then the reaction was carried out for one hour at a refluxing temperature. Then, a mixed solution of 196 parts of AOEX24 (mixture of epoxides of α-olefins having C12 and C14) (manufactured by Daisel Ltd.) and 1 part of dimethyl imidazole was dropped over 10 min., and further the reaction was carried out for 6 hrs. at a reflux temperature. Then, a mixed solution of 342 parts of ε-caprolactone and 1 part of tetrabutyl titanate was dropped over 10 min. and the reaction was further carried out for 8 hrs. at a refluxing temperature, to finish the reaction. After the synthesis, the solvent was removed under the reduced pressure, to produce non-solvent polyesteroligomer B-1. In the same manner as above, polyester oligomer B-2 was synthesized based on the feed materials as listed in Table 1 below. The properties of the resultant polyester oligomers are also listed in the table.

Synthesis Example 3
Synthesis of Polyester Oligomers C-1 to 3:

Into a four-necked flask with a stirrer, an inlet for introducing an inert gas, a dropping funnel and a thermometer, 300 parts of methylisobutyl ketone and 134 parts of trimethylol propane were introduced and heated until methylisobutyl ketone was refluxed. Then, a mixed solution of 342 parts of ε-caprolactone and 1 part of tetrabutyl titanate was dropped over 10 min. and the reaction was further carried out for 8 hrs. at a refluxing temperature. Then, 168 parts of 4-methylhexahydro phthalic anhydride was dropped into the flask over 5 min., and then the reaction was carried out for one hour at a refluxing temperature. Then, a mixed solution of 196 parts of AOEX24 (mixture of epoxides of α-olefins having C12 and C14) (manufactured by Daisel Ltd.) and 1 part of dimethylimidazole was dropped over 10 min., and further the reaction was carried out for 6 hrs. at a reflux temperature, to finish the reaction. After the synthesis, the solvent was removed under the reduced pressure, to produce non-solvent polyesteroligomer C-1. In the same manner as above, polyester oligomers C-2 and C-3 were synthesized based on the feed materials as listed in Table 1 below. The properties of the resultant polyester oligomers are also listed in the table.

Synthesis Example 4
Synthesis of Polyester Oligomers D-1 to 2:

Into a four-necked flask with a stirrer, an inlet for introducing an inert gas, a dropping funnel and a thermometer, 300 parts of methylisobutyl ketone and 136 parts of pentaerythritol were introduced and heated until methylisobutyl ketone was refluxed. Then, 336 parts of 4-methylhexahydro phthalic anhydride was dropped into the flask over 5 min., and the reaction was carried out for one hour at a refluxing temperature. Then, a mixed solution of 342 parts of ε-caprolactone and 1 part of tetrabutyl titanate was dropped over 10 min. and the reaction was further carried out for 8 hrs. at a refluxing temperature. Then, a mixed solution of 196 parts of AOEX24 (mixture of epoxides of α-olefins having C12 and C14) (manufactured by Daisel Ltd.), 148 parts of glycidol and 1 part of dimethylimidazole was dropped over 10 min., and further the reaction was carried out for 6 hrs. at a reflux temperature, to finish the reaction. After the synthesis, the solvent was removed under the reduced pressure, to produce non-solvent polyesteroligomer D-1. In the same manner as above, polyester oligomer D-2 was synthesized based on the feed materials as listed in Table 1 below. The properties of the resultant polyester oligomers are also listed in the table.

Synthesis Example 5
Synthesis of Polyester Oligomers E-1 to 4:

Into a four-necked flask with a stirrer, an inlet for introducing an inert gas, a dropping funnel and a thermometer, 300 parts of methylisobutyl ketone and 136 parts of pentaerythritol were introduced and heated until methylisobutyl ketone was refluxed. Then, 342 parts of 4-methylhexahydro phthalic anhydride was dropped into the flask over 5 min., and the reaction was carried out for one hour at a refluxing temperature. Then, a mixed solution of 196 parts of AOEX24 (mixture of epoxides of α-olefins having C12 and C14) (manufactured by Daisel Ltd.), 148 parts of glycidol and 1 part of dimethylimidazole was dropped over 10 min., and further the reaction was carried out for 6 hrs. at a reflux temperature. Then, a mixed solution of 342 parts of ε-caprolactone and 1 part of tetrabutyl titanate was dropped over 10 min. and the reaction was further carried out for 8 hrs. at a refluxing temperature, to finish the reaction. After the synthesis, the solvent was removed under the reduced pressure, to produce non-solvent polyesteroligomer E-1. In the same manner as above, polyester oligomers E-2 to E-4 were synthesized based on the feed materials as listed in Table 1 below. The properties of the resultant polyester oligomers are also listed in the table.

Synthesis Example 6
Synthesis of Polyester Oligomers F-1 to 3:

Into a four-necked flask with a stirrer, an inlet for introducing an inert gas, a dropping funnel and a thermometer, 300 parts of methylisobutyl ketone and 136 parts of pentaerythritol were introduced and heated until methylisobutyl ketone was refluxed. Then, a mixed solution of 342 parts of ε-caprolactone and 1 part of tetrabutyl titanate was dropped over 10 min. and the reaction was further carried out for 8 hrs. at a refluxing temperature. Then, 342 parts of 4-methylhexahydro phthalic anhydride was dropped into the flask over 5 min., and the reaction was carried out for one hour at a refluxing temperature. Then, a mixed solution of 196 parts of AOEX24 (mixture of epoxides of α-olefins having C12 and C14) (manufactured by Daisel Ltd.), 148 parts of glycidol and 1 part of dimethylimidazole was dropped over 10 min., and further the reaction was carried out for 6 hrs. at a reflux temperature, to finish the reaction. After the synthesis, the solvent was removed under the reduced pressure, to produce non-solvent polyesteroligomer F-1. In the same manner as above, polyester oligomers F-2 to F-3 were synthesized based on the feed materials as listed in Table 1 below. The properties of the resultant polyester oligomers are also listed in the table.

Synthesis Example 7
Synthesis of Polyester Oligomers G-1 to 3:

Into a four-necked flask with a stirrer, an inlet for introducing an inert gas, a dropping funnel and a thermometer, 300 parts of methylisobutyl ketone and 297 parts of tris glycidyl ethyl isocyanurate were introduced and heated until methylisobutyl ketone was refluxed. Then, a mixed solution of 690 parts of Monomer A and 1 part of dimethyl imidazole was dropped over 10 min., and further the reaction was carried out for 6 hrs. at a reflux temperature. Then, a mixed solution of 342 parts of ε-caprolactone and 1 part of tetrabutyl titanate was dropped over 10 min. and the reaction was further carried out for 8 hrs. at a refluxing temperature, to finish the reaction. After the synthesis, the solvent was removed under the reduced pressure, to produce non-solvent polyesteroligomer G-1. In the same manner as above, polyester oligomers G-2 to G-3 were synthesized based on the feed materials as listed in Table 1 below. The properties of the resultant polyester oligomers are also listed in the table. However, polyester oligomer G-2 has 20% of the modifying lactone amount and, therefore, is a reference monomer.

Synthesis Example 8
Synthesis of Polyester Oligomer H-1:

Into a four-necked flask with a stirrer, an inlet for introducing an inert gas, a dropping funnel and a thermometer, 300 parts of methylisobutyl ketone and 690 parts of Monomer A were introduced and heated until methylisobutyl ketone was refluxed. Then, a mixed solution of 342 parts of ε-caprolactone and 1 part of tetrabutyl titanate was dropped over 10 min. and the reaction was further carried out for 8 hrs. at a refluxing temperature. Then, 297 parts of tris glycidyl ethyl isocyanurate was introduced into the flask and further the reaction was carried out for 6 hrs. at a reflux temperature, to finish the reaction. After the synthesis, the solvent was removed under the reduced pressure, to produce non-solvent polyesteroligomer H-1. The properties of the resultant polyester oligomer are also listed in the table.

Synthesis Example 9
Synthesis of Polyester Oligomers I-1 to 2:

Into a four-necked flask with a stirrer, an inlet for introducing an inert gas, a dropping funnel and a thermometer, 300 parts of methylisobutyl ketone and 297 parts of tris glycidyl ethyl isocyanurate were introduced and heated until methylisobutyl ketone was refluxed. Then, a mixed solution of 438 parts of octanoic acid and 1 part of dimethyl imidazol was dropped over 10 min. and the reaction was conducted for 6 hours. Then, a mixed solution of 342 parts of ε-caprolactone and 1 part of tetrabutyl titanate was dropped over 10 min. and the reaction was further carried out for 8 hrs. at a refluxing temperature, to finish the reaction. After the synthesis, the solvent was removed under the reduced pressure, to produce non-solvent polyesteroligomer I-1. In the same manner as above, polyester oligomer I-2 was synthesized based on the feed materials as listed in Table 1 below. The properties of the resultant polyester oligomers are also listed in the table.

Synthesis Example 10
Synthesis of Polyester Oligomers J-1 to 3 (Reference Examples):

Into a four-necked flask with a stirrer, an inlet for introducing an inert gas, a dropping funnel and a thermometer, 300 parts of methylisobutyl ketone and 134 parts of trimethylol propane were introduced and heated until methylisobutyl ketone was refluxed. Then, a mixed solution of 342 parts of ε-caprolactone and 1 part of tetrabutyl titanate was dropped over 10 min. and the reaction was further carried out for 8 hrs. at a refluxing temperature, to finish the reaction. After the synthesis, the solvent was removed under the reduced pressure, to produce non-solvent polyesteroligomer J-1. In the same manner as above, polyester oligomer J-2 was prepared except that 62 parts of ethylene glycol was reacted with 336 parts of 4-methylhexahydro phthalic anhydride, and then with 228 parts of ε-caprolactone. In the same manner as above, polyester oligomer J-3 was prepared except that 104 parts of 1,5-pentanediol was reacted with 114 parts of ε-caprolactone and then with 336 parts of 4-methylhexahydro phthalic anhydride. The properties of the resultant polyester oligomers J-1 to J-3 were listed in Table 1 below. In this case, since polyester oligmer J-1 does not have any aliphatic hydrocarbon group of C4–22 which is not derived from lactones, it is a reference oligomer. In addition, since polyester oligmer J-2 has no modifying lactone, it is a reference oligomer. Further, since polyester oligmer J-3 has 27% of a modifying lactone amount which is smaller than 31%, it is a reference oligomer.

Synthesis Example 11
Synthesis of Polyester Oligomers K-1 to 2:

Into a four-necked flask with a stirrer, an inlet for introducing an inert gas, a dropping funnel and a thermometer, 300 parts of methylisobutyl ketone, 62 parts of ethylene glycol and 100 parts of succinic anhydride were introduced and heated until methylisobutyl ketone was refluxed. Then, a mixed solution of 114 parts of ε-caprolactone and 1 part of tetrabutyl titanate was dropped over 10 min. and the reaction was further carried out for 8 hrs. at a refluxing temperature. Then, a mixture of 74 parts of glycidol and 1 part of dimethyl imidazole was dropped into the flask over 10 min., and the reaction was carried out for 6 hours at a refluxing temperature, to finish the reaction. After the synthesis, the solvent was removed under the reduced pressure, to produce non-solvent polyester oligomer K-1. In the same manner as above, polyester oligomer K-2 was synthesized based on the feed materials as listed in Table 1 below. The properties of the resultant polyester oligomers are also listed in the table.

Synthesis Example 12
Synthesis of Polyester Oligomers L-1 to 3 (Reference Examples):

Into a four-necked flask with a stirrer, an inlet for introducing an inert gas, a dropping funnel and a thermometer, 300 parts of methylisobutyl ketone, 136 parts of pentaerythritol and 168 parts of 4-methylhexahydro phthalic anhydride were introduced and heated until methylisobutyl ketone was refluxed. Then, a mixed solution of 1024 parts of ε-caprolactone and 1 part of tetrabutyl titanate was dropped over 10 min. and the reaction was carried out for 8 hrs. at a refluxing temperature. Then, a mixed solution of 196 parts of AOEX24 (mixture of epoxides of α-olefins having C12 and C14) (manufactured by Daisel Ltd.) and 1 part of dimethyl imidazole was dropped over 10 min., and further the reaction was carried out for 6 hrs. at a reflux temperature, to finish the reaction. After the synthesis, the solvent was removed under the reduced pressure, to produce non-solvent polyesteroligomer L-1. In the same manner as above, polyester oligomers L-2 and L-3 were synthesized based on the feed materials as listed in Table 1 below. The properties of the resultant polyester oligomers are also listed in the table.

In this case, the Mn of polyester oligomer L-1 is larger than 1500, and therefore it is a reference oligomer. The modifying lactone amounts of polyester oligomers L-2 and L-3 are less than 31%, these oligomers are also reference oligomers.

TABLE 1

|  | A-1 | A-2 | A-3 | A-4 |
|---|---|---|---|---|
| Properties of Polyester Oligomers | | | | |
| Mn | 880 | 540 | 1358 | 543 |
| Mw | 1232 | 702 | 2444 | 1075 |
| Mw/Mn | 1.4 | 1.3 | 1.8 | 2.0 |
| Hydroxyl group (mole/Kg-resin) | 3.57 | 5.45 | 3.08 | 6.15 |
| Modifying lactone (%) | 41 | 42 | 61 | 53 |
| Starting Materials | | | | |
| Polyol | 16 | 17 | 10 | 21 |
| Acid anhydride | 20 | 18 | 13 | 13 |
| Lactone | 41 | 42 | 61 | 53 |
| Epoxy compound | 23 | 23 | 15 | 13 |

TABLE 1-continued

| Feed Composition | | | | |
|---|---|---|---|---|
| Methylisobutyl ketone | 300 | 300 | 300 | 300 |
| Glycerin | | 92 | | |
| Trimethylol propane | 134 | | | |
| Pentaerythritol | | | 136 | 136 |
| Succinic anhydride | | 100 | | |
| 4-methylhexahydro phthalic anhydride | 168 | | 168 | 84 |
| ε-Caprolactone | 342 | 228 | 798 | 342 |
| Tetrabutyl titanate | 1 | 1 | 1 | 1 |
| AOEX 24 | 196 | | 196 | 88 |
| 1,2-epoxybutyl ether | | 130 | | |
| Dimethyl imidazole | 1 | 1 | 1 | 1 |

| | A-5 | A-6 | A-7 | A-8 |
|---|---|---|---|---|
| Properties of Polyester Oligomers | | | | |
| Mn | 852 | 779 | 815 | 930 |
| Mw | 1108 | 1013 | 1141 | 1302 |
| MW/Mn | 1.3 | 1.3 | 1.4 | 1.4 |
| Hydroxyl group (mole/Kg-resin) | 3.58 | 3.96 | 3.68 | 4.39 |
| Modifying lactone (%) | 82 | 31 | 35 | 78 |
| Starting materials | | | | |
| Polyol | 11 | 12 | 11 | 15 |
| Acid anhydride | 3 | 13 | 12 | 3 |
| Lactone | 82 | 31 | 35 | 78 |
| Epoxy compound | 4 | 44 | 42 | 4 |
| Feed composition | | | | |
| Methylisobutyl ketone | 300 | 300 | 300 | 300 |
| Glycerin | 92 | 92 | 92 | |
| Pentaerythritol | | | | 136 |
| Succinic anhydride | 25 | 100 | 100 | 25 |
| ε-Caprolactone | 684 | 228 | 285 | 712 |
| Tetrabutyl titanate | 1 | 1 | 1 | 1 |
| Monomer A* | | 338 | | |
| Butyl glycidyl ether | 37.5 | | 338 | 37.5 |
| Dimethyl imidazole | 1 | 1 | 1 | 1 |

| | B-1 | B-2 | C-1 | C-2 | C-3 |
|---|---|---|---|---|---|
| Properties of Polyester Oligomers | | | | | |
| Mn | 850 | 590 | 520 | 500 | 1307 |
| Mw | 1359 | 1150 | 624 | 800 | 2600 |
| Mw/Mn | 1.6 | 1.9 | 1.2 | 1.6 | 2.0 |
| Hydroxyl group (mole/Kg-resin) | 3.57 | 6.15 | 5.45 | 5.45 | 3.08 |
| Modifying lactone (%) | 41 | 53 | 42 | 42 | 61 |
| Starting materials | | | | | |
| Polyol | 16 | 21 | 17 | 17 | 10 |
| Acid anhydride | 20 | 13 | 18 | 18 | 13 |
| Lactone | 41 | 53 | 42 | 42 | 61 |
| Epoxy compound | 23 | 13 | 23 | 23 | 15 |
| Feed Composition | | | | | |
| Methyisobutyl ketone | 300 | 300 | 300 | 300 | 300 |
| Glycerin | | | 92 | 92 | |
| Trimethylol propane | 134 | | | | |
| Pentaerythritol | | 136 | | | 136 |
| Succinic anhydride | | | 100 | 100 | |
| 4-methylhexahydro phthalic acid | 168 | 84 | | | 168 |
| ε-Caprolactone | 342 | 342 | 228 | 285 | 798 |
| Tetrabutyl titanate | 1 | 1 | 1 | 1 | 1 |
| AOEX 24 | 196 | 88 | | | 196 |
| 1,2-Epoxy butyl ether | | | 130 | 130 | 37.5 |
| Dimethyl imidazole | 1 | 1 | 1 | 1 | 1 |

| | D-1 | D-2 | E-1 | E-2 | E-3 |
|---|---|---|---|---|---|
| Properties of Polyester Oligomers | | | | | |
| Mn | 1203 | 550 | 1111 | 1100 | 1325 |
| Mw | 2045 | 880 | 2155 | 1650 | 2320 |
| Mw/Mn | 1.7 | 1.6 | 1.9 | 1.5 | 1.8 |
| Hydroxyl group (mole/Kg-resin) | 4.32 | 8.59 | 4.32 | 3.46 | 3.08 |
| Modifying lactone (%) | 31 | 39 | 31 | 32 | 61 |
| Starting materials | | | | | |
| Polyol | 12 | 16 | 12 | 8 | 10 |
| Acid anhydride | 29 | 17 | 29 | 30 | 13 |
| Lactone | 31 | 39 | 31 | 32 | 61 |
| Epoxy compound | 28 | 28 | 28 | 30 | 15 |
| Feed composition | | | | | |
| Methyl isobutyl ketone | 300 | 300 | 300 | 300 | 300 |
| Glycerin | | 92 | | 92 | |
| Pentaerythritol | 136 | | 136 | | 136 |
| Succinic anhydride | | 100 | | | |
| 4-Methylhexahydro phthalic anhydride | 336 | | 336 | 336 | 168 |
| ε-Caprolactone | 362 | 228 | 362 | 362 | 798 |
| Tetrabutyl titanate | 1 | 1 | 1 | 1 | 1 |
| AOEX 24 | 196 | 88 | 196 | 196 | 196 |
| Glycidol | 148 | 74 | 148 | 148 | |
| Dimethyl imidazole | 1 | 1 | 1 | 1 | 1 |

| | E-4 | F-1 | F-2 | F-3 | G-1 |
|---|---|---|---|---|---|
| Properties of Polyester Oligomers | | | | | |
| Mn | 500 | 1175 | 530 | 1204 | 1025 |
| Mw | 900 | 1645 | 795 | 2167 | 1435 |
| Mw/Mn | 1.8 | 1.4 | 1.5 | 1.8 | 1.4 |
| Hydroxyl group (mole/Kg-resin) | 6.15 | 4.32 | 8.59 | 3.46 | 6.08 |
| Modifying lactone (%) | 53 | 31 | 39 | 32 | 35 |
| Starting materials | | | | | |
| Polyol | 21 | 12 | 16 | 8 | |
| Hydroxy acid | 13 | 29 | 17 | 30 | 35 |
| Lactone | 53 | 31 | 39 | 32 | 35 |
| Polyepoxyl compound | 13 | 28 | 28 | 30 | 30 |
| Feed composition | | | | | |
| Methyl isobutyl ketone | 300 | 300 | 300 | 300 | 300 |
| Tris glycidyl isocyanurate | | | | | 297 |
| Hydroxy acid | | | | | 690 |
| Glycerin | | | 92 | 92 | |
| Pentaerythritol | | 136 | | 136 | |
| Succinic anhydride | | | 100 | | |
| 4-Methylhexahydro phthalic anhydride | 84 | 336 | | 336 | |
| ε-Caprolactone | 342 | 362 | 228 | 362 | 342 |
| Tetrabutyl titanate | 1 | 1 | 1 | 1 | 1 |
| AOEX 24 | 88 | 196 | 88 | 196 | |
| Glycidol | | 148 | 74 | 148 | |
| Dimethyl imidazole | 1 | 1 | 1 | 1 | 1 |

| | G-2 | G-3 | H-1 | I-1 | I-2 |
|---|---|---|---|---|---|
| Property of polyester oligomer | (Ref.) | | | | |
| Mn | 1210 | 1445 | 1070 | 1156 | 1485 |
| Mw | 1815 | 2601 | 1712 | 1620 | 2525 |
| Mw/Mn | 1.5 | 1.8 | 1.6 | 1.4 | 1.7 |
| Hydroxyl group (mole/Kg-resin) | 5.62 | 4.2 | 60.8 | 2.78 | 2.71 |
| Modifying lactone (%) | 20 | 33 | 35 | 31 | 46 |
| Starting materials | | | | | |
| Hydroxy acid | 54 | 45 | 35 | 41 | 34 |

TABLE 1-continued

| | | | | | |
|---|---|---|---|---|---|
| Lactone | 20 | 33 | 35 | 31 | 46 |
| Polyepoxy compound | 26 | 22 | 30 | 28 | 20 |
| Feed composition | | | | | |
| Methyl isobutyl ketone | 300 | 300 | 300 | 300 | 300 |
| Tris glycidyl isocyanurate | 297 | 297 | 297 | 297 | 297 |
| Monomer B* | | | 690 | | |
| Monomer C* | 612 | 612 | | | 204 |
| Octanoic acid | | | | 438 | 292 |
| ε-caprolactone | 228 | 456 | 342 | 342 | 684 |
| Tetrabutyl titanate | 1 | 1 | 1 | 1 | 1 |
| Dimethyl imidazole | 1 | 1 | 1 | 1 | 1 |

| | J-1 | J-2 | J-3 | K-1 | K-2 |
|---|---|---|---|---|---|
| Property of polyester oligomer | (Ref.) | (Ref.) | (Ref.) | | |
| Mn | 370 | 570 | 350 | 370 | 750 |
| Mw | 555 | 741 | 490 | 444 | 975 |
| Mw/Mn | 1.5 | 1.3 | 1.4 | 1.2 | 1.3 |
| Hydroxyl group (mole/Kg-resin) | 8.38 | 7.33 | 6.02 | 8.57 | 4.12 |
| Modifying lactone (%) | 63 | 0 | 27 | 33 | 47 |
| Starting materials | | | | | |
| Polyol | 37 | 11 | 13 | 18 | 20 |
| Acid anhydride | | 62 | 41 | 29 | 23 |
| Lactone | 63 | | 27 | 33 | 47 |
| Monoepoxy compound | | 27 | 19 | 20 | 10 |
| Feed composition | | | | | |
| Methyl isobuty ketone | 300 | 300 | 300 | 300 | 300 |
| Trimethylol propane | 134 | | | | |
| Ethylene glycol | | 62 | | 62 | |
| 1,5-pentanediol | | | 104 | | |
| Cyclohexane dimethalo | | | | | 144 |
| Succinic anhydride | | 100 | | | |
| 4-Methylhexahydro phthalic anhydride | | 336 | 336 | | 168 |
| ε-Caprolactone | 228 | | 228 | 114 | 342 |
| Tetrabutyl titanate | 1 | | 1 | 1 | 1 |
| Glycidol | | 148 | 148 | 74 | 74 |
| Dimethyl imidazole | | 1 | 1 | 1 | 1 |

| | L-1 | L-2 | L-3 |
|---|---|---|---|
| Property of polyester oligomer | (Ref.) | (Ref.) | (Ref.) |
| Mn | 1550 | 1020 | 850 |
| Mw | 3100 | 1836 | 1360 |
| Mw/Mn | 2 | 1.8 | 1.6 |
| Hydroxyl group (mole/Kg-resin) | 2.62 | 4.09 | 5.67 |
| Modifying lactone (%) | 67 | 12 | 29 |
| Starting materials | | | |
| Polyol | 9 | 14 | 19 |
| Acid anhydride | 11 | 34 | 24 |
| Lactone | 67 | 12 | 29 |
| Epoxy compound | 13 | 40 | 28 |
| Feed Composition | | | |
| Pentaerythritol | 136 | 136 | 136 |
| 4-Methylhexahydro phthalic anhydride | 168 | 336 | 168 |
| ε-Caprolactone | 1024 | 114 | 205 |
| Tetrabutyl titanate | 1 | 1 | 1 |
| AOEX 24 | 196 | 392 | 196 |
| Dimethyl imidazole | 1 | 1 | 1 |

Note: Monomer A is a monoepoxide of α-olefin having a linear aliphatic hydrocarbon group of C23.
Note: *
Monomer B and Monomer C are hydroxy acids and synthesized as follows:

Monomer B:
Into a four-necked flask with a stirrer, an inlet for introducing an inert gas, a dropping funnel and a thermometer, 62 parts of ethylene glycol was introduced and heated at 100° C. Then, 168 parts of 4-methylhexahydro phthalic anhydride was dropped into the flask over 5 min., and then the reaction was carried out for 3 hrs.at 100° C., to produce Monomer B.

Monomer C:
Into a four-necked flask with a stirrer, an inlet for introducing an inert gas, a dropping funnel and a thermometer, 1040 parts of 1,5-pentanediol, 1000 parts of succinic acid and 2000 parts of methyl isobutyl ketone were introduced and heated at 100° C. for 3 hrs., to produce Monomer C.
62 parts of ethylene glycol was introduced and heated at 100° C. Then, 168 parts of 4-methylhexahydro phthalic anhydride was dropped into the flask over 5 min., and then the reaction was carried out for 3 hrs. at 100° C., to produce Monomer B.

Preparation of Pigment Dispersed Compositions 50 parts of titanium oxide (CR 90 manufactured by Ishihara Sangyo Kaisha Ltd.) was dispersed in 50 parts of the polyester oligomers A to K as prepared, for one hour with Motor mill (manufactured by Igar Japan), to produce pigment dispersed compositions WA to WK.

Preparation of Intercoating Compositions

The pigment dispersed compositions WA to WK were used to prepare interlayer coating compositions W1 to W47, based on the formulations as shown in Table 2.

TABLE 2

| | W1 | W2 | W3 | W4 | W5 | W6 | W7 |
|---|---|---|---|---|---|---|---|
| WA 1 | 100 | | | | | | 100 |
| WA 2 | | 100 | | | | | |
| WA 3 | | | 100 | | | | |
| WA 4 | | | | 100 | | | |
| WA 5 | | | | | 100 | | |
| WA 6 | | | | | | 100 | |
| Burnock 901S | 32 | 49 | 28 | 32 | | | 15 |
| Cymel 325 | | | | | 25 | | 15 |
| Cymel 370 | | | | | | 25 | |
| Monooctyl phosphate | 1 | 1 | 1 | 1 | 1 | 1 | 1 |
| Byketol OK | 2 | 2 | 2 | 2 | 2 | 2 | 2 |
| Celloxide 2021 | | | | 20 | | | |
| Diphenyl dimethoxy silane | | | | 1 | | | |
| Triacetylacetonato aluminum | | | | 2 | | | |

| | W8 | W9 | W10 | W11 | W12 | W13 | W14 | W15 |
|---|---|---|---|---|---|---|---|---|
| WA 7 | 100 | | | | | | | 100 |
| WA 8 | | 100 | | | | | | |
| WB 1 | | | 100 | | | | | |
| WB 2 | | | | 100 | | | | |
| WC 1 | | | | | 100 | | | |
| WD 1 | | | | | | 100 | | |
| WD 2 | | | | | | | 100 | |
| Burnock 901S | 32 | 39 | 25 | 55 | 39 | | 53 | 33 |
| Cymel 325 | | | | | | 25 | | |
| Cymel 370 | | | | | | | | 5 |
| Monoocty phosphate | 1 | 1 | 1 | 1 | 1 | 1 | 1 | 1 |
| Byketol OK | 2 | 2 | 2 | 2 | 2 | 2 | 2 | 2 |
| Celloxide 2021 | | | | | | 20 | | |
| Diphenyl dimethoxy silane | | | | | | 1 | | |
| Triacetyl-acetonato aluminum | | | | | | 2 | | |

| | W16 | W17 | W18 | W19 | W20 | W21 | W22 |
|---|---|---|---|---|---|---|---|
| WE 1 | 100 | | | | | | 100 |
| WE 2 | | 100 | | | | | |
| WF 1 | | | 100 | | | | |

TABLE 2-continued

| | | | | | | | | |
|---|---|---|---|---|---|---|---|---|
| WG 1 | | | | | 100 | | | |
| WD 1 | | | | | | 100 | | |
| WH 1 | | | | | | | 100 | |
| Burnock 901S | 39 | 37 | 39 | | | | 54 | 10 |
| Cymel 325 | | | | 25 | 15 | | | |
| Cymel 370 | | | | | 10 | | | 20 |
| Monooctyl phosphate | 1 | 1 | 1 | 1 | 1 | 1 | 1 | |
| Byketol OK | 2 | 2 | 2 | 2 | 2 | 2 | 2 | |
| Celloxide 2021 | | | | | 20 | | | |
| Diphenyl dimethoxy silane | | | | | 1 | | | |
| Triacetylacetonato aluminum | | | | | 2 | | | |

| | W23 | W24 | W25 | W26 | W27 | W28 | W29 | W30 |
|---|---|---|---|---|---|---|---|---|
| WI 1 | 100 | | | | | | | |
| WI 2 | | 100 | | | | | | |
| WK 1 | | | 100 | | | | | |
| WK 2 | | | | 100 | | | | |
| WA 1 | | | | | 80 | | 100 | |
| WA 2 | | | | | | 80 | | 100 |
| Burnock 901S | 25 | 24 | | 31 | 25 | 35 | | |
| Cymel 325 | | | 25 | | | 5 | | 39 |
| Cymel 303 | | | | | | 25 | 10 | |
| Celloxide 2021 | | 20 | | | 20 | 20 | | |
| Diphenyl dimethoxy silane | | 1 | | | 1 | 1 | | |
| Triacetylacetonato aluminum | | 2 | | | 2 | 2 | | |
| Monooctyl phosphate | 1 | 1 | 1 | 1 | 1 | 1 | | 1 |
| p-Toluene-sulfonic acid | | | | | | | 2 | 1 |
| Byketol OK | 2 | 2 | 2 | 2 | 2 | 2 | 2 | 2 |

| | W31 | W32 | W33 | W34 | W35 | W36 | W37 | W38 | W39 |
|---|---|---|---|---|---|---|---|---|---|
| WA 1 | 50 | | | | 50 | 50 | 50 | 50 | 50 |
| WB 1 | | 50 | | | | | | | |
| WC 1 | | | 50 | | | 50 | | | |
| WD 1 | | | | 50 | | | | | |
| WE 1 | | | | | 50 | | | | |
| WF 1 | | | | | | | 50 | | |
| WG 1 | | | | | | | | 50 | |
| WI 1 | | | | | | | | | 50 |
| WJ 1 (Ref.) | 50 | | 50 | 50 | | | | | |
| WJ 2 (Ref.) | | 50 | | | | | | | |
| Burnock 901S | 53 | 49 | 62 | | 35 | 40 | | 30 | 60 |
| Cymel 325 | | | | 25 | | | 25 | 5 | |
| Celloxide 2021 | | | | 20 | | | 20 | 20 | |
| Diphenyl dimethoxy silane | | | | 1 | | | 1 | 1 | |
| Triacetylacetonato aluminum | | | | 2 | | | 2 | 2 | |
| Monooctyl phosphate | 1 | 1 | 1 | 1 | 1 | 1 | 1 | 1 | 1 |
| Byketol OK | 2 | 2 | 2 | 2 | 2 | 2 | 2 | 2 | 2 |

| | W40 | W41 | W42 | W43 | W44 | W45 | W46 | W47 |
|---|---|---|---|---|---|---|---|---|
| WC 2 | 100 | | | | | | | |
| WE 2 | | 100 | | | | | | |
| WE 4 | | | 100 | | | | | |
| WF 2 | | | | 100 | | | | |
| WG 2 (Ref.) | | | | | 40 | | | |
| WH 1 | | | | | | 100 | | |
| WA 1 | | | | | 60 | | | 50 |
| WA 5 | | | | | | | 50 | |
| WJ 2 (Ref.) | | | | | | | 50 | |
| WJ 3 (Ref.) | | | | | | | | 50 |

TABLE 2-continued

| | | | | | | | | |
|---|---|---|---|---|---|---|---|---|
| Burnock 901S | 49 | 31 | 55 | 77 | 41 | 54 | 49 | 43 |
| Monooctyl phosphate | 1 | 1 | 1 | 1 | 1 | 1 | 1 | 1 |
| Byketol OK | 2 | 2 | 2 | 2 | 2 | 2 | 2 | 2 |

Byketol OK is an acrylic surfactant manufactured by BYK Japan.

Preparation of Solid Color Coating Compositions

1. Preparation of Pigment Dispersed Compositions

Pigment dispersed compositions WA to WK were prepared in the same manner as the interlayer coating compositions.

2. Preparation of Intercoating Compositions

The pigment dispersed compositions WA to WK were used to prepare solid color coating compositions S1 to W43, based on the formulations as shown in Table 3.

TABLE 3

| | S1 | S2 | S3 | S4 | S5 | S6 | S7 |
|---|---|---|---|---|---|---|---|
| WA 1 | 100 | | | | | | 100 |
| WA 2 | | 100 | | | | | |
| WA 3 | | | 100 | | | | |
| WA 4 | | | | 100 | | | |
| WA 5 | | | | | 100 | | |
| WA 6 | | | | | | 100 | |
| Burnock 901S | 32 | 49 | 28 | 32 | | | 15 |
| Cymel 325 | | | | | 25 | | 15 |
| Cymel 370 | | | | | | 25 | |
| Sanduvor 3206 | 0.5 | 0.5 | 0.5 | 0.5 | 0.5 | 0.5 | 0.5 |
| Monooctyl phosphate | 1 | 1 | 1 | 1 | 1 | 1 | 1 |
| Sanol LS292 | 0.2 | 0.2 | 0.2 | 0.2 | 0.2 | 0.2 | 0.2 |
| BYK 301 | 2 | 2 | 2 | 2 | 2 | 2 | 2 |

| | S8 | S9 | S10 | S11 | S12 | S13 | S14 | S15 |
|---|---|---|---|---|---|---|---|---|
| WA 7 | 100 | | | | | | | 100 |
| WA 8 | | 100 | | | | | | |
| WB 1 | | | 100 | | | | | |
| WB 2 | | | | 100 | | | | |
| WC 1 | | | | | 100 | | | |
| WD 1 | | | | | | 100 | | |
| WD 2 | | | | | | | 100 | |
| Burnock 901S | 32 | 39 | 25 | 55 | 39 | | 53 | 33 |
| Cymel 325 | | | | | | 25 | | |
| Sanduvor 3206 | 0.5 | 0.5 | 0.5 | 0.5 | 0.5 | 0.5 | 0.5 | 0.5 |
| Cymel 370 | | | | | | | | 5 |
| Sanol LS292 | 0.2 | 0.2 | 0.2 | 0.2 | 0.2 | 0.2 | 0.2 | 0.2 |
| Monooctyl phosphate | 1 | 1 | 1 | 1 | 1 | 1 | 1 | 1 |
| BYK 301 | 2 | 2 | 2 | 2 | 2 | 2 | 2 | 2 |

| | S16 | S17 | S18 | S19 | S20 | S21 | S22 | S23 |
|---|---|---|---|---|---|---|---|---|
| WE 1 | 100 | | | | | | | 100 |
| WE 2 | | 100 | | | | | | |
| WF 1 | | | 100 | | | | | |
| WG 1 | | | | 100 | | | | |
| WC 1 | | | | | 100 | | | |
| WD 1 | | | | | | 100 | | |
| WH 1 | | | | | | | 100 | |
| Burnock 901S | 39 | 37 | 39 | | | | 54 | 10 |
| Sanduvor 3206 | 0.5 | 0.5 | 0.5 | 0.5 | 0.5 | 0.5 | 0.5 | 0.5 |
| Cymel 325 | | | | 25 | | 15 | | |
| Sanol L5292 | 0.2 | 0.2 | 0.2 | 0.2 | 0.2 | 0.2 | 0.2 | 0.2 |
| Cymel 370 | | | | | 25 | 10 | | 20 |
| Monooctyl phosphate | 1 | 1 | I | 1 | 1 | 1 | 1 | 1 |
| BYK 301 | 2 | 2 | 2 | 2 | 2 | 2 | 2 | 2 |

| | S24 | S25 | S26 | S27 | S28 | S29 | S30 | S31 |
|---|---|---|---|---|---|---|---|---|
| WI 1 | 100 | | | | | | | |
| WI 2 | | 100 | | | | | | |
| WK 1 | | | 100 | | | | | |

TABLE 3-continued

| | | | | | | | | |
|---|---|---|---|---|---|---|---|---|
| WK 2 | | | | 100 | | | | |
| WA 1 | | | | | 80 | | 100 | |
| WA 2 | | | | | | 80 | | 100 |
| Burnock 901S | 25 | 24 | | 31 | 25 | 35 | | |
| Cymel 325 | | | 25 | | | 5 | | 25 |
| Cymel 303 | | | | | | | 25 | 10 |
| Celloxide 2021 | | | | | 20 | 20 | | |
| Diphenyl dimethoxy silane | | | | | 1 | 1 | | |
| Trisacetyl-acetonato aluminum | | | | | | | 2 | 1 |
| Monooctyl phosphate | 1 | 1 | 1 | 1 | 1 | 1 | | 1 |
| p-Toluene-sufonic acid | | | | | | | 2 | 1 |
| Sanduvor 3206 | 0.5 | 0.5 | 0.5 | 0.5 | 0.5 | 0.5 | 0.5 | 0.5 |
| Sanol LS292 | 0.2 | 0.2 | 0.2 | 0.2 | 0.2 | 0.2 | 0.2 | 0.2 |
| BYK 301 | 2 | 2 | 2 | 2 | 2 | 2 | 2 | 2 |

| | S32 | S33 | S34 | S35 | S36 | S37 | S38 | S39 |
|---|---|---|---|---|---|---|---|---|
| WA 1 | 50 | | | | 50 | 50 | 50 | |
| WB 1 | | 50 | | | | | | |
| WC 1 | | | 50 | | | 50 | | |
| WD 1 | | | | 50 | | | | |
| WE 1 | | | | | 50 | | | |
| WF 1 | | | | | | | 50 | |
| WG 1 | | | | | | | | 50 |
| WI 1 | | | | | | | | |
| WJ 1 (Ref.) | 50 | | 50 | 50 | | | | 50 |
| WJ 2 (Ref.) | | 50 | | | | | | |
| Burnock 9015 | 53 | 49 | 62 | | 35 | 40 | | 30 |
| Cymel 325 | | | 25 | | | 25 | | 5 |
| Celloxide 2021 | | | | 20 | | | | 20 |
| Diphenyl dimethoxy silane | | | | 1 | | | | 1 |
| Sanduvor 3206 | 0.5 | 0.5 | 0.5 | 0.5 | 0.5 | 0.5 | 0.5 | 0.5 |
| Trisacetyl-acetonato aluminum | | | | | 2 | | | 2 |
| Sanol LS292 | 0.2 | 0.2 | 0.2 | 0.2 | 0.2 | 0.2 | 0.2 | 0.2 |
| Monooctyl phosphate | 1 | 1 | 1 | 1 | 1 | 1 | 1 | 1 |
| BYK 301 | 2 | 2 | 2 | 2 | 2 | 2 | 2 | 2 |

| | S40 | S41 | S42 | S43 | S44 |
|---|---|---|---|---|---|
| WE 1 | 100 | | | | |
| WF 1 | | 100 | | | |
| WG 1 | | | 100 | | |
| WH 1 | | | | 100 | |
| WI 1 | | | | | 100 |
| Sanduvor 3206 | 0.5 | 0.5 | 0.5 | 0.5 | 0.5 |
| Burnock 901S | 39 | 39 | | 54 | 25 |
| Sanol L5292 | 0.2 | 0.2 | 0.2 | 0.2 | 0.2 |
| Cymel 325 | | | 25 | | |
| Celloxide 2021 | | | | | 20 |
| Monooctyl phosphate | 1 | 1 | 1 | 1 | 1 |
| BYK 301 | | 2 | | | |
| Trisacetylacetonato aluminum | | | | | 2 |
| Diphenyl dimethoxy silane | | | | | 1 |

Preparation of Clear Coating Compositions

The clear coating compositions C1 to C43 were prepared based on the formulations as shown in Table 4 below.

TABLE 4

| | C1 | C2 | C3 | C4 | C5 | C6 | C7 |
|---|---|---|---|---|---|---|---|
| A-1 | 100 | | | | | | 100 |
| A-2 | | 100 | | | | | |
| A-3 | | | 100 | | | | |
| A-4 | | | | 100 | | | |
| A-5 | | | | | 100 | | |
| A-6 | | | | | | 100 | |
| Burnock 901S | 64 | 98 | 56 | 64 | | | 30 |
| Cymel 325 | | | | | 50 | | 20 |
| Ctmel 370 | | | | | | 50 | |
| Sanol LS292 | 1 | 1 | 1 | 1 | 1 | 1 | 1 |
| Tinuvin 384 | 2 | 2 | 2 | 2 | 2 | 2 | 2 |
| Monooctyl phosphate | 1 | 1 | 1 | 1 | 1 | 1 | 1 |
| KP 321 | 0.2 | 0.2 | 0.2 | 0.2 | 0.2 | 0.2 | 0.2 |

| | C8 | C9 | C10 | C11 | C12 | C13 | C14 | C15 |
|---|---|---|---|---|---|---|---|---|
| A-7 | 100 | | | | | | | 100 |
| A-8 | | 100 | | | | | | |
| B-1 | | | 100 | | | | | |
| B-2 | | | | 100 | | | | |
| C-1 | | | | | 100 | | | |
| D-1 | | | | | | 100 | | |
| D-2 | | | | | | | 100 | |
| Burnock 901S | 66 | 78 | 50 | 110 | 98 | 78 | | 66 |
| Cymel 325 | | | | | | | 50 | |
| Cymel 370 | | | | | | | | 10 |
| Sanol LS292 | 1 | 1 | 1 | 1 | 1 | 1 | 1 | 1 |
| Tinuvin 384 | 2 | 2 | 2 | 2 | 2 | 2 | 2 | 2 |
| Monooctyl phosphate | 1 | 1 | 1 | 1 | 1 | 1 | 1 | 1 |
| KP 321 | 0.2 | 0.2 | 0.2 | 0.2 | 0.2 | 0.2 | 0.2 | 0.2 |

| | C16 | C17 | C18 | C19 | C20 | C21 | C22 |
|---|---|---|---|---|---|---|---|
| E-1 | 100 | | | | | | 100 |
| E-2 | | 100 | | | | | |
| F-1 | | | 100 | | | | |
| G-1 | | | | 100 | | | |
| G-3 | | | | | 100 | | |
| H-1 | | | | | | 100 | |
| Burnock 901S | 78 | 74 | 78 | | | 108 | 10 |
| Cymel 325 | | | | 50 | 30 | | |
| Cymel 370 | | | | 20 | | | 20 |
| Sanol LS292 | 1 | 1 | 1 | 1 | 1 | 1 | 1 |
| Tinuvin 384 | 2 | 2 | 2 | 2 | 2 | 2 | 2 |
| Monooctyl phosphate | 1 | 1 | 1 | 1 | 1 | 1 | 1 |
| KP 321 | 0.2 | 0.2 | 0.2 | 0.2 | 0.2 | 0.2 | 0.2 |

| | C23 | C24 | C25 | C26 | C27 | C28 | C29 | C30 |
|---|---|---|---|---|---|---|---|---|
| I-1 | 100 | | | | | | | |
| I-2 | | 100 | | | | | | |
| K-1 | | | 100 | | | | | |
| K-2 | | | | 100 | | | | |
| A-1 | | | | | 80 | | 100 | |
| A-2 | | | | | | 80 | | 100 |
| Burnock 901S | 50 | 48 | | 62 | 50 | 70 | | |
| Cymel 325 | | 50 | | | 10 | | | 40 |
| Cymel 370 | | | | | | 50 | 20 | |
| Celloxide 2021 | | | 20 | 20 | | | | |
| Diphenyl dimethoxy silane | | | 1 | 1 | | | | |
| Trisacetyl-acetonato aluminum | | | | | 2 | 2 | | |
| Monooctyl phosphate | 1 | 1 | 1 | 1 | 1 | 1 | 1 | 1 |
| Sanol LS 292 | 1 | 1 | 1 | 1 | 1 | 1 | 1 | 1 |
| Tinuvin 384 | 2 | 2 | 2 | 2 | 2 | 2 | 2 | 2 |
| p-Toluene sulfonic acid | | | | | | | | |
| KP 321 | 2 | 2 | 2 | 2 | 2 | 2 | 2 | 2 |

| | C31 | C32 | C33 | C34 | C35 | C36 | C37 | C38 |
|---|---|---|---|---|---|---|---|---|
| A-1 | 50 | | | | 50 | 50 | 50 | |
| B-1 | | 50 | | | | | | |
| C-1 | | | 50 | | | 50 | | |
| D-1 | | | | 50 | | | | |
| E-1 | | | | | 50 | | | |
| F-1 | | | | | | | | 50 |

TABLE 4-continued

|  | | | | | | | | |
|---|---|---|---|---|---|---|---|---|
| G-1 | | | | | | | | 50 |
| I-1 | | | | | | | | |
| J-1 (Ref.) | 50 | | 50 | 50 | | | | 50 |
| J-2 (Ref.) | | 50 | | | | | | |
| Burnock 901S | 106 | 98 | 124 | | 70 | 80 | | 60 |
| Cymel 325 | | | | 50 | | | 50 | 10 |
| Celloxide 2021 | | | | | 20 | 20 | | |
| Diphenyl dimethoxy silane | | | | | 1 | 1 | | |
| Trisacetyl-acetonato Aluminum | | | | | 2 | 2 | | |
| Monooctyl phosphate | 1 | 1 | 1 | 1 | 1 | 1 | | 1 |
| Sanol LS292 | 1 | 1 | 1 | 1 | 1 | 1 | 1 | 1 |
| Tinuvln 384 | 2 | 2 | 2 | 2 | 2 | 2 | 2 | 2 |
| KP 321 | 2 | 2 | 2 | 2 | 2 | 2 | 2 | 2 |

TABLE 4-continued

|  | C39 | C40 | C41 | C42 | C43 |
|---|---|---|---|---|---|
| E-1 | 100 | | | | |
| F-1 | | 100 | | | |
| G-1 | | | 100 | | |
| H-1 | | | | 100 | |
| I-1 | | | | | 100 |
| Burnock 901S | 78 | 78 | | 108 | 50 |
| Sanol LS292 | 1 | 1 | 1 | 1 | 1 |
| Tinuvin 384 | 2 | 2 | 2 | 2 | 2 |
| Monooctyl phosphate | 1 | 1 | 1 | 1 | 1 |
| Kp 321 | 0.2 | 0.2 | 0.2 | 0.2 | 0.2 |

Preparation of Base Coating Compositions

The base coating compositions were prepared based on the formulations as shown in Table 5 below.

TABLE 5

|  | B1 | B2 | B3 | B4 | B5 | B6 | B7 | B8 | B9 | B10 |
|---|---|---|---|---|---|---|---|---|---|---|
| A-1 | 50 | | | | | | | 50 | | |
| A-2 | | 50 | | | | | | | | |
| A-3 | | | 50 | | | | | | | |
| A-4 | | | | 50 | | | | | | |
| A-5 | | | | | 50 | | | | | |
| A-6 | | | | | | 50 | | | | |
| A-7 | | | | | | | 50 | | | |
| A-8 | | | | | | | | | 50 | |
| B-1 | | | | | | | | | | 50 |
| 606C | 5 | 5 | 5 | 5 | 5 | 5 | 5 | 5 | 5 | 5 |
| Toluene | 5 | 5 | 5 | 5 | 5 | 5 | 5 | 5 | 5 | 5 |
| Burnock 901S | 32 | 48 | 28 | 32 | | | 15 | 33 | 39 | 25 |
| Cymel 325 | | | | | 25 | | 10 | | | |
| Cymel 370 | | | | | | 25 | | | | |
| Sanol LS292 | 0.5 | 0.5 | 0.5 | 0.5 | 0.5 | 0.5 | 0.5 | 0.5 | 0.5 | 0.5 |
| Tinuvin 384 | 1 | 1 | 1 | 1 | 1 | 1 | 1 | 1 | 1 | 1 |
| Monooctyl phosphate | 1 | 1 | 1 | 1 | 1 | 1 | 1 | 1 | 1 | 1 |
| KP 321 | 0.02 | 0.02 | 0.02 | 0.02 | 0.02 | 0.02 | 0.02 | 0.02 | 0.02 | 0.02 |

|  | B11 | B12 | B13 | B14 | B15 | B16 | B17 | B18 | B19 | B20 |
|---|---|---|---|---|---|---|---|---|---|---|
| B-2 | 50 | | | | 50 | | | | | |
| C-1 | | 50 | | | | | | | | |
| D-1 | | | 50 | | | | | | | |
| D-2 | | | | 50 | | | | | | |
| E-1 | | | | | | 50 | | | | |
| E-2 | | | | | | | 50 | | | |
| F-1 | | | | | | | | 50 | | |
| G-1 | | | | | | | | | 50 | |
| G-3 | | | | | | | | | | 50 |
| 606C | 5 | 5 | 5 | 5 | 5 | 5 | 5 | 5 | 5 | 5 |
| Toluene | 5 | 5 | 5 | 5 | 5 | 5 | 5 | 5 | 5 | 5 |
| Burnock 901S | 55 | 39 | | 53 | | 39 | 37 | 39 | | |
| Cymel 325 | | | 25 | | 33 | | | | | 15 |
| Cymel 370 | | | | | | | | | 25 | 10 |
| Sanol LS292 | 0.5 | 0.5 | 0.5 | 0.5 | 0.5 | 0.5 | 0.5 | 0.5 | 0.5 | 0.5 |
| Tinuvin 384 | 1 | 1 | 1 | 1 | 1 | 1 | 1 | 1 | 1 | 1 |
| Monooctyl Phosphate | 1 | 1 | 1 | 1 | 1 | 1 | 1 | 1 | 1 | 1 |
| KP 321 | 0.02 | 0.02 | 0.02 | 0.02 | 0.02 | 0.02 | 0.02 | 0.02 | 0.02 | 0.02 |

|  | B21 | B22 | B23 | B24 | B25 | B26 | B27 | B28 | B29 | B30 | B31 |
|---|---|---|---|---|---|---|---|---|---|---|---|
| H-1 | | 50 | | | | | | | | | |
| E-1 | | | 50 | | | | | | | | |
| I-1 | | | | 50 | | | | | | | |
| I-2 | | | | | 50 | | | | | | |
| K-1 | | | | | | 50 | | | | | |
| K-2 | | | | | | | 50 | | | | |

TABLE 5-continued

| | | | | | | | | | | | |
|---|---|---|---|---|---|---|---|---|---|---|---|
| A-1 | | | | | | | | 50 | | 50 | | 25 |
| A-2 | | | | | | | | | 50 | | 50 | |
| J-1 (ref.) | | | | | | | | | | | | 25 |
| 606C | 5 | 5 | 5 | 5 | 5 | 5 | 5 | 5 | 5 | 5 | 5 |
| Toluene | 5 | 5 | 5 | 5 | 5 | 5 | 5 | 5 | 5 | 5 | 5 |
| Burnock 901S | 54 | 5 | 25 | 24 | | 31 | 25 | 35 | | | 53 |
| Cymel 325 | | | | | 25 | | | | 5 | 25 | |
| Cymel 370 | | 20 | | | | | | | | 25 | |
| Celloxide 2021 | | | | | | | 20 | 20 | | | |
| Diphenyl dimethoxy silane | | | | | | | 1 | 1 | | | |
| Trisacetylacetonato aluminum | | | | | | | 2 | 2 | | | |
| Sanol LS292 | 0.5 | 0.5 | 0.5 | 0.5 | 0.5 | 0.5 | 0.5 | 0.5 | 0.5 | 0.5 | 0.5 |
| Tinuvin 394 | 1 | 1 | 1 | 1 | 1 | 1 | 1 | 1 | 1 | 1 | 1 |
| Monooctyl phosphate | 1 | 1 | 1 | 1 | 1 | 1 | 1 | 1 | 1 | 1 | 1 |
| KP 321 | 0.02 | 0.02 | 0.02 | 0.02 | 0.02 | 0.02 | 0.02 | 0.02 | 0.02 | 0.02 | 0.02 |

| | B32 | B33 | B34 | B35 | B36 | B37 | B38 |
|---|---|---|---|---|---|---|---|
| A-1 | | | | 25 | 25 | 25 | 25 |
| B-1 | 25 | | | | | | |
| C-1 | | 25 | | | 25 | | |
| D-1 | | | 25 | | | | |
| E-1 | | | | 25 | | | |
| F-1 | | | | | | 25 | |
| G-1 | | | | | | | 25 |
| J-1 (Ref.) | | 25 | 25 | | | | |
| J-2 (Ref.) | 25 | | | | | | |
| 606C | 5 | 5 | 5 | 5 | 5 | 5 | 5 |
| Toluene | 5 | 5 | 5 | 5 | 5 | 5 | 5 |
| Burnock 901S | 49 | 62 | | 35 | 40 | | 30 |
| Cymel 325 | | | 25 | | | 25 | 5 |
| Celloxide 2021 | | | | 20 | | 20 | |
| Diphenyl dimethoxy silane | | | | 1 | | 1 | |
| Trisacetylacetonato aluminum | | | | 2 | | 2 | |
| Sanol LS292 | 0.5 | 0.5 | 0.5 | 0.5 | 0.5 | 0.5 | 0.5 |
| Tinuvin 384 | 1 | 1 | 1 | 1 | 1 | 1 | 1 |
| Monooctyl phosphate | 1 | 1 | 1 | 1 | 1 | 1 | 1 |
| KP 321 | 0.02 | 0.02 | 0.02 | 0.02 | 0.02 | 0.02 | 0.02 |

| | B39 | B40 | B41 | B42 | B43 | B44 | B45 | B46 |
|---|---|---|---|---|---|---|---|---|
| A-5 | | | | | | | | 25 |
| B-1 | 50 | | | | | | | |
| C-2 | | 50 | | | | | | |
| E-2 | | | 50 | | | | | |
| E-4 | | | | 50 | | | | |
| F-2 | | | | | 50 | | | |
| J-2 (Ref.) | | | | | | | | 25 |
| G-2 (Ref.) | | | | | | 20 | | |
| A-1 | | | | | | 30 | | |
| H-1 | | | | | | | 50 | |
| 606C | 10 | 10 | 10 | 10 | 10 | 10 | 10 | 10 |
| Toluene | 6 | 6 | 6 | 6 | 6 | 6 | 6 | 6 |
| Sanol LS292 | 1 | 1 | 1 | 1 | 1 | 1 | 1 | 1 |
| Tinuvin 384 | 2 | 2 | 2 | 2 | 2 | 2 | 2 | 2 |
| Monooctyl phosphate | 1 | 1 | 1 | 1 | 1 | 1 | 1 | 1 |
| KP 321 | 0.02 | 0.02 | 0.02 | 0.02 | 0.02 | 0.02 | 0.02 | 0.02 |
| Burnock 901S | 60 | 49 | 31 | 55 | 77 | 41 | 54 | 49 |
| MG100S | 5 | 5 | 5 | 5 | 5 | 5 | 5 | 5 |

606C is aluminum paste manufactured by Asahi Chemical Industry Co., Ltd.

Comparative Examples

1. Preparation of Comparative Interlayer and Solid Color Coating Compositions

The interlayer and solid color coating compositions were prepared in the same manner as the examples.

TABLE 6

|  | Interlayer | | | | Solid color | | | |
| --- | --- | --- | --- | --- | --- | --- | --- | --- |
|  | WWL1 | WWL2 | WWL3 | WWL4 | SSL1 | SSL2 | SSL3 | SSL4 |
| WL 1 (Ref.) | 100 | | | | 100 | | | |
| WL 2 (Ref.) | | 100 | | | | 100 | | |
| WL 3 (Ref.) | | | 100 | | | | 100 | |
| WJ 1 (Ref.) | | | | 100 | | | | 100 |
| Cymel 327 | | 30 | 30 | | | 30 | 30 | |
| Burnock 901S | 23 | | | 62 | 23 | | | 62 |
| Monooctyl phosphate | 1 | 1 | 1 | 1 | 1 | 1 | 1 | 1 |
| Byketol OK | 2 | 2 | 2 | 2 | | | | |
| BYK 301 | | | | | 2 | 2 | 2 | 2 |
| Sanduvor 3206 | | | | | 0.5 | 0.5 | 0.5 | 0.5 |
| Sanol LS292 | | | | | 0.2 | 0.2 | 0.2 | 0.2 |

2. Comparative Clear and Base Coating Compositions

The comparative clear and base coating compositions were prepared in the same manner as the examples.

TABLE 7

|  | Clear | | | | Base | | | |
| --- | --- | --- | --- | --- | --- | --- | --- | --- |
|  | CCL1 | CCL2 | CCL3 | CLL4 | BBL1 | BBL2 | BBL3 | BBL4 |
| L-1 (Ref.) | 100 | | | | 50 | | | |
| L-2 (Ref.) | | 100 | | | | 50 | | |
| L-3 (Ref.) | | | 100 | | | | 50 | |
| J-1 (Ref.) | | | | 100 | | | | 100 |
| Cymel 327 | | 60 | 60 | | | 30 | 30 | |
| Burnock 901S | 48 | | | 124 | 24 | | | 124 |
| Monooctyl phosphate | 1 | 1 | 1 | 1 | 1 | 1 | 1 | 1 |
| KP 321 | 0.2 | 0.2 | 0.2 | 0.2 | 0.02 | 0.02 | 0.02 | 0.02 |
| Tinuvin 384 | 2 | 2 | 2 | 2 | 2 | 2 | 2 | 2 |
| Sanol LS292 | 1 | 1 | 1 | 1 | 1 | 1 | 1 | 1 |
| 606C | | | | | 10 | 10 | 10 | 10 |
| Toluene | | | | | 6 | 6 | 6 | 6 |
| MG100S* | | | | | 5 | 5 | 5 | 5 |

Note:
MG100S is Microgel manufactured by Dainippon Ink and chemicals Mfg. Co., Ltd.

Evaluation of Coating Properties:

The interlayer, solid color, clear and base coating composition thus prepared were coated to form coatings, whose properties were then evaluated as follows:

[1] Preparation of Test Pieces

The amounts of the solvents of the coating compositions so that they can be coated at 25° C. and 60° C. (100 cps) were determined and the solvent contents (%) were calculated. In this case, a mixed solvent of xylene/cyclohexanone (weight ratio of 50/50) was used for the clear coating, interlayer and solid color coating compositions, and a mixed solvent of toluene/methyl isobutyl ketone (weight ratio of 50/50) was used for the base coating compositions.

[2] (1) Coating of Interlayer Coating Compositions

The interlayer coating compositions were coated on the electrodeposited substrate using Wider 77 as a coating gun and then baked at 150° C. for 30 min. Then, either of a solvent-type base coating composition (H500 manufactured by Nippon Paint Co., Ltd.) or an aqueous-type base coating composition (H900 manufactured by Nippon Paint Co., Ltd.) was coated thereon. Thereafter, OTO561 clear coating composition (manufactured by Nippon Paint Co., Ltd.) was coated on the solvent-type base coating after the base coating was set for 10 min., or OTO580 clear coating composition (manufactured by Nippon Paint Co., Ltd.) was coated on the aqueous-type base coating after the base coating was dried at 100° C. for 10 min. Thereafter, the resultant substrate was baked at 140° C. for 30 min.

(2) Coating of Solid Color Coating Compositions

The solid color coating compositions were coated on a substrate which had been coated with the interlayer coating layer (OTO 825 manufactured by Nippon Paint Co., Ltd.), using Wider 77 as a coating gun and then baked at 150° C. for 30 min.

(3) Coating of Clear Coating Compositions

Either of a solvent-type base coating composition (H500 manufactured by Nippon Paint Co., Ltd.) or an aqueous-type base coating composition (H900 manufactured by Nippon Paint Co., Ltd.) was coated on a substrate which had been coated with the interlayer coating layer (OTO 825 manufactured by Nippon Paint Co., Ltd.), using Wider 77 as a coating gun. Thereafter, the clear coating compositions were coated on the solvent-type base coating after the base coating was set for 10 min., or on the aqueous-type base coating after the base coating was dried at 100° C. for 10 min. Thereafter, the resultant substrate was baked at 150° C. for 30 min.

(4) Coating of Base Coating Compositions

The base coating compositions were coated on a substrate which had been coated with the interlayer coating layer (OTO 825 manufactured by Nippon Paint Co., Ltd.), using Wider 77 as a coating gun. After the base coating was set for 10 min., OTO580 clear coating composition (manufactured by Nippon Paint Co., Ltd.) was coated thereon and then baked at 150° C. for 30 min.

The resultant coatings were then subjected to the following various tests. The results thereof are shown in the following Tables 8 to 13.

[3] Method for Evaluating the Properties (1) Water Resistance Test:

The test piece was immersed in hot water at 60° C. for 10 days and then the piece was subjected to cross cut tape peeling test (adhesion test). In the tables, ⊚ means no peeling of the coating; ○ means that the peeled area is less than 5% of the total area; and X means that the peeled area is 5% or more of the total area.

(2) Adhesion Test

Cross-cut is made on the test piece with a knife. Adhesive tape is attached thereto and then peeled. In the tables, ○ means the indication of adhesion; and X means no indication of adhesion.

(3) Thermal Cycle Test

Cross-cut is made on the test piece with a knife and then the piece is subjected to 10 cycles, each of which comprises maintaining the piece at 30° C., for one hour; at normal temperature for one hour; at −20° C. for one hour; and at normal temperature for one hour. The evaluation is made by observing the generation of crack. ○ means no crack; and X means generation of crack.

(4) Solvent Content

The limit viscosity of the coating composition so that the composition can be hot sprayed at 25° C. and 60° C. is measured in respect of %. In the tables, ⊚ means that the coating is possible at a solvent content of 15% or less; ○ means that the coating is possible at a solvent content of more than 15% and 30% or less; Δ means that the coating is possible at a solvent content of more than 30% and 40% or less; and X means that the coating is possible at a solvent content of more than 40%.

(5) Chipping Resistance Test

The test piece is set at an angle of 20° in diamond shot tester. Then, diamond having a weight of 0.02 g is caused to collide with the piece at −20° C. at a speed of 200 km/H. The evaluation is made by observing the peeled area (in respect of a unit of mm²) by the collision. In the tables, ⊚ means that the peeled area is smaller than 1 mm²; ○ means that the peeled area is 1 mm² or larger and smaller than 2 mm²; Δ means that the peeled area is 2 mm² or larger and smaller than 3 mm²; and X means that the peeled area is 3 mm² or larger.

(6) Coating Appearance

The smoothness of the coating was measured by PGD tester. ○ means 0.6 or higher; and X means 0.5 or lower.

(7) Weathering Resistance Test

The test piece is subjected to accelerated weathering tester for 3000 hrs. The evaluation is made by determining the gloss maintaining proportions of the coatings. In the tables, ⊚ means that the gloss maintaining proportion is 85% or higher; ○ means that the gloss maintaining proportion is 70% or higher and less than 85%; and X means that the gloss maintaining proportion is less than 70%.

(8) Scuff Resistance Test

A felt is caused to absorb a cleanser in an amount of 5%. The test piece is rubbed so that the felt is subjected to 30 times of reciprocating movements on the piece, with a weight of 1 kg imposed on the felt. The evaluation is made by determining the gloss maintaining proportions of the coatings. In the tables, ⊚ means that the gloss maintaining proportion is 75% or higher; ○ means that the gloss maintaining proportion is 60% or higher and less than 75%; and X means that the gloss maintaining proportion is less than 60%.

(9) Gasoline Resistance Test

The test piece is declined at 45°. 1 ml of gasoline (Nisseki silver) is caused to flow thereon and left to stand. This procedure is repeated 10 times. The evaluation is made by observing the change of the coating condition. In the tables, ○ means no change; and X means color change or generation of crack.

TABLE 8

| | Water resistance | | Adhesion | | Thermal Cycle | | Solvent Content | | Chipping Resistance | | Appearance |
|---|---|---|---|---|---|---|---|---|---|---|---|
| | A* | B* | A* | B* | A* | B* | 25° C. | 60° C. | A* | B* | |
| W1 | ⊚ | ⊚ | ○ | ○ | ○ | ○ | ⊚ | ⊚ | ○ | ○ | ○ |
| W2 | ⊚ | ⊚ | ○ | ○ | ○ | ○ | ⊚ | ⊚ | ○ | ○ | ○ |
| W3 | ⊚ | ⊚ | ○ | ○ | ○ | ○ | Δ | ○ | ○ | ○ | ○ |
| W4 | ⊚ | ⊚ | ○ | ○ | ○ | ○ | ⊚ | ⊚ | ○ | ○ | ○ |
| W5 | ⊚ | ⊚ | ○ | ○ | ○ | ○ | ⊚ | ⊚ | ⊚ | ⊚ | ○ |
| W6 | ⊚ | ⊚ | ○ | ○ | ○ | ○ | ⊚ | ⊚ | ○ | ○ | ○ |
| W7 | ⊚ | ⊚ | ○ | ○ | ○ | ○ | ⊚ | ⊚ | ○ | ○ | ○ |
| W8 | ⊚ | ⊚ | ○ | ○ | ○ | ○ | ⊚ | ⊚ | ○ | ○ | ○ |
| W9 | ⊚ | ⊚ | ○ | ○ | ○ | ○ | ⊚ | ⊚ | ⊚ | ⊚ | ○ |
| W10 | ⊚ | ⊚ | ○ | ○ | ○ | ○ | ⊚ | ⊚ | ○ | ○ | ○ |
| W11 | ⊚ | ⊚ | ○ | ○ | ○ | ○ | ⊚ | ⊚ | ○ | ○ | ○ |
| W12 | ⊚ | ⊚ | ○ | ○ | ○ | ○ | ⊚ | ⊚ | ○ | ○ | ○ |
| W13 | ⊚ | ⊚ | ○ | ○ | ○ | ○ | ⊚ | ⊚ | ○ | ○ | ○ |
| W14 | ⊚ | ⊚ | ○ | ○ | ○ | ○ | ⊚ | ⊚ | ○ | ○ | ○ |
| W15 | ⊚ | ⊚ | ○ | ○ | ○ | ○ | ⊚ | ⊚ | ○ | ○ | ○ |
| W16 | ⊚ | ⊚ | ○ | ○ | ○ | ○ | ○ | ⊚ | ○ | ○ | ○ |
| W17 | ⊚ | ⊚ | ○ | ○ | ○ | ○ | ○ | ⊚ | ○ | ○ | ○ |
| W18 | ⊚ | ⊚ | ○ | ○ | ○ | ○ | ○ | ⊚ | ○ | ○ | ○ |
| W19 | ⊚ | ⊚ | ○ | ○ | ○ | ○ | ⊚ | ⊚ | ○ | ○ | ○ |
| W20 | ⊚ | ⊚ | ○ | ○ | ○ | ○ | Δ | ⊚ | ○ | ○ | ○ |
| W21 | ⊚ | ⊚ | ○ | ○ | ○ | ○ | ○ | ⊚ | ○ | ○ | ○ |
| W22 | ⊚ | ⊚ | ○ | ○ | ○ | ○ | Δ | ○ | ○ | ○ | ○ |
| W23 | ⊚ | ⊚ | ○ | ○ | ○ | ○ | ○ | ⊚ | ○ | ○ | ○ |
| W24 | ⊚ | ⊚ | ○ | ○ | ○ | ○ | Δ | ○ | ○ | ○ | ○ |
| W25 | ⊚ | ⊚ | ○ | ○ | ○ | ○ | ⊚ | ⊚ | Δ | Δ | ⊚ |
| W26 | ⊚ | ⊚ | ○ | ○ | ○ | ○ | ⊚ | ⊚ | ○ | ○ | ○ |
| W27 | ⊚ | ⊚ | ○ | ○ | ○ | ○ | ⊚ | ⊚ | ○ | ○ | ○ |
| W28 | ⊚ | ⊚ | ○ | ○ | ○ | ○ | ⊚ | ⊚ | ○ | ○ | ○ |
| W29 | ○ | ○ | ○ | ○ | ○ | ○ | ⊚ | ⊚ | ○ | ○ | ○ |
| W30 | ○ | ○ | ○ | ○ | ○ | ○ | ⊚ | ⊚ | ○ | ○ | ○ |
| W31 | ⊚ | ⊚ | ○ | ○ | ○ | ○ | ⊚ | ⊚ | ⊚ | ⊚ | ○ |
| W32 | ⊚ | ⊚ | ○ | ○ | ○ | ○ | ⊚ | ⊚ | Δ | Δ | ○ |
| W33 | ⊚ | ⊚ | ○ | ○ | ○ | ○ | ⊚ | ⊚ | ⊚ | ⊚ | ○ |
| W34 | ⊚ | ⊚ | ○ | ○ | ○ | ○ | ⊚ | ⊚ | ○ | ○ | ○ |
| W35 | ⊚ | ⊚ | ○ | ○ | ○ | ○ | ○ | ○ | ○ | ○ | ○ |
| W36 | ⊚ | ⊚ | ○ | ○ | ○ | ○ | ⊚ | ○ | ○ | ○ | ○ |
| W37 | ⊚ | ⊚ | ○ | ○ | ○ | ○ | ○ | ○ | ○ | ○ | ○ |
| W38 | ⊚ | ⊚ | ○ | ○ | ○ | ○ | ⊚ | ⊚ | ○ | ○ | ○ |
| W39 | ⊚ | ⊚ | ○ | ○ | ○ | ○ | ○ | ○ | ○ | ○ | ○ |
| W40 | ⊚ | ⊚ | ○ | ○ | ○ | ○ | ⊚ | ⊚ | ○ | ○ | ○ |
| W41 | ⊚ | ⊚ | ○ | ○ | ○ | ○ | ○ | ○ | ○ | ○ | ○ |
| W42 | ⊚ | ⊚ | ○ | ○ | ○ | ○ | ⊚ | ⊚ | ⊚ | ⊚ | ○ |
| W43 | ⊚ | ⊚ | ○ | ○ | ○ | ○ | ⊚ | ⊚ | ○ | ○ | ○ |
| W44 | ⊚ | ⊚ | ○ | ○ | ○ | ○ | ○ | ○ | ○ | ○ | ○ |
| W45 | ⊚ | ⊚ | ○ | ○ | ○ | ○ | ○ | ○ | ○ | ○ | ○ |
| W46 | ⊚ | ⊚ | ○ | ○ | ○ | ○ | ⊚ | ⊚ | ○ | ○ | ○ |
| W47 | ⊚ | ⊚ | ○ | ○ | ○ | ○ | ⊚ | ⊚ | Δ | Δ | ○ |

Note:
A means a solvent-type base coating.
B means an aqueous-type base coating.

Evaluation of Properties of Clear Coatings

TABLE 9

| | Scuff resistance | Weathering Res. | Solvent Con. | | Gasoline Res. | Appearance |
|---|---|---|---|---|---|---|
| | | | 25° C. | 60° C. | | |
| C1 | ○ | ○ | ⊚ | ⊚ | ○ | ○ |
| C2 | ⊚ | ○ | ⊚ | ⊚ | ○ | ○ |

TABLE 9-continued

| | Scuff resistance | Weathering Res. | Solvent Con. 25° C. | Solvent Con. 60° C. | Gasoline Res. | Appearance |
|---|---|---|---|---|---|---|
| C3 | ○ | ○ | Δ | ○ | ○ | ○ |
| C4 | ◎ | ○ | ◎ | ◎ | ○ | ○ |
| C5 | ◎ | ○ | ◎ | ◎ | ○ | ○ |
| C6 | ◎ | ○ | ◎ | ◎ | ○ | ○ |
| C7 | ◎ | ○ | ◎ | ◎ | ○ | ○ |
| C8 | ○ | ○ | ◎ | ◎ | ○ | ○ |
| C9 | ○ | ○ | ◎ | ◎ | ○ | ○ |
| C10 | ○ | ○ | ◎ | ◎ | ○ | ○ |
| C11 | ○ | ○ | ◎ | ◎ | ○ | ○ |
| C12 | ◎ | ○ | ◎ | ◎ | ○ | ○ |
| C13 | ◎ | ○ | Δ | ○ | ○ | ○ |
| C14 | ◎ | ○ | ◎ | ◎ | ○ | ○ |
| C15 | ◎ | ○ | ◎ | ◎ | ○ | ○ |
| C16 | ◎ | ○ | ○ | ◎ | ○ | ○ |
| C17 | ○ | ○ | ○ | ○ | ○ | ○ |
| C18 | ○ | ○ | ○ | ◎ | ○ | ○ |
| C19 | ◎ | ○ | ◎ | ◎ | ○ | ○ |
| C20 | ○ | ○ | Δ | ○ | ○ | ○ |
| C21 | ○ | ○ | ○ | ◎ | ○ | ○ |
| C22 | ○ | ○ | Δ | ○ | ○ | ○ |
| C23 | ○ | ○ | Δ | ○ | ○ | ○ |
| C24 | ○ | ○ | ○ | ○ | ◎ | ○ |
| C25 | ◎ | ○ | ◎ | ◎ | ◎ | ○ |
| C26 | ○ | ○ | ◎ | ◎ | ◎ | ○ |
| C27 | ○ | ○ | ◎ | ◎ | ◎ | ○ |
| C28 | ◎ | ○ | ◎ | ◎ | ○ | ○ |
| C29 | ○ | ○ | ◎ | ◎ | ○ | ○ |
| C30 | ○ | ○ | ◎ | ◎ | ○ | ○ |
| C31 | ○ | ○ | ◎ | ◎ | ○ | ○ |
| C32 | ○ | ○ | ◎ | ◎ | ○ | ○ |
| C33 | ○ | ○ | ◎ | ◎ | ○ | ○ |
| C34 | ○ | ○ | ○ | ◎ | ○ | ○ |
| C35 | ○ | ○ | ○ | ○ | ○ | ○ |
| C36 | ○ | ○ | ◎ | ◎ | ○ | ○ |
| C37 | ○ | ○ | ○ | ◎ | ○ | ○ |
| C38 | ◎ | ○ | ◎ | ◎ | ○ | ○ |
| C39 | ○ | ○ | Δ | ○ | ○ | ○ |
| C40 | ○ | ○ | ○ | ◎ | ○ | ○ |
| C41 | ○ | ○ | ◎ | ◎ | ○ | ○ |
| C42 | ○ | ○ | ○ | ◎ | ○ | ○ |
| C43 | ○ | ○ | ○ | ◎ | ○ | ○ |

Evaluation of Properties of Solid Color Coatings

TABLE 10

| | Scuff resistance | Weathering Res. | Solvent Con. 25° C. | Solvent Con. 60° C. | Gasoline Res. | Appearance |
|---|---|---|---|---|---|---|
| S1 | ○ | ○ | ◎ | ◎ | ○ | ○ |
| S2 | ◎ | ◎ | ◎ | ◎ | ○ | ○ |
| S3 | ○ | ◎ | Δ | ○ | ○ | ○ |
| S4 | ◎ | ◎ | ◎ | ◎ | ○ | ○ |
| S5 | ◎ | ◎ | ◎ | ◎ | ○ | ○ |
| S6 | ◎ | ◎ | ◎ | ◎ | ○ | ○ |
| S7 | ○ | ◎ | ◎ | ◎ | ○ | ○ |
| S8 | ○ | ◎ | ◎ | ◎ | ○ | ○ |
| S9 | ○ | ◎ | ◎ | ◎ | ○ | ○ |
| S10 | ○ | ◎ | ◎ | ◎ | ○ | ○ |
| S11 | ◎ | ◎ | ◎ | ◎ | ○ | ○ |
| S12 | ◎ | ◎ | ◎ | ◎ | ○ | ○ |
| S13 | ◎ | ◎ | Δ | ○ | ○ | ○ |
| S14 | ◎ | ◎ | ◎ | ◎ | ○ | ○ |
| S15 | ◎ | ◎ | ◎ | ◎ | ○ | ○ |
| S16 | ○ | ◎ | ○ | ◎ | ○ | ○ |
| S17 | ○ | ◎ | ○ | ○ | ○ | ○ |
| S18 | ○ | ◎ | ○ | ◎ | ○ | ○ |
| S19 | ◎ | ◎ | ◎ | ◎ | ○ | ○ |
| S20 | ○ | ◎ | ○ | ◎ | ○ | ○ |
| S21 | ○ | ◎ | Δ | ○ | ○ | ○ |
| S22 | ◎ | ◎ | ○ | ◎ | ○ | ○ |
| S23 | ○ | ◎ | Δ | ○ | ○ | ○ |
| S24 | ○ | ◎ | ○ | ◎ | ○ | ○ |
| S25 | ○ | ◎ | Δ | ○ | ○ | ○ |
| S26 | ◎ | ◎ | ◎ | ◎ | ○ | ○ |
| S27 | ○ | ◎ | ◎ | ◎ | ○ | ○ |
| S28 | ○ | ◎ | ◎ | ◎ | ○ | ○ |
| S29 | ◎ | ◎ | ◎ | ◎ | ○ | ○ |
| S30 | ○ | ◎ | ◎ | ◎ | ○ | ○ |
| S31 | ○ | ◎ | ◎ | ◎ | ○ | ○ |
| S32 | ○ | ◎ | ◎ | ◎ | ○ | ○ |
| S33 | ○ | ◎ | ◎ | ◎ | ○ | ○ |
| S34 | ○ | ◎ | ◎ | ◎ | ○ | ○ |
| S35 | ○ | ◎ | ◎ | ◎ | ○ | ○ |
| S36 | ○ | ◎ | ○ | ○ | ○ | ○ |
| S37 | ○ | ◎ | ◎ | ◎ | ○ | ○ |
| S38 | ○ | ◎ | ○ | ○ | ○ | ○ |
| S39 | ◎ | ◎ | ◎ | ◎ | ○ | ○ |
| S40 | ○ | ◎ | Δ | ○ | ○ | ○ |
| S41 | ○ | ◎ | ○ | ◎ | ○ | ○ |
| S42 | ○ | ◎ | ◎ | ◎ | ○ | ○ |
| S43 | ○ | ◎ | ○ | ◎ | ○ | ○ |
| S44 | ○ | ◎ | ○ | ◎ | ○ | ○ |

Evaluation of Properties of Base Coatings

TABLE 11

| | Chipping Res. | Water Res. | Solvent Con. 25° C. | Solvent Con. 60° C. | Thermal Cycle | Adhesion | Appearance |
|---|---|---|---|---|---|---|---|
| B1 | ◎ | ◎ | ◎ | ◎ | ○ | ○ | ○ |
| B2 | ◎ | ◎ | ◎ | ◎ | ○ | ○ | ○ |
| B3 | ◎ | ◎ | Δ | ○ | ○ | ○ | ○ |
| B4 | ◎ | ◎ | ◎ | ◎ | ○ | ○ | ○ |
| B5 | ◎ | ◎ | ◎ | ◎ | ○ | ○ | ○ |
| B6 | ◎ | ◎ | ◎ | ◎ | ○ | ○ | ○ |
| B7 | ◎ | ◎ | ◎ | ◎ | ○ | ○ | ○ |
| B8 | ◎ | ◎ | ◎ | ◎ | ○ | ○ | ○ |
| B9 | ◎ | ◎ | ◎ | ◎ | ○ | ○ | ○ |
| B10 | ◎ | ◎ | ◎ | ◎ | ○ | ○ | ○ |
| B11 | ◎ | ◎ | ◎ | ◎ | ○ | ○ | ○ |
| B12 | ◎ | ◎ | ◎ | ◎ | ○ | ○ | ○ |
| B13 | ◎ | ◎ | ◎ | ◎ | ○ | ○ | ○ |
| B14 | ◎ | ◎ | ◎ | ◎ | ○ | ○ | ○ |
| B15 | ◎ | ◎ | ◎ | ◎ | ○ | ○ | ○ |
| B16 | ◎ | ◎ | ○ | ◎ | ○ | ○ | ○ |
| B17 | ○ | ◎ | ○ | ○ | ○ | ○ | ○ |
| B18 | ◎ | ◎ | ○ | ◎ | ○ | ○ | ○ |
| B19 | ◎ | ◎ | ◎ | ◎ | ○ | ○ | ○ |
| B20 | ○ | ◎ | Δ | ○ | ○ | ○ | ○ |
| B21 | ◎ | ◎ | ○ | ◎ | ○ | ○ | ○ |
| B22 | ◎ | ◎ | Δ | ○ | ○ | ○ | ○ |
| B23 | ◎ | ◎ | ○ | ◎ | ○ | ○ | ○ |
| B24 | ◎ | ◎ | Δ | ○ | ○ | ○ | ○ |
| B25 | ○ | ◎ | ◎ | ◎ | ○ | ○ | ○ |
| B26 | ○ | ◎ | ◎ | ◎ | ○ | ○ | ○ |
| B27 | ◎ | ◎ | ◎ | ◎ | ○ | ○ | ○ |
| B28 | ◎ | ◎ | ◎ | ◎ | ○ | ○ | ○ |
| B29 | ◎ | ◎ | ◎ | ◎ | ○ | ○ | ○ |
| B30 | ◎ | ◎ | ◎ | ◎ | ○ | ○ | ○ |
| B31 | ◎ | ◎ | ◎ | ◎ | ○ | ○ | ○ |
| B32 | ◎ | ◎ | ◎ | ◎ | ○ | ○ | ○ |
| B33 | ◎ | ◎ | ◎ | ◎ | ○ | ○ | ○ |
| B34 | ◎ | ◎ | ○ | ◎ | ○ | ○ | ○ |
| B35 | ◎ | ◎ | ○ | ○ | ○ | ○ | ○ |
| B36 | ◎ | ◎ | ◎ | ◎ | ○ | ○ | ○ |
| B37 | ◎ | ◎ | ○ | ◎ | ○ | ○ | ○ |
| B38 | ◎ | ◎ | ◎ | ◎ | ○ | ○ | ○ |
| B39 | ◎ | ◎ | ○ | ◎ | ○ | ○ | ○ |
| B40 | ◎ | ◎ | ◎ | ◎ | ○ | ○ | ○ |
| B41 | ◎ | ◎ | ○ | ◎ | ○ | ○ | ○ |
| B42 | ◎ | ◎ | ◎ | ◎ | ○ | ○ | ○ |

TABLE 11-continued

| | Chipping Res. | Water Res. | Solvent Con. 25° C. | Solvent Con. 60° C. | Thermal Cycle | Adhesion | Appearance |
|---|---|---|---|---|---|---|---|
| B43 | ◉ | ◉ | ◉ | ◉ | ○ | ○ | ○ |
| B44 | ◉ | ◉ | ○ | ◉ | ○ | ○ | ○ |
| B45 | ◉ | ◉ | ○ | ◉ | ○ | ○ | ○ |
| B46 | ◉ | ◉ | ◉ | ◉ | ○ | ○ | ○ |
| B47 | ◉ | ○ | ○ | ◉ | ○ | ○ | ○ |
| B48 | ◉ | ○ | Δ | ○ | ○ | ○ | ○ |

Evaluation of Properties of Comparative Coatings

TABLE 12

| | | Interlayer | | | | Solid color | | | |
|---|---|---|---|---|---|---|---|---|---|
| | | WWL1 | WWL2 | WWL3 | WWL4 | SSL1 | SSL2 | SSL3 | SSL4 |
| Solvent Content | 25° C. | X | X | X | ◉ | X | X | X | ◉ |
| | 60° C. | X | X | X | ◉ | X | X | X | ◉ |
| Water Res. | A | ○ | ○ | ○ | ◉ | | | | |
| | B | ○ | ○ | ○ | ○ | | | | |
| Adhesion | A | ○ | ○ | ○ | ○ | | | | |
| | B | ○ | ○ | ○ | ○ | | | | |
| Thermal Cycle | A | X | ○ | ○ | ○ | | | | |
| | B | X | ○ | ○ | ○ | | | | |
| Chipping Res. | A | ◉ | X | X | ○ | | | | |
| | B | ◉ | X | X | ○ | | | | |
| Scuff Res. | A | | | | | ◉ | X | X | X |
| | B | | | | | | | | |
| Weathering Res. | | | | | | ○ | ○ | ○ | X |
| Gasoline Res. | A | X | ○ | ○ | ○ | X | ○ | ○ | ○ |
| | B | X | ○ | ○ | ○ | X | ○ | ○ | ○ |
| Appearance | | ○ | ○ | ○ | X | ○ | ○ | ○ | X |

TABLE 13

| | | Clear | | | | Base | | | |
|---|---|---|---|---|---|---|---|---|---|
| | | CCL1 | CCL2 | CCL3 | CCL4 | BBL1 | BBL2 | BBL3 | BBL4 |
| Solvent Content | 25° C. | X | X | X | ◉ | X | X | X | ◉ |
| | 60° C. | X | X | X | ◉ | X | X | X | ◉ |
| Water Res. | A | | | | | ○ | ○ | ○ | ○ |
| | B | | | | | | | | |
| Adhesion | A | | | | | ○ | ○ | ○ | ○ |
| | B | | | | | | | | |
| Thermal Cycle | A | | | | | X | ○ | ○ | ○ |
| | B | | | | | | | | |
| Chipping Res. | A | | | | | ◉ | X | X | ○ |
| | B | | | | | | | | |
| Scuff Res. | A | ○ | X | X | X | | | | |
| | B | ○ | X | X | X | | | | |
| Weathering Res. | A | ○ | ○ | ○ | X | | | | |
| | B | ○ | ○ | ○ | X | | | | |
| Gasoline Res. | | X | ○ | ○ | ○ | | | | |
| | | X | ○ | ○ | ○ | | | | |
| Appearance | | ○ | ○ | ○ | X | ○ | ○ | ○ | X |

In view of the above, the present coating composition provides improved coating characteristics such as improved scuff resistance and chipping resistance, while the organic solvent content is much reduced, as compared with the coating compositions using the comparative polyester oligomer L-1 having the Mn not within the present range and the comparative polyester oligomers L-2 to 3 having the midifying lactone amount not within the present range. In addition, the coating compositions using the comparative polyester oligomer J-1 having no aliphatic hydrocarbon group of C4–22 which is not derived from lactones provides inferior coating properties such as scuff reisistance, weathering resistance and appearance, to those of the present coating compositions.

Synthesis Example 13

Synthesis of Vinyl Oligomers Having an Acid Anhydride or a Blocked Carboxyl Group or an Epoxy Group as Essential Functional Group and an Optional Functional Group Selected from the Group Consisting of a Silanol Group, a Hydrolyzable Silyl Group, a Hydroxyl Group and a Blocked Hydroxyl Group Into a four-necked flask with a stirrer, an inlet for introducing an inert gas, a thermometer and a cooler, a prescribed amount of xylene as described in "Synthesis Feed Materials" of Tables 14 to 17 below was introduced and heated to 140° C. (as for vinyl oligomers p1, q1, r1 and s1, 80° C.) and a monomer mixture of monomers having the above functional group, a prescribed amount of a peroxide (Perbutyl O manufactured by Nippon Oils & Fats Co., Ltd.) and a prescribed amount of xylene, which are listed in "Synthesis Feed Materials" of the tables were dropped thereto. Then, the reaction was carried out at the above reaction temperature and stopped once the solid content of the reaction mixture was 26%. Xylene was removed from the solution under reduced pressure, to yield vinyl oligomers having the properties and the amounts of the functional groups as shown in the tables.

TABLE 14

|  | a1 | a2 | a3 | b1 | c1 | d1 | e1 | f1 |
|---|---|---|---|---|---|---|---|---|
| Properties of vinyl oligomers | | | | | | | | |
| Mn | 850 | 1450 | 670 | 765 | 879 | 888 | 1045 | 1020 |
| Mw | 1360 | 2610 | 1005 | 1065 | 1406 | 1243 | 1672 | 1632 |
| Mn/Mw | 1.6 | 1.8 | 1.5 | 1.4 | 1.6 | 1.4 | 1.6 | 1.6 |
| Amount of Functional Group (mole/Kg-resin) | | | | | | | | |
| Silyl group | 3 | 3 | 3 | | 4.5 | 4.5 | | |
| Epoxy group | 1 | 1 | 1.5 | 1.0 | | 1.0 | | 1.5 |
| Acid anhydride group | 1 | 1 | 1.5 | 1.0 | 1.0 | | 1.5 | |
| Blocked hydroxyl group | 1 | 1 | 1 | 1.5 | 2.0 | 2.0 | 2.0 | 1.5 |
| Synthesis Feed Materials | | | | | | | | |
| Xylene as reflux solvent | 674 | 674 | 674 | 674 | 674 | 674 | 674 | 674 |
| γ-methacryloyloxy propyl trimethoxy silane | 62 | 62 | 62 | | 93 | 93 | | |
| Glycidyl methacrylate | 35.5 | 35.5 | 53.3 | 35.5 | | 35.5 | | 53.3 |
| Itaconic anhydride | 28 | 28 | 42 | 28 | 28 | | 42 | |
| Trimethyl siloxy ethyl methacrlate | 46.5 | 46.5 | 46.5 | 68.5 | 93 | 93 | 93 | 69.8 |
| Styrene | 25 | 25 | 25 | 75 | 17.5 | 17.5 | 50 | 50 |
| Butyl acrylate | 15.5 | 15.5 | 3.7 | 4.3 | | | 25 | 39.5 |
| 2-Ethylhexyl methacrylate | 37.5 | 37.5 | 17.5 | 37.5 | 18.5 | 28.5 | 40 | 37.5 |
| Polymerization Initiator | | | | | | | | |
| P—O* | 24 | 18 | 26 | 24 | 24 | 24 | 22 | 22 |
| Xylene | 26 | 24 | 24 | 26 | 26 | 26 | 28 | 28 |
| Additional Catalysts | | | | | | | | |
| P—O* | 1 | 1 | 1 | 1 | 1 | 1 | 1 | 1 |
| Xylene | 1 | 1 | 1 | 1 | 1 | 1 | 1 | 1 |

Note: P—O means a peroxide (Perbutyl O manufactured by Nippon Oils & Fats Co., Ltd.).

TABLE 15

|  | g1 | h1 | i1 | j1 | k1 | l1 | m1 | n1 |
|---|---|---|---|---|---|---|---|---|
| Properties of vinyl oligomers | | | | | | | | |
| Mn | 890 | 860 | 890 | 890 | 1065 | 1325 | 1035 | 865 |
| Mw | 1424 | 1204 | 1424 | 1424 | 1597 | 2120 | 1656 | 1384 |
| Mn/Mw | 1.6 | 1.4 | 1.6 | 1.6 | 1.5 | 1.6 | 1.6 | 1.6 |
| Amount of Functional Group (mole/Kg-resin) | | | | | | | | |
| Silyl group | 3.0 | 1.5 | | 6.0 | 6.0 | 7.5 | | |
| Epoxy group | 1.0 | | 1.5 | | 1.5 | | | 4.0 |

TABLE 15-continued

|  | g1 | h1 | i1 | j1 | k1 | l1 | m1 | n1 |
|---|---|---|---|---|---|---|---|---|
| Acid anhydride group | 1.0 |  | 1.5 | 1.5 |  |  | 3.0 |  |
| Blocked hydroxyl group |  | 2.0 |  |  |  |  |  |  |
| Synthesis Feed Materials |  |  |  |  |  |  |  |  |
| Xylene as refluxing solvent | 674 | 674 | 674 | 674 | 674 | 674 | 674 | 674 |
| γ-Methacryloyloxy propyl trimethoxy silane | 62 | 31 |  | 12.3 | 124 | 155 |  |  |
| Glycidyl methacrylate | 32.5 |  | 53.3 | 53.3 |  |  |  | 142 |
| Itaconic anhydride | 28 |  | 42 | 42 |  |  | 84 |  |
| Trimethylsiloxy ethylmethacrylate |  | 93 |  |  |  |  |  |  |
| Styrene | 45 | 50 | 50 | 50 | 35.3 | 64 | 75 | 25 |
| Butyl acrylate | 42 | 26 | 62.5 |  |  |  | 41 | 45 |
| 2-Ethylhexyl methacrylate | 37.5 | 50 | 43 | 35.5 | 37.5 | 31 | 50 | 38 |
| Polymerization Initiator |  |  |  |  |  |  |  |  |
| P—O | 24 | 24 | 24 | 20 | 22 | 20 | 22 | 23 |
| Xylene | 26 | 26 | 26 | 30 | 28 | 30 | 28 | 27 |
| Additional catalysts |  |  |  |  |  |  |  |  |
| P—O | 1 | 1 | 1 | 1 | 1 | 1 | 1 | 1 |
| Xylene | 1 | 1 | 1 | 1 | 1 | 1 | 1 | 1 |

TABLE 16

|  | o1 | p1 | q1 | r1 | s1 | t1 | u1 | v1 |
|---|---|---|---|---|---|---|---|---|
| Properties of vinyl oligomers |  |  |  |  |  |  |  |  |
| Mn | 1065 | 1025 | 865 | 1112 | 890 | 920 | 912 | 856 |
| Mw | 1597 | 1640 | 1384 | 1779 | 1424 | 1472 | 1459 | 1198 |
| Mn/MW | 1.5 | 1.6 | 1.6 | 1.6 | 1.6 | 1.6 | 1.6 | 1.4 |
| Amount of Functional Group (mole/Kg-resin) |  |  |  |  |  |  |  |  |
| Silyl group |  |  |  | 6.0 | 6.0 |  |  | 6.0 |
| Epoxy group |  |  | 2.0 |  | 1.0 |  | 2.0 |  |
| Blocked carbocyl group |  | 3.0 | 2.0 | 2.0 | 1.0 |  |  |  |
| Hydroxyl group |  |  |  |  |  | 3.0 | 2.0 | 2.0 |
| Blocked hydroxyl group | 3.0 |  |  |  |  |  |  |  |
| Synthesis Feed Materials |  |  |  |  |  |  |  |  |
| Xylene as refluxing solvent | 674 | 674 | 674 | 674 | 674 | 674 | 674 | 674 |
| γ-Methacryloyloxy propyl trimethoxy silane |  |  |  | 124 | 124 |  |  |  |
| Glycidyl methacrylate |  |  | 71 |  | 36 |  | 71 |  |
| 1-Ethoxyethyl acrylate |  | 107 |  |  |  |  |  |  |
| Trimethyl siloxy acrylate |  |  | 72 | 72 | 36 |  |  |  |
| 2-hydroxy ethyl methacrylate |  |  |  |  |  | 98 | 65 | 65 |
| Trimethyl siloxy ethylacrylate |  | 137 |  |  |  |  |  |  |
| Styrene | 50 | 50 | 30 | 20 | 30 | 50 | 40 | 20 |
| Butyl acrylate | 50 | 50 | 30 | 20 |  | 50 | 40 | 21 |
| 2-Ethylhexyl methacrylate | 13 | 43 | 47 | 14 | 24 | 52 | 34 | 20 |
| Synthesis Feed Materials |  |  |  |  |  |  |  |  |
| P—O |  | 22 |  |  |  | 22 | 22 | 22 |

TABLE 16-continued

|  | o1 | p1 | q1 | r1 | s1 | t1 | u1 | v1 |
|---|---|---|---|---|---|---|---|---|
| AIVN* |  | 11 | 13 | 11 | 13 |  |  |  |
| AIBN* |  | 11 | 13 | 11 | 13 |  |  |  |
| Xylene | 28 | 28 | 24 | 28 | 24 | 28 | 28 | 28 |
| Additional catalysts |  |  |  |  |  |  |  |  |
| P—O | 1 |  |  |  |  | 1 | 1 | 1 |
| AIBN* |  | 1 | 1 | 1 | 1 |  |  |  |
| Xylene | 1 | 1 | 1 | 1 | 1 | 1 | 1 | 1 |

Note: AIVN is 2,2'-azo bisvaleronitrile. AIBN is 2,2'-azo bid isobutyronitrile.

TABLE 17

|  | w1 | x1 | x2 | x3 | x4 | x5 | x6 | x7 | x8 |
|---|---|---|---|---|---|---|---|---|---|
| Properties of vinyl oligomers |  |  |  |  |  |  |  |  |  |
| Mn | 893 | 888 | 690 | 1564 | 1750 | 1956 | 2315 | 1862 | 1989 |
| Mw | 1428 | 1420 | 966 | 2782 | 4025 | 4890 | 5789 | 4750 | 4650 |
| Mn/Mw | 1.6 | 1.6 | 1.4 | 1.8 | 2.3 | 2.5 | 2.5 | 2.6 | 2.3 |
| Amount of Functional Group (mole/Kg-resin) |  |  |  |  |  |  |  |  |  |
| Silyl group | 3.0 |  |  |  |  |  |  |  |  |
| Epoxy group | 1.0 |  |  |  |  |  |  |  |  |
| Hydroxyl group | 1.0 | 3.0 | 3.0 | 2.5 | 2.0 | 2.0 | 1.5 | 1.0 |  |
| Blocked hydroxyl group |  |  |  |  |  |  |  | 1.0 | 2.0 |
| Synthesis Feed Materials |  |  |  |  |  |  |  |  |  |
| Xylene as refluxing solvent | 674 | 674 | 674 | 674 | 550 | 550 | 450 | 550 | 550 |
| γ-Methacryloyloxy propyltrimethoxy silane | 62 |  |  |  |  |  |  |  |  |
| Glycidyl methacrylate | 53 |  |  |  |  |  |  |  |  |
| 2-hydroxy ethyl methacrylate | 33 | 98 | 98 | 81 | 104 | 104 | 98 | 52 |  |
| Trimethylsiloxy ethylmethacrylate |  |  |  |  |  |  |  | 63 | 127 |
| Methyl methacrylate |  | 32 | 22 | 30 | 100 | 100 | 100 | 63 | 127 |
| Styrene | 60 | 50 | 60 | 69 | 66 | 66 | 52 |  |  |
| Butyl acrylate |  | 70 | 70 | 70 | 130 | 130 | 150 | 125 | 114 |
| 2-Ethylhexyl methacrylate | 42 |  |  |  |  |  |  |  |  |
| Synthesis Feed Materials |  |  |  |  |  |  |  |  |  |
| P—O | 22 | 22 | 26 | 18 | 16 | 14 | 12 | 14 | 14 |
| Xylene | 28 | 28 | 24 | 24 | 24 | 24 | 24 | 24 | 24 |
| Additional catalysts |  |  |  |  |  |  |  |  |  |
| P—O | 1 | 1 | 1 | 1 | 1 | 1 | 1 | 1 | 1 |
| Xylene | 1 | 1 | 1 | 1 | 1 | 1 | 1 | 1 | 1 |

Preparation of Clear Coating Composition Feeds

Clear coating composition feeds were prepared based on the formulations as shown below.

TABLE 18

|  | CC1 | CC2 | CC3 | CC4 | CC5 | CC6 | CC7 | CC8 | CC9 | CC10 | CC11 |
|---|---|---|---|---|---|---|---|---|---|---|---|
| a1 | 100 |  |  |  |  |  |  |  |  |  |  |
| a2 |  | 100 |  |  |  |  |  |  |  |  |  |
| a3 |  |  | 100 |  |  |  |  |  |  |  |  |
| b1 |  |  |  | 80 |  |  |  |  |  |  |  |
| l1 |  |  |  | 20 |  |  |  |  |  |  | 20 |
| c1 |  |  |  |  | 80 |  |  |  |  |  |  |
| n1 |  |  |  |  | 20 |  |  |  |  |  | 30 |
| d1 |  |  |  |  |  | 90 |  |  |  |  |  |
| m1 |  |  |  |  |  | 30 |  |  |  |  | 40 |

TABLE 18-continued

|  |  |  |  |  |  |  |  |  |  |  |  |
|---|---|---|---|---|---|---|---|---|---|---|---|
| g1 |  |  |  |  |  |  | 90 |  |  |  |  |
| o1 |  |  |  |  |  |  | 30 |  |  |  | 20 |
| e1 |  |  |  |  |  |  |  | 50 |  |  |  |
| k1 |  |  |  |  |  |  |  | 50 |  |  |  |
| f1 |  |  |  |  |  |  |  |  | 50 |  |  |
| j1 |  |  |  |  |  |  |  |  | 50 |  |  |
| h1 |  |  |  |  |  |  |  |  |  | 30 |  |
| i1 |  |  |  |  |  |  |  |  |  | 70 |  |
| Tinuvin 384 | 2 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 | 1 |
| KP 321 | 0.1 | 0.1 | 0.1 | 0.1 | 0.1 | 0.1 | 0.1 | 0.1 | 0.1 | 0.1 | 0.1 |
| Acetone | 3 | 3 | 3 | 3 | 3 | 3 | 3 | 3 | 3 | 3 | 3 |
| Tetrabutyl phosphonium bromide | 3 |  | 3 |  |  | 3 | 3 |  |  |  | 3 |
| Trilauryl methyl ammonium acetate |  | 3 |  |  | 3 |  |  | 3 |  | 3 |  |
| Dimethylimidazole |  |  |  | 3 |  |  |  |  | 3 |  |  |

|  | CC12 | CC13 | CC14 | CC15 | CC16 | CC17 | CC18 | CC19 | CC20 | CC21 | CC22 |
|---|---|---|---|---|---|---|---|---|---|---|---|
| p1 | 50 |  |  |  |  |  |  |  |  |  |  |
| n1 | 50 |  |  | 22.5 |  |  | 30 |  |  |  |  |
| q1 |  | 100 |  |  |  |  |  |  |  |  |  |
| b1 |  |  | 100 |  |  |  |  |  |  |  |  |
| e1 |  |  |  | 60 |  |  |  |  |  |  |  |
| f1 |  |  |  |  | 60 |  |  |  |  |  |  |
| m1 |  |  |  |  | 30 |  | 40 | 20 |  |  |  |
| i1 |  |  |  |  |  | 80 |  |  |  | 52 |  |
| o1 |  |  |  |  |  | 20 | 30 |  |  |  |  |
| w1 |  |  |  |  |  |  |  | 60 |  |  |  |
| g1 |  |  |  |  |  |  |  |  | 60 |  |  |
| t1 |  |  |  |  |  |  |  |  | 20 |  |  |
| v1 |  |  |  |  |  |  |  |  |  | 39 |  |
| j1 |  |  |  |  |  |  |  |  |  |  | 52 |
| u1 |  |  |  |  |  |  |  |  |  |  | 39 |
| Monooctyl phosphate | 1 | 1 |  |  |  |  |  |  |  |  |  |
| Tinuvin 384 | 2 | 2 | 2 | 2 | 2 | 2 | 2 | 2 | 2 | 2 | 2 |
| Sanol LS 292 | 1 | 1 | 1 | 1 | 1 | 1 | 1 | 1 | 1 | 1 | 1 |
| KP321 | 0.1 | 0.1 | 0.1 | 0.1 | 0.1 | 0.1 | 0.1 | 0.1 | 0.1 | 0.1 | 0.1 |
| Acetone | 3 | 3 | 3 | 3 | 3 | 3 | 3 | 3 | 3 | 3 | 3 |
| Tetrabutyl phosphonium bromide | 3 | 3 |  | 3 | 3 |  | 3 |  | 3 | 3 |  |
| Dimethyl imidazole |  |  | 3 |  |  |  |  | 3 |  |  |  |
| Trilauryl methyl ammonium acetate |  |  |  |  |  | 3 |  |  |  |  | 3 |

|  | CC23 | CC24 | CC25 | CC26 | CC27 | CC28 | CC29 | CC30 | CC31 | CC32 |
|---|---|---|---|---|---|---|---|---|---|---|
| m1 | 40 |  |  | 30 |  | 40 |  |  |  |  |
| n1 | 30 |  |  |  | 30 | 30 |  | 30 |  | 40 |
| o1 | 20 |  |  |  |  |  |  |  |  |  |
| l1 | 10 |  | 20 |  |  | 30 |  |  | 20 | 20 |
| g1 |  | 100 |  |  |  |  |  |  |  |  |
| i1 |  |  | 80 |  |  |  |  |  |  |  |
| k1 |  |  |  | 60 |  |  |  |  |  |  |
| j1 |  |  |  |  | 80 |  |  |  |  |  |
| s1 |  |  |  |  |  |  | 100 |  |  |  |
| r1 |  |  |  |  |  |  |  | 60 |  |  |
| q1 |  |  |  |  |  |  |  |  | 80 |  |
| p1 |  |  |  |  |  |  |  |  |  | 40 |
| Monooctyl phosphate |  |  |  |  |  |  | 1 | 1 | 1 | 1 |
| Tinuvin 384 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 |
| KP 321 | 0.1 | 0.1 | 0.1 | 0.1 | 0.1 | 0.1 | 0.1 | 0.1 | 0.1 | 0.1 |
| Acetone | 3 | 3 | 3 | 3 | 3 | 3 | 3 | 3 | 3 | 3 |
| Tetrabutyl phosphonium bromide | 3 | 3 | 3 | 3 |  | 3 | 3 | 3 | 3 | 3 |
| Tetrabutyl titanate |  |  |  |  | 3 |  |  |  |  |  |

TABLE 18-continued

|  | CC33 | CC34 | CC35 | CC36 |
|---|---|---|---|---|
| i1 | 100 | | | |
| q1 | | 100 | | |
| m1 | | | | 60 |
| p1 | | | 60 | |
| n1 | | | 45 | 45 |
| Tinuvin 384 | 2 | 2 | 2 | 2 |
| Sanol LS292 | 1 | 1 | 1 | 1 |
| KP 321 | 0.1 | 0.1 | 0.1 | 0.1 |
| Acetone | 3 | 3 | 3 | 3 |
| Tetrabutyl phosphonium bromide | 3 | 3 | 3 | 3 |

Preparation of Base Coating Composition Feeds

Base coating composition feeds were prepared based on the formulations as shown in Table 19 below.

TABLE 19

|  | b1 | b2 | b3 | b4 | b5 | b6 | b7 | b8 | h1 | h2 | h3 |
|---|---|---|---|---|---|---|---|---|---|---|---|
| 606C | 10 | 10 | 10 | 10 | 10 | 10 | 10 | 10 | 10 | 10 | 10 |
| Toluene | 10 | 10 | 10 | 10 | 10 | 10 | 10 | 10 | 10 | 10 | 10 |
| x1 | 50 | | | | | | | | 50 | | |
| x2 | | 50 | | | | | | | | | |
| x3 | | | 50 | | | | | | | | |
| x4 | | | | 50 | | | | | | | |
| x5 | | | | | 50 | | | | | | |
| x6 | | | | | | | | | 50 | 50 | 50 |
| x7 | | | | | | | 50 | | | | |
| x8 | | | | | | | | 50 | | | |
| Cymel 370 | 30 | | 30 | 30 | | 15 | 30 | 30 | | | |
| Cymel 325 | | 30 | | | 30 | 15 | | | | | 10 |
| Cymel 303 | | | | | | | | | 30 | 30 | 20 |
| MG 100S* | 5 | 5 | 5 | 5 | 5 | 5 | 5 | 5 | 5 | 5 | 5 |
| Monooctyl Phosphate | 1 | 1 | 1 | 1 | 1 | 1 | 1 | 1 | | | 1 |
| P-Toluene Sulfonic acid | | | | | | | | | 2 | 2 | 1 |
| Acetone | | | | | | | | | 2 | 2 | 2 |
| KP321 (× 10³) | 2 | 2 | 2 | 2 | 2 | 2 | 2 | 2 | 2 | 2 | 2 |
| Tinuvin 384 | 2 | 2 | 2 | 2 | 2 | 2 | 2 | 2 | 2 | 2 | 2 |
| Sanol LS292 | 1 | 1 | 1 | 1 | 1 | 1 | 1 | 1 | 1 | 1 | 1 |

Note: MG 100S is Microgel manufactured by Dainippon Ink & Chemicals Mfg. Co., Ltd.

Preparation of Clear Coating Compositions

The clear coating composition feeds were diluted with a mixture of Solvesso 150/Solvesso 100 (8:2) so that the resultant composition had 100 cps at 25° C., to prepare clear coating compositions.

Preparation of Base Coating Compositions

The base coating composition feeds were diluted with a 50 to 50 mixture of xylene/toluene so that the resultant base coating compositions had a Ford cup of 14 sec., prepare base coating compositions.

Preparation of Test Pieces

The electrodeposited plate was coated with OTO 850 (interlayer coating compositon manufactured by Nippon Paint Co., Ltd.) using Wider 77 as a coating gun and baked at 140° C. for 20 min.

The base coating composition was coated thereon at a thickness of 15 μm (based on the dry state) and set for 10 min. Then, the clear coating composition was coated thereon at a thickness of 40 μm (based on the dry state). After the coatings were set for 10 min., the coatings were baked at 150° C. for 20 min., prepare test pieces.

Coating Properties

The test pieces were measured in respect of the adhesion of the base coating to the interlayer coating, water resistance of the clear coating, chipping resistance and hardness. The results are shown in the following Table 20.

(1) Adhesion Test

Cross-cut is made on the test piece with a nife. Adhesive tape is attached thereto and then peeled. In the tables, ○ means the indication of adhesion; and X means no indication of adhesion.

(2) Water Resistance Test:

The test piece was immersed in hot water at 60° C. for 10 days and then the piece was subjected to cross cut tape peeling test (adhesion test). In the table, ○ means no peeling of the coating; and X means peeling.

(3) Chipping Resistance Test

The test piece is set at an angle of 20° in diamond shot tester. Then, diamond having a weight of 0.02 g is caused to collide with the piece at −20° C. at a speed of 200 km/H. The evaluation is made by observing the peeled area (in respect of a unit of mm²) by the collision. In the tables, ⊚ means that the peeled area is smaller than 1 mm²; ○ means that the peeled area is 1 mm² or larger and smaller than 2 mm²; Δ means that the peeled area is 2 mm² or larger and smaller than 3 mm²; and X means that the peeled area is 3 mm² or larger.

(4) Hardness Test

The hardness of the test pieces was evaluated to measure the hardness when the test pieces begin to be scuffed with a pencil (Mitsubishi Uni).

TABLE 20

| Clear coating | Base coating | Adhesion | Water Res. | Chipping Res. | Hardness |
|---|---|---|---|---|---|
| CC1 | b1 | ○ | ○ | Δ | F |
| CC2 | b1 | ○ | ○ | ○ | F |
| CC3 | b1 | ○ | ○ | ○ | F |
| CC4 | b1 | ○ | ○ | Δ | F |
| CC5 | b1 | ○ | ○ | ○ | HB |
| CC6 | b1 | ○ | ○ | ○ | F |
| CC7 | b1 | ○ | ○ | ○ | HB |
| CC8 | b1 | ○ | ○ | ○ | HB |
| CC9 | b1 | ○ | ○ | ○ | F |
| CC10 | b1 | ○ | ○ | ○ | HB |
| CC11 | b2 | ○ | ○ | ○ | F |
| CC12 | b2 | ○ | ○ | ○ | F |
| CC13 | b2 | ○ | ○ | ○ | F |
| CC14 | b2 | ○ | ○ | ○ | F |
| CC15 | b2 | ○ | ○ | ○ | F |

TABLE 20-continued

| Clear coating | Base coating | Adhesion | Water Res. | Chipping Res. | Hardness |
|---|---|---|---|---|---|
| CC16 | b3 | ○ | ○ | ○ | F |
| CC17 | b3 | ○ | ○ | ○ | HB |
| CC18 | b3 | ○ | ○ | ○ | F |
| CC19 | b3 | ○ | ○ | ○ | F |
| CC20 | b3 | ○ | ○ | ○ | HB |
| CC21 | b4 | ○ | ○ | ○ | F |
| CC22 | b4 | ○ | ○ | ○ | F |
| CC23 | b4 | ○ | ○ | ○ | F |
| CC24 | b4 | ○ | ○ | ○ | HB |
| CC25 | b4 | ○ | ○ | ○ | HB |
| CC26 | b5 | ○ | ○ | ○ | HB |
| CC27 | b5 | ○ | ○ | ○ | F |
| CC28 | b5 | ○ | ○ | ○ | F |
| CC29 | b5 | ○ | ○ | ○ | F |
| CC30 | b6 | ○ | ○ | ○ | F |
| CC31 | b6 | ○ | ○ | ○ | F |
| CC32 | b6 | ○ | ○ | ○ | F |
| CC33 | b7 | ○ | ○ | ○ | F |
| CC34 | b7 | ○ | ○ | ○ | F |
| CC35 | b8 | ○ | ○ | ○ | F |
| CC36 | b8 | ○ | ○ | ○ | F |
| Comparative Examples | | | | | |
| CC1 | h1 | ○ | X | X | HB |
| CC11 | h1 | ○ | X | X | HB |
| CC12 | h2 | X | X | X | B |
| CC20 | h3 | ○ | X | X | B |
| CC29 | h3 | ○ | X | X | B |

The water resistance and chipping resistance of the coatings prepared by the present process are very excellent. On the other hand, when a low solvent content type-coating composition (A) was coated by wet-on-wet on a base coating composition comprising melamine resin containing a completely alkoxylated melamine (Cymel 303) and a strong acidic catalyst (p-toluene sulfonic acid) (h1 to h3) and then baked, the water resistance and chipping resistance of the resultant coatings are inferior to the present coatings as a whole. In addition, since the coating composition (A) is used with a solvent content of 35% or less, the present process is very useful for the prevention of the environmental pollution.

What is claimed is:

1. A low organic solvent content resin composition comprising:
   (1) a polyester oligomer, which is a star oligomer or a star burst oligomer prepared by an addition reaction, having a hydroxy group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1.0 to 2.0, an amount of a modifying lactone being 31 to 85%, and an aliphatic hydrocarbon group having 4–22 carbon atoms derived from the group consisting of a monoepoxy compound, a hydroxy acid and an aliphatic acid;
   said addition reaction being carried out such that:
   (i) one mole of a polyol having 3 to 6 hydroxyl groups is reacted with 0.3 to 1.5 mole of an acid anhydride, then with 2 to 10 moles of a lactone, and then with 0.3 to 1.5 mole of a monoepoxy compound: or
   (ii) one mole of a polyol having 3 to 6 hydroxyl grouns is reacted with 0.3 to 1.5 mole of an acid anhydride, then with 0.3 to 1.5 mole of a monoepoxy compound, and then with 2 to 10 moles of a lactone: or
   (iii) one mole of a polyol having 3 to 6 hydroxyl groups is reacted with 2 to 10 moles of a lactone, then with 0.3 to 1.5 mole of an acid anhydride, and then with 0.3 to 1.5 mole of a monoepoxy compound, or
   said addition reaction being carried out such that:
   one mole of a polyepoxy compound having 3 to 6 epoxy groups is reacted with 2 to 6 moles of a hydroxy acid or an aliphatic acid, and then with 2 to 10 moles of a lactone;
   (2) a curing agent reactive with a hydroxyl group of said polyester oligomer;
   and wherein the content of an organic solvent is 5 to 40%.

2. The resin composition of claim 1, wherein said amount of the modifying lactone is 31 to 80% based on the polyester oligomer.

3. The resin composition of claim 1, wherein said aliphatic acid has 4–15 carbon atoms.

4. The resin composition of claim 1, wherein said curing agent is a melamine resin containing 50 to 100% of mononucleus melamine having the following formula:

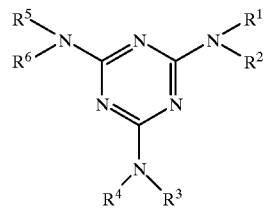

wherein $R^1$–$R^6$ are independently a hydrogen atom, a methylol group or an alkyl group having 1–5 carbon atoms.

5. A low organic content coating composition comprising:
   (1) a polyester oligomer, which is a star oligomer or a star burst oligomer, prepared by an addition reaction, having a hydroxyl group in an amount of 2.0 to 10.0 moles/Kg-resin, a number average molecular weight (Mn) of 300 to 1500, a weight average molecular weight (Mw) of 300 to 3000, and a ratio of a weight average molecular weight/a number average molecular weight (Mw/Mn) of 1.0 to 2.0, an amount of a modifying lactone being 31 to 85%, and an aliphatic hydrocarbon group having 4–22 carbon atoms derived from the group consisting of a monoepoxy compound, a hydroxy acid and an aliphatic acid;
   said addition reaction being carried out such that;
   (i) one mole of a polyol having 3 to 6 hydxoxyl groups is reacted with 0.3 to 1.5 mole of an acid anhydride, then with 2 to 10 moles of a lactone, and then with 0.3 to 1.5 mole of a monoepoxy compound: or
   (ii) one mole of a polyol having 3 to 6 hydroxyl groups is reacted with 0.3 to 1.5 mole of an acid anhydride, then with 0.3 to 1.5 mole of a monoepoxy compound, and then with 2 to 10 moles of a lactone: or
   (iii) one mole of a polyol having 3 to 6 hydroxyl groups is reacted with 2 to 10 moles of a lactone, then with 0.3 to 1.5 mole of an acid anhydride, and then with 0.3 to 1.5 mole of a monoepoxy compound, or
   said addition reaction being carried out such that;
   one mole of a polyepoxy compound having 3 to 6 epoxy groups is reacted with 2 to 6 moles of a hydroxy acid or an aliphatic acid, and then with 2 to 10 moles of a lactone;

(2) a curing agent reactive with a hydroxyl group of said polyester oligomer; and
(3) a curing catalyst which catalyzes the reaction between the hydroxyl group and the curing agent; and
wherein the content of an organic solvent is 5 to 40%.

6. The resin composition of claim 5, wherein said amount of the modifying lactone is 31 to 80% based on the polyester oligomer.

7. The resin composition of claim 5, wherein said aliphatic acid has 4–15 carbon atoms.

8. The resin composition of claim 5, wherein said curing agent is a melamine resin containing 50 to 100% of mononucleus melamine having the following formula:

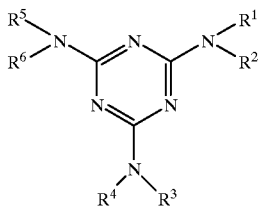

wherein $R^1$–$R^6$ are independently a hydrogen atom, a methylol group or an alkyl group having 1–5 carbon atoms.

9. A coating process comprising the steps of:
coating the coating composition of claim 5 on a surface of a substrate, and then
curing said coating composition by heat,
thereby forming a coating on the surface.

10. A process for coating the coating composition of claim 5 to a surface of an article, comprising the steps of:
coating said coating composition on a surface of a substrate which is supported rotatably about a substantially horizontal axis so that the coating thickness is thicker than that at which the coating composition normally sags on a vertically extending surface; and then
drying said coating composition on the surface, to cure it by starting to rotate the substrate about the substantially horizontal axis before the coating composition on the substrate sags due to gravity and rotating at a speed at which the surface of the substrate is changed from a substantially vertical position to the substantially horizontal position before the coating composition sags due to gravity, whereby the speed is such that the coating composition does not sag due to centrifugal force caused by the rotation.

11. The composition of claim 1 or 5, wherein said monoepoxy compound further has a hydroxyl group.

12. The composition of claim 1 or 5, wherein said polyester oligomer has a glass transition temperature (Tg) of −50 to 40° C.

13. The composition of claim 1 or 5, wherein said monoepoxy compound is used in an amount of about 5 to 45% based on the weight of said polyester oligomer.

14. The composition of claim 1 or 5, wherein said hydroxy acid is used in an amount of about 5 to 70% based on the weight of said polyester oligomer.

15. The composition of claim 1 or 5, wherein said polyepoxy compound is used in an amount of about 5 to 40% based on the weight of said polyester oligomer.

16. The composition of claim 1 or 5, wherein said aliphatic add is used in an amount of about 5 to 70% based on the weight of said polyester oligomer.

17. The composition of claim 1 or 5, wherein said polyol is used in an amount of about 3 to 40% based on the weight of said polyester oligomer.

18. The composition of claim 1 or 5, wherein said acid anhydride is used in an amount of about 3 to 30% based on the weight of said polyester oligomer.

* * * * *